(12) United States Patent
Ogawa et al.

(10) Patent No.: US 12,496,717 B2
(45) Date of Patent: Dec. 16, 2025

(54) ROBOT COMPONENT MODULE, ROBOT

(71) Applicant: NATIONAL UNIVERSITY CORPORATION YAMAGATA UNIVERSITY, Yamagata (JP)

(72) Inventors: Jun Ogawa, Yonezawa (JP); Tomoharu Mori, Yonezawa (JP); Yosuke Watanabe, Yonezawa (JP); Masaru Kawakami, Yonezawa (JP); Hidemitsu Furukawa, Yonezawa (JP)

(73) Assignee: NATIONAL UNIVERSITY CORPORATION YAMAGATA UNIVERSITY, Yamagata (JP)

( * ) Notice: Subject to any disclaimer, the term of this patent is extended or adjusted under 35 U.S.C. 154(b) by 118 days.

(21) Appl. No.: 18/690,484

(22) PCT Filed: Sep. 7, 2022

(86) PCT No.: PCT/JP2022/033562
§ 371 (c)(1),
(2) Date: May 8, 2024

(87) PCT Pub. No.: WO2023/038056
PCT Pub. Date: Mar. 16, 2023

(65) Prior Publication Data
US 2024/0342908 A1  Oct. 17, 2024

(30) Foreign Application Priority Data
Sep. 10, 2021 (JP) .................. 2021-147557

(51) Int. Cl.
*B25J 9/16* (2006.01)
*B25J 9/00* (2006.01)

(52) U.S. Cl.
CPC .......... *B25J 9/1664* (2013.01); *B25J 9/0006* (2013.01)

(58) Field of Classification Search
CPC . B25J 15/08; B25J 19/00; B25J 9/0006; B25J 9/08; B25J 9/1664
See application file for complete search history.

(56) References Cited

U.S. PATENT DOCUMENTS 12,129,876 B2 * 10/2024 Tao ..................... F15B 15/1423
2015/0070904 A1 * 3/2015 Martinez ............... F15B 15/103
92/261

(Continued)

OTHER PUBLICATIONS

International Preliminary Report on Patentability (Chapter I) and Written Opinion of the International Searching Authority issued in PCT/JP2022/033562; issued Mar. 5, 2024.

(Continued)

*Primary Examiner* — Wade Miles
*Assistant Examiner* — Zachary Joseph Wallace
(74) *Attorney, Agent, or Firm* — Studebaker Brackett PLLC

(57) ABSTRACT

It is intended to realize a modular soft robot having a high degree of freedom of movement. A voxel 10 constituting at least a portion of a robot comprises: a polyhedral-shaped casing 100 contractable according to discharge of a working fluid from an internal space thereof; and a deformation-regulating member 200 housed in the casing 100 and configured to regulate deformation of the voxel 10 when the working fluid in the casing 100 is discharged, wherein a plurality of the voxels 10 can be coupled together to constitute at least a portion of a robot.

15 Claims, 49 Drawing Sheets

(56) References Cited

U.S. PATENT DOCUMENTS

| | | | | |
|---|---|---|---|---|
| 2016/0017899 | A1* | 1/2016 | Yang | A61F 2/08 |
| | | | | 92/261 |
| 2020/0156237 | A1* | 5/2020 | Tang | B62D 57/02 |
| 2021/0003149 | A1* | 1/2021 | Keplinger | F15B 15/10 |
| 2022/0304564 | A1* | 9/2022 | Manfredi | A61B 34/30 |
| 2023/0321817 | A1* | 10/2023 | Do | B25J 9/142 |
| | | | | 74/490.05 |
| 2023/0378891 | A1* | 11/2023 | Pikul | H02N 13/00 |

OTHER PUBLICATIONS

Xin Sui, et al., "Automatic Generation of Locomotion Patterns for Soft Modular Reconfigurable Robots", [online], Dec. 31, 2019, MDPI, [retrieved on Aug. 2, 2021], Internet <URL:https://www.mdpi.com/2076-3417/10/1/294/htm?fbclid=IWAR3x_Qa7yCMVIWEI0CuapBd9GRAotUTwFNuAO5Xxle0NLhvhvKAgMjV4c0Y#>.
International Search Report issued in PCT/JP2022/033562; mailed Nov. 29, 2022.

* cited by examiner

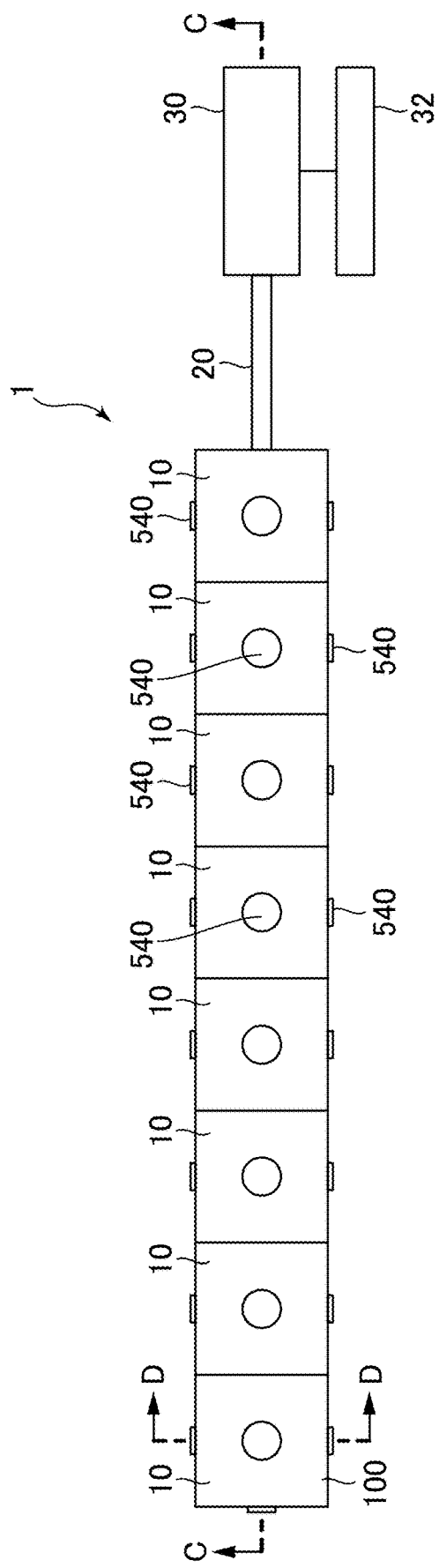

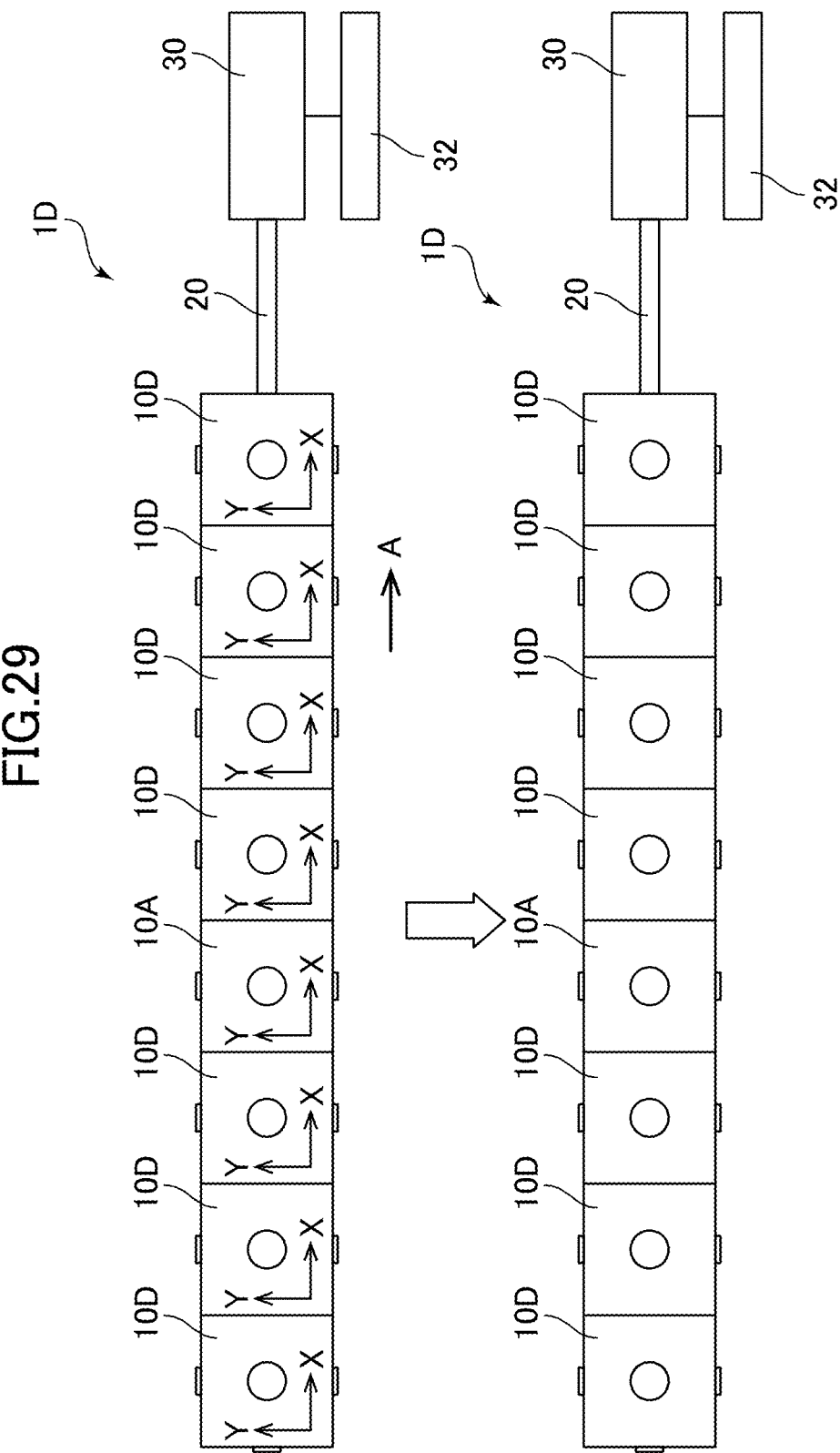

ROBOT COMPONENT MODULE, ROBOT

TECHNICAL FIELD

The present invention relates to a robot component module, and a robot component.

BACKGROUND ART

There has been known a robot configured by coupling a plurality of modular units together and structurally differently reconfigurable by changing the arrangement of the modular units. Such a modular reconfigurable robot allows for robot reconfiguration according to each task. There has also been known a soft robot constructed of a flexible material. The soft robot has a degree of freedom for unlimited deformation, and can move like a living thing.

Further, a soft modular robot having characteristics as the modular reconfigurable robot and characteristics as the soft robot is being developed, as described in Non-Patent Document 1. In the robot described in the Non-Patent Document 1, a plurality of hollow silicone voxels are coupled together by magnets, and the movement of the robot is controlled by pneumatically pressurizing or depressurizing each of the silicone voxels.

CITATION LIST

Non-Patent Document

Non-Patent Document1: Xin Sui, five others, "Automatic Generation of Locomotion Patterns for Soft Modular Reconfigurable Robots", [online], Dec. 31, 2019, MDPI, [Search: Aug. 2, 2021], Internet <URL: https://www.mdpi.com/2076-3417/10/1/294/htm?fbclid=IwAR3x_Qa7yCMVIWEI0CuapBd9GRAotUTwFNuAO5XxIe0NLhvhvKAgMjV4c0Y#>

SUMMARY OF INVENTION

Technical Problem

When each of the silicone voxels is simply pressurized or depressurized as in the invention described in the Non-Patent Document 1, each voxel can merely deform, causing only expansion or contraction, and a degree of freedom of movement of the robot is not high.

The present invention has been made in view of the above technical problem, and an object thereof is to provide a modular soft robot having a high degree of freedom of movement.

Solution to Technical Problem

It is one aspect of the present invention to provide a robot component module constituting at least a portion of a robot, comprising: a polyhedral-shaped casing contractable according to discharge of a working fluid from an internal space thereof; and a deformation-regulating member housed in the casing to regulate deformation of the robot component module when the working fluid in the casing is discharged; wherein a plurality of the robot component modules can be coupled together to constitute at least at least a portion of the robot.

In one embodiment of the present invention, an outer shape of the casing is a quadrilateral parallelepiped shape, or a cubic shape, and the deformation-regulating member has a pre-deformation shape which is similar to the outer shape of the casing.

In one embodiment of the present invention, the deformation-regulating member has a different elasticity in at least one axis direction among an X-axis direction, a Y-axis direction, and a Z-axis direction which are orthogonal to each other, with respect to an elasticity in the remaining axis directions.

In one embodiment of the present invention, the deformation-regulating member is configured to, when being compressed in one axis direction among an X-axis direction, a Y-axis direction, and a Z-axis direction which are orthogonal to each other, undergo shear deformation in either one of the remaining axis directions.

In one embodiment of the present invention, the deformation-regulating member is configured to, when being compressed in one axis direction among an X-axis direction, a Y-axis direction, and a Z-axis direction which are orthogonal to each other, bend in either one of the remaining axis directions.

In one embodiment of the present invention, the deformation-regulating member comprises: a first layer comprised of a plurality of first plate-shaped parts placed perpendicularly to an XY plane defined by an X-axis direction, a Y-axis direction, and a Z-axis direction which are orthogonal to each other, along the XY plane; and a second layer comprised of a plurality of second plate-shaped parts placed perpendicularly to the XY plane along the XY plane; wherein the first layer and the second layer are alternately laminated in the Z-axis direction.

In one embodiment of the present invention, the first plate-shaped parts and the second plate-shaped parts are arranged to form a plurality of quadrilateral grids as viewed from the Z-axis direction.

In one embodiment of the present invention, the first plate-shaped parts and the second plate-shaped parts are arranged to form a plurality of diamond-shaped quadrilateral frames each of whose diagonal lines are located along the X-axis direction and the Y-axis direction, respectively, wherein the X-axis directional diagonal line has a length different from a length of the Y-axis directional diagonal line, and wherein: the lengths of the X-axis directional diagonal lines of the plurality of diamond-shaped quadrilateral frames are constant; and the lengths of the Y-axis directional diagonal lines of the plurality of diamond-shaped quadrilateral frames are constant.

In one embodiment of the present invention, the first plate-shaped parts and the second plate-shaped parts are arranged to form a plurality of diamond-shaped quadrilateral frames each of whose diagonal lines are located along the X-axis direction and the Y-axis direction, respectively, wherein the X-axis directional diagonal line has a length different from a length of the Y-axis directional diagonal line, and wherein the first plate-shaped parts and the second plate-shaped parts are configured such that the length of the Y-axis directional diagonal line of the diamond shape located on one side of the Y-axis is greater than the length of the Y-axis directional diagonal line of the diamond shape located on the other side of the Y-axis.

In one embodiment of the present invention, all the first plate-shaped parts extend in the X-axis direction, and all the second plate-shaped parts extend at an angle to the X-axis.

In one embodiment of the present invention, the first plate-shaped parts and the second plate-shaped parts are arranged to form a square-shape quadrilateral frames each of whose diagonal lines are located along the X-axis direction and the Y-axis direction, respectively, wherein the X-axis directional diagonal line has a length equal to a length of the Y-axis directional diagonal line.

It is another aspect of the present invention to provide a robot comprising: a plurality of the above-mentioned robot component modules, wherein the plurality of robot component modules are coupled together; and a suction pump; wherein: the plurality of robot component modules are coupled together in a state in which the internal spaces of the casings thereof are in fluid communication with each other; and the suction pump is capable of sucking the working fluid in the internal spaces being in the fluid communication, thereoutside.

In one embodiment of the present invention, the robot further comprises a fluid-communicating connector for coupling the robot component modules together, the fluid-communicating connector having a through-hole, wherein the casing is formed with an opening in each face thereof, and the fluid-communicating connector is attached to the openings of opposed faces of adjacent ones of the modules, whereby the adjacent modules are coupled together in a state in which the internal spaces of the adjacent modules are fluidically communicated with each other through the through-hole.

In one embodiment of the present invention, the plurality of robot component modules constitute at least a portion of an end effector.

In one embodiment of the present invention, the plurality of robot component modules are coupled and provided along each finger of a patient.

Advantageous Effects of Invention

The present invention makes it possible to realize a modular soft robot having a high degree of freedom of movement.

BRIEF DESCRIPTION OF DRAWINGS

FIG. 1A is a side view showing the overall configuration of a soft robot according to one embodiment of the present invention.

FIG. TOA is a perspective view showing a second deformation-regulating member when the shape of deformation of the voxel during depressurization is bending.

Figure 10A:
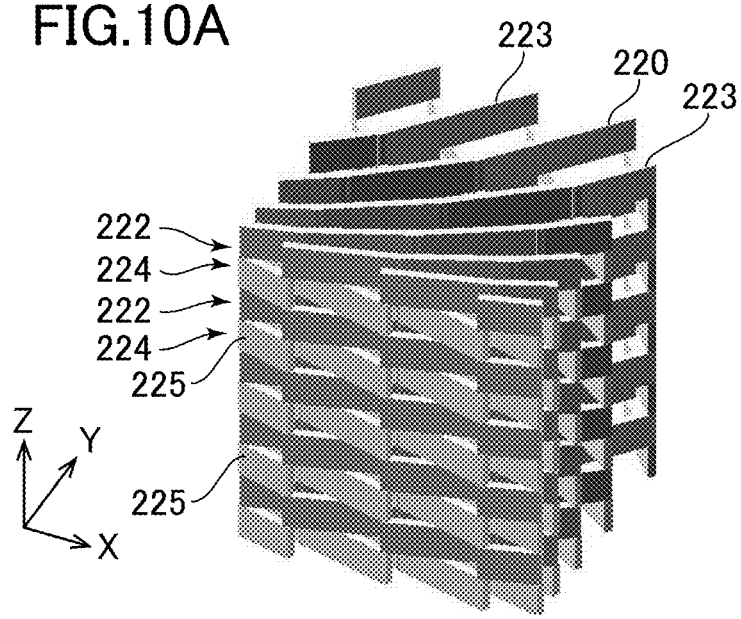
Figure 10B:
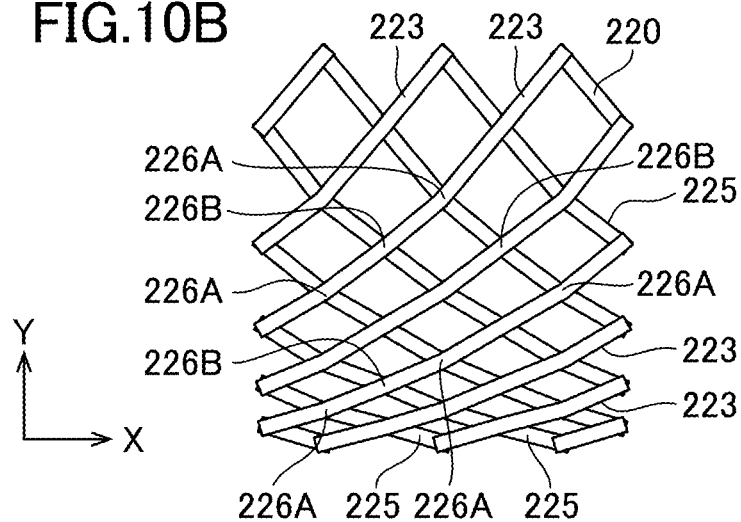

FIG. 10B is a plan view showing the second deformation-regulating member when the shape of deformation of the voxel during depressurization is bending.

Figure 10C:
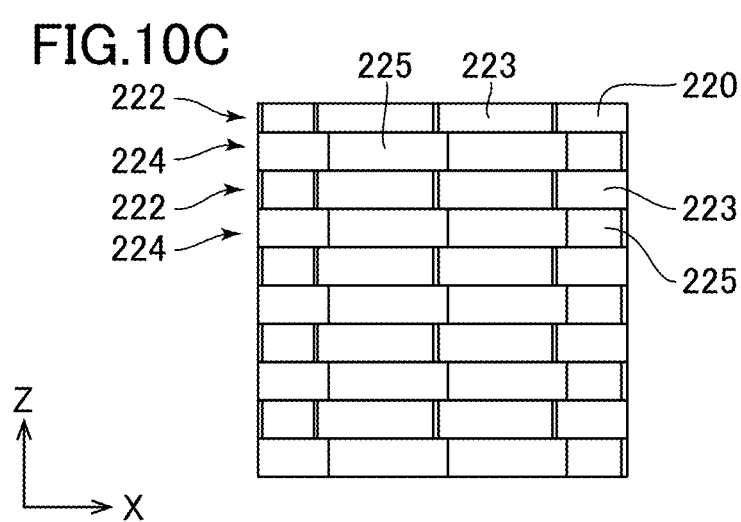

FIG. 10C is a front view showing the second deformation-regulating member when the shape of deformation of the voxel during depressurization is bending.

Figure 11A:
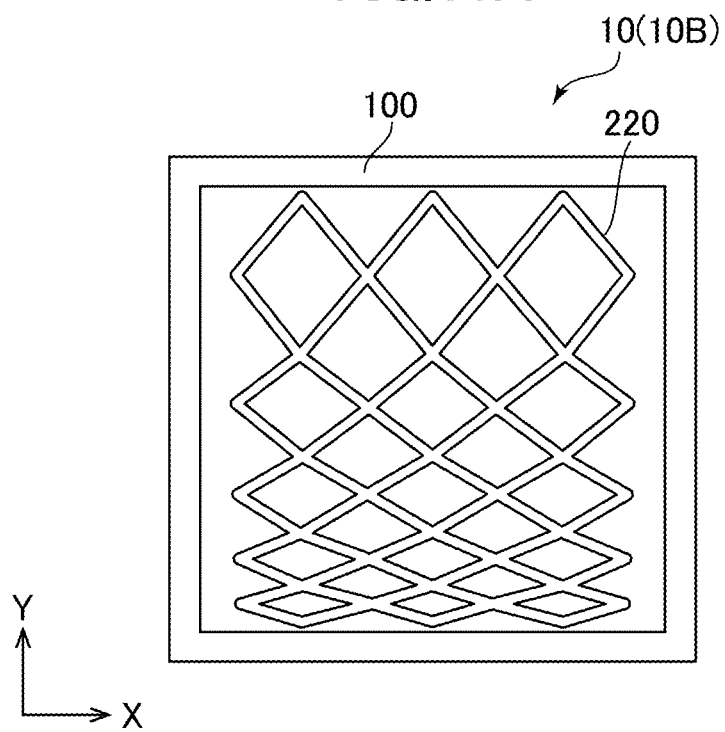

FIG. 11A is a sectional view showing the voxel in which the second deformation-regulating member is housed, in a state before the deformation due to depressurization.

Figure 11B:
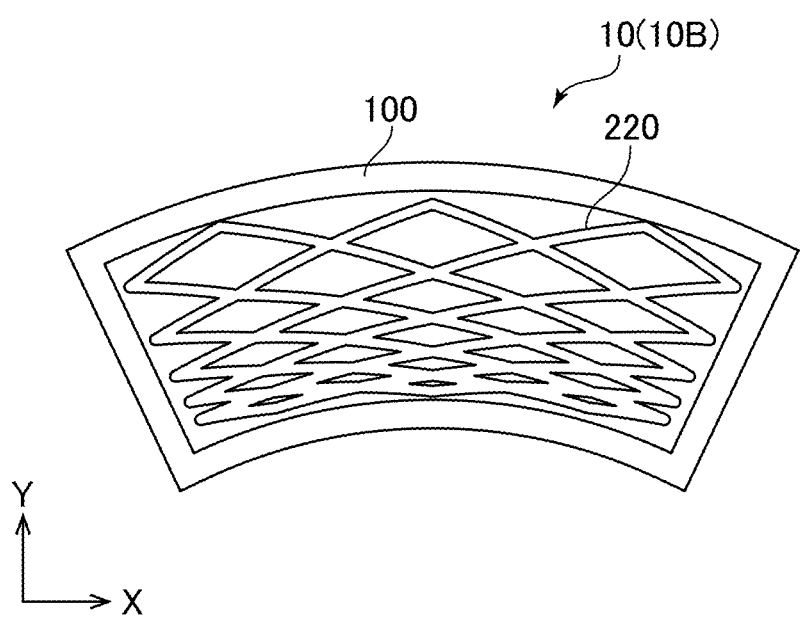

FIG. 11B is a sectional view showing the voxel in which the second deformation-regulating member is housed, in a state after the deformation due to depressurization.

Figure 12A:
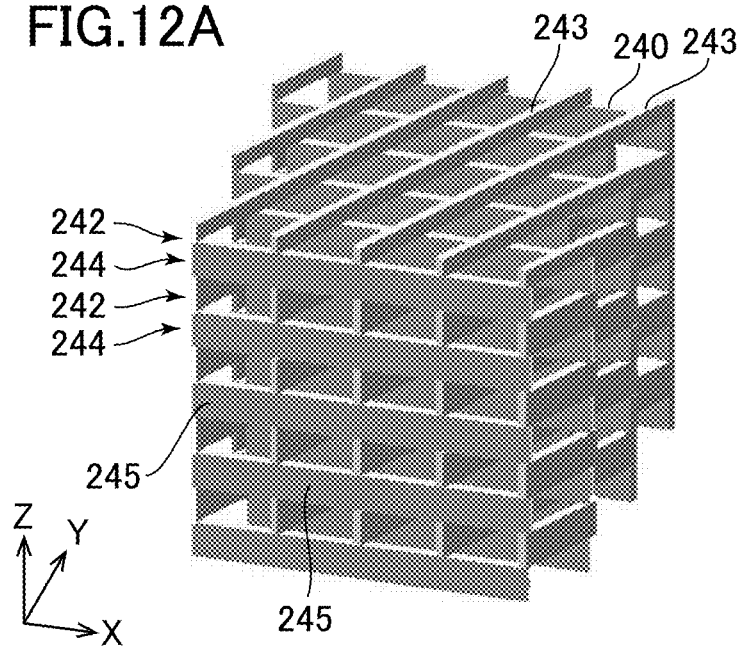

FIG. 12A is a perspective view showing a third deformation-regulating member when the shape of deformation of the voxel during depressurization is shear.

Figure 12B:
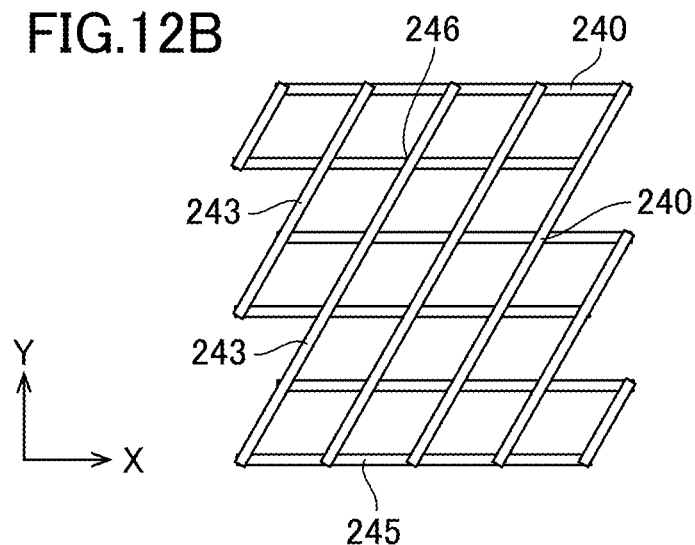

FIG. 12B is a plan view showing the third deformation-regulating member when the shape of deformation of the voxel during depressurization is shear.

Figure 12C:
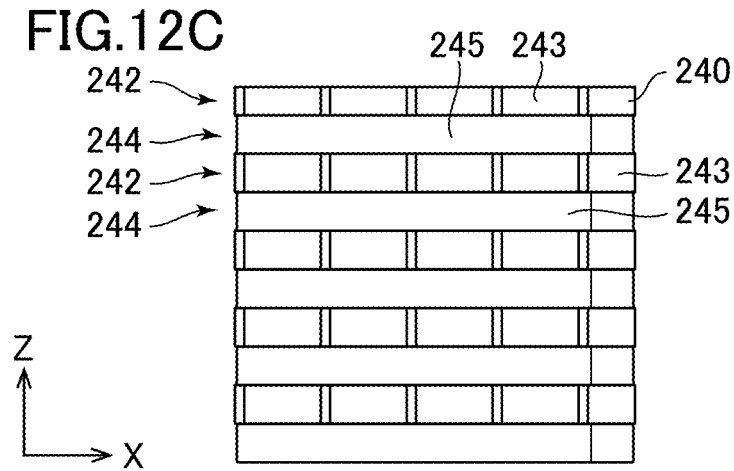

FIG. 12C is a front view showing the third deformation-regulating member when the shape of deformation of the voxel during depressurization is shear.

Figure 13A:
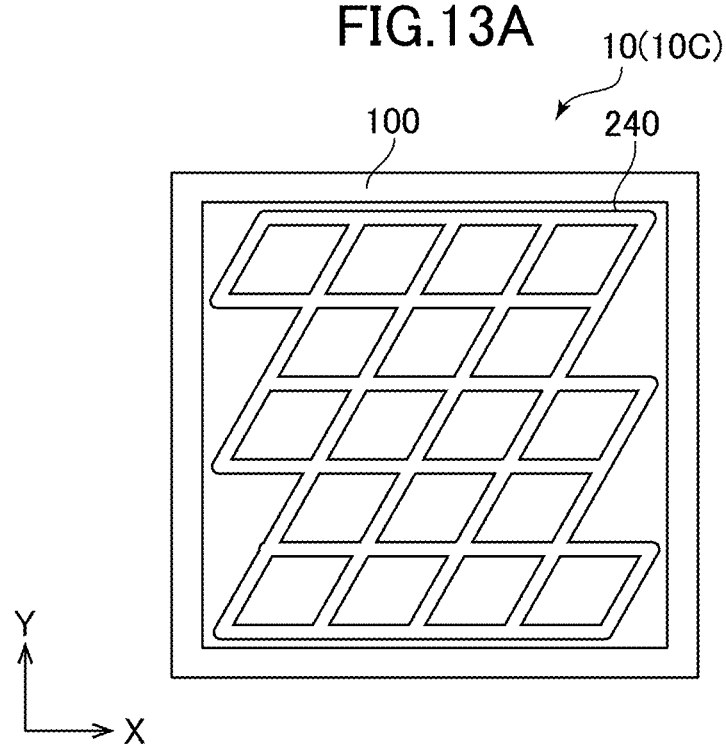

FIG. 13A is a sectional view showing the voxel in which the third deformation-regulating member is housed, in a state before the deformation due to depressurization.

Figure 13B:
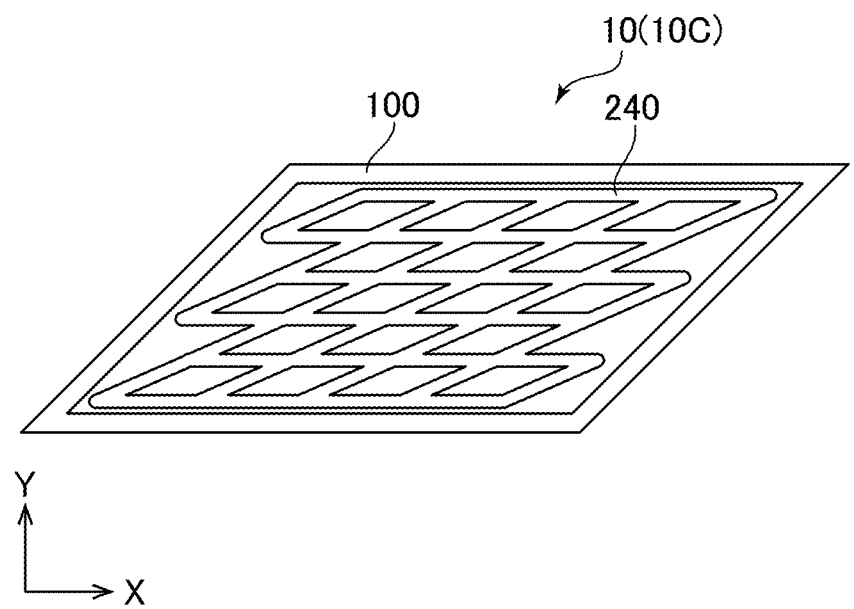

FIG. 13B is a sectional view showing the voxel in which the third deformation-regulating member is housed, in a state after the deformation due to depressurization.

Figure 14A:
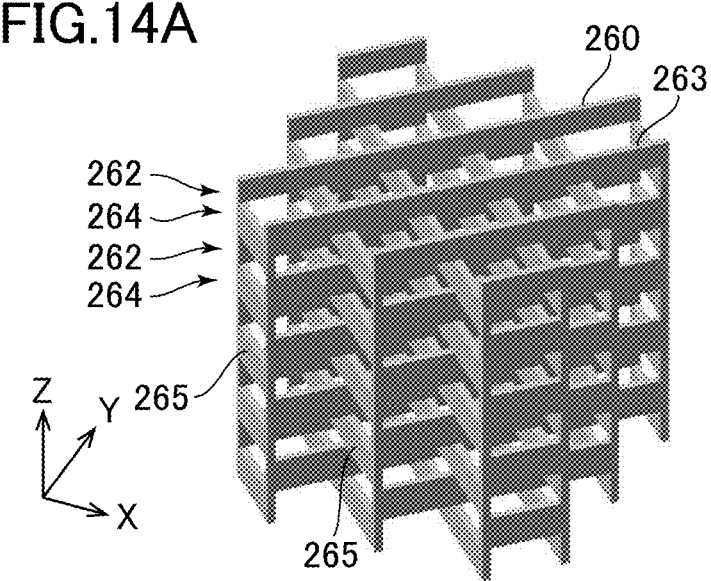

FIG. 14A is a perspective view showing a fourth deformation-regulating member when the shape of deformation of the voxel during depressurization is no-deformation.

Figure 14B:
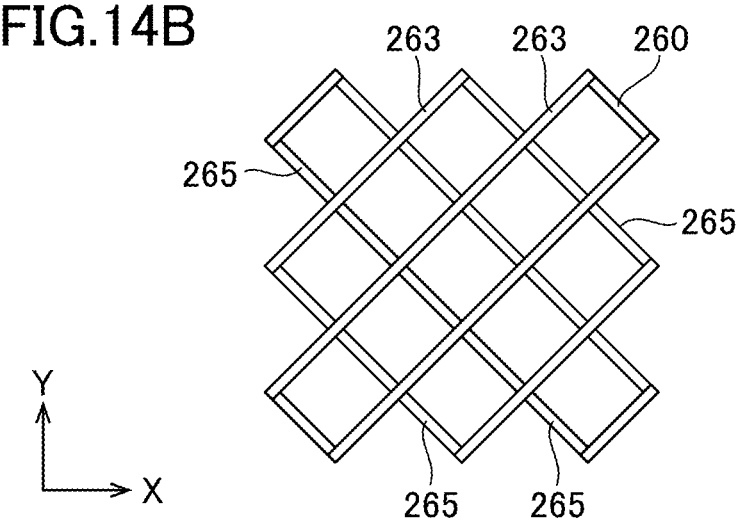

FIG. 14B is a plan view showing the fourth deformation-regulating member when the shape of deformation of the voxel during depressurization is no-deformation.

Figure 14C:
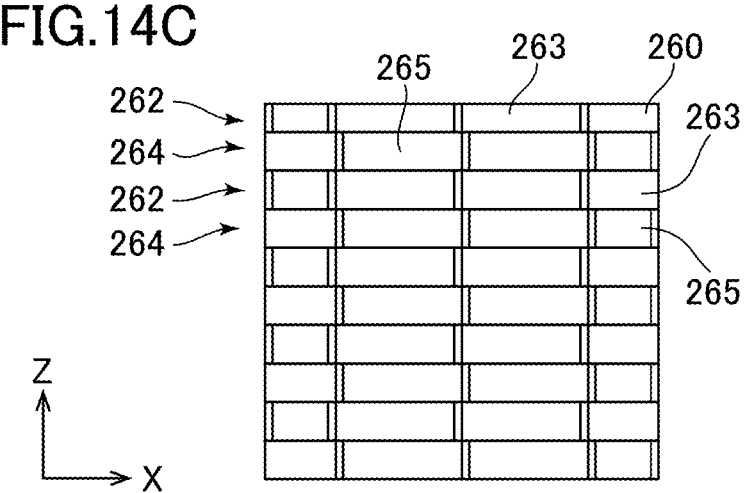

FIG. 14C is a front view showing the fourth deformation-regulating member when the shape of deformation of the voxel during depressurization is no-deformation.

Figure 15A:
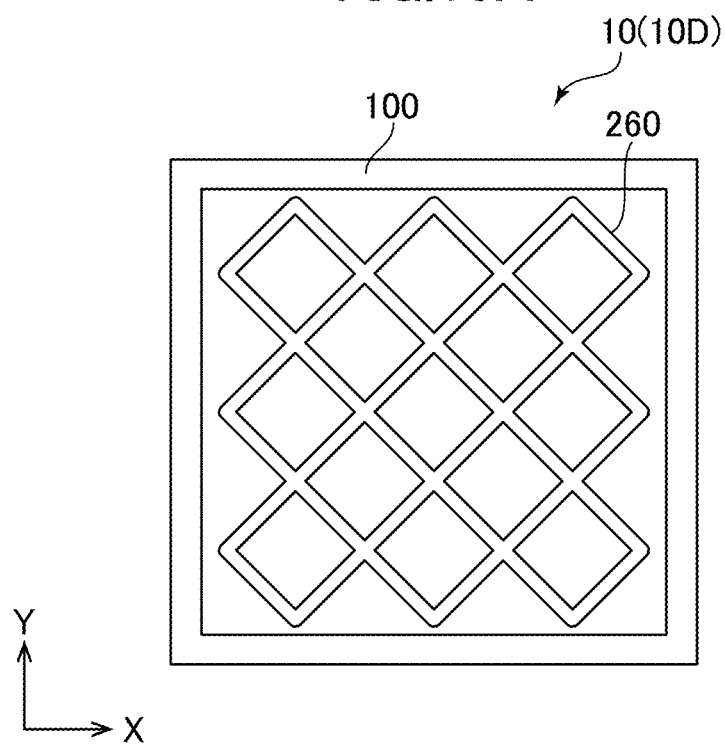

FIG. 15A is a sectional view showing the voxel in which the fourth deformation-regulating member is housed, in a state before the deformation due to depressurization.

Figure 15B:
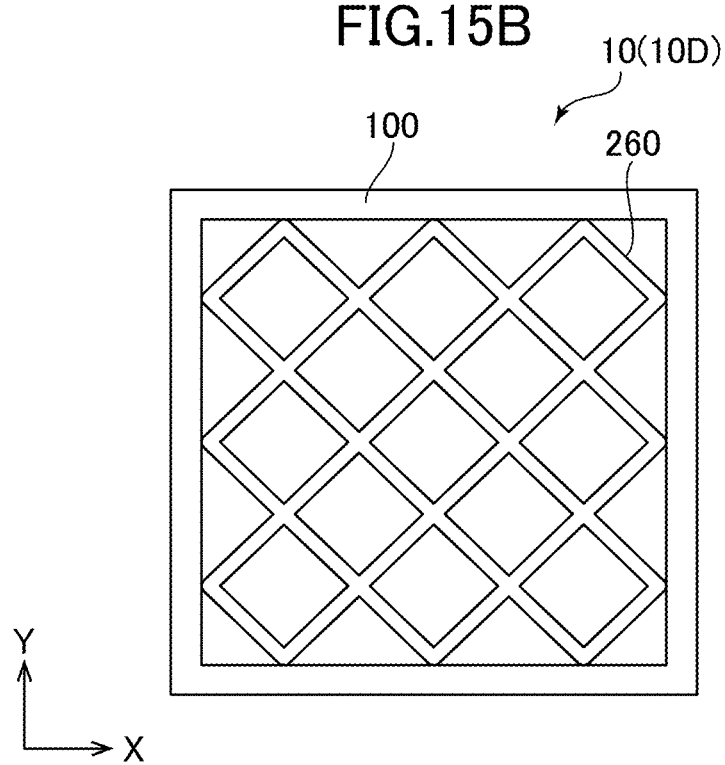

FIG. 15B is a sectional view showing the voxel in which the fourth deformation-regulating member is housed, in a state after the deformation due to depressurization.

Figure 16A:
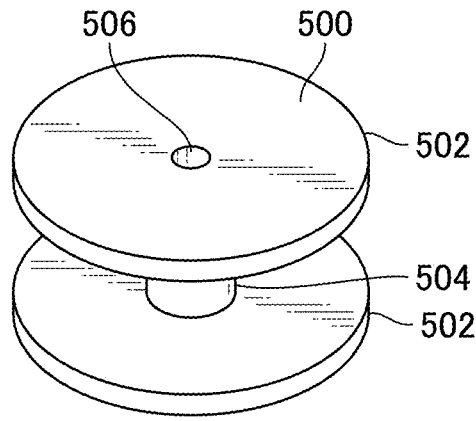

FIG. 16A is a perspective view showing a fluid-communicating connector.

Figure 16B:
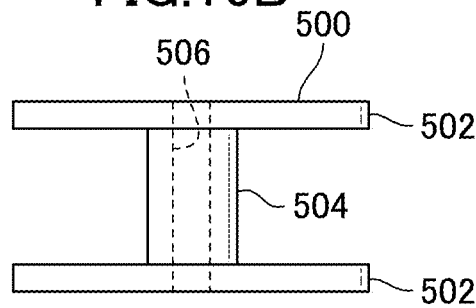

FIG. 16B is a front view showing a fluid-communicating connector.

Figure 16C:
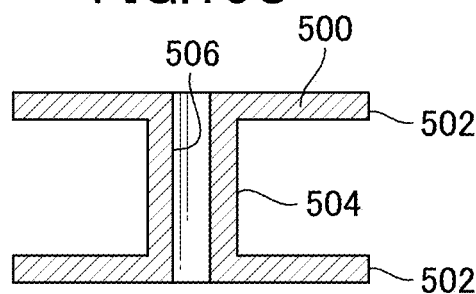

FIG. 16C is a vertical sectional view showing the fluid-communicating connector.

Figure 17:
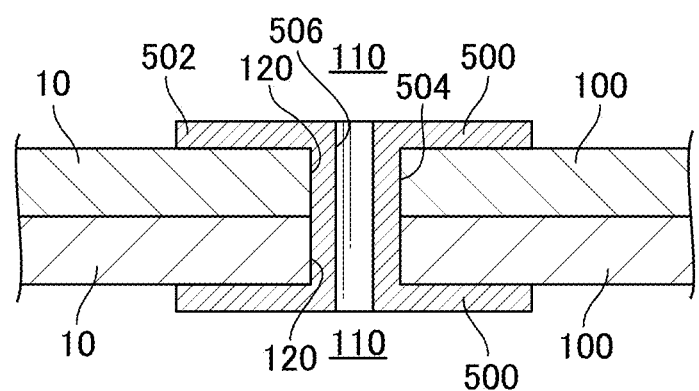

FIG. 17 is an enlarged sectional view showing a state in which opposed side faces of the casings of two voxels are coupled together by the fluid-communicating connector.

Figure 18A:
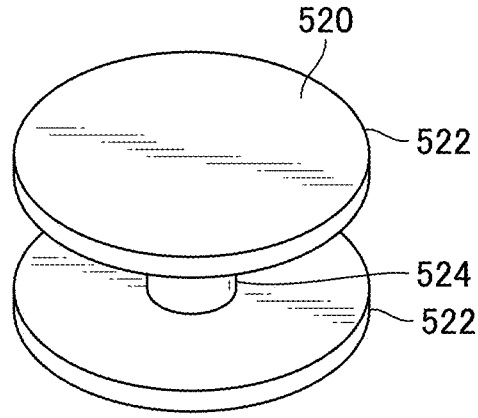

FIG. 18A is a perspective view showing a closing connector.

Figure 18B:
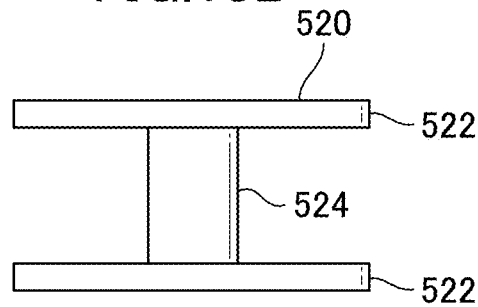

FIG. 18B is a front view showing the closing connector.

Figure 18C:
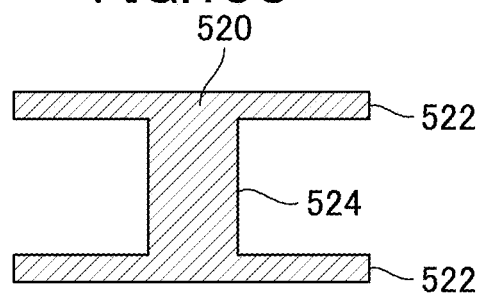

FIG. 18C is a vertical sectional view showing the closing connector.

Figure 19:
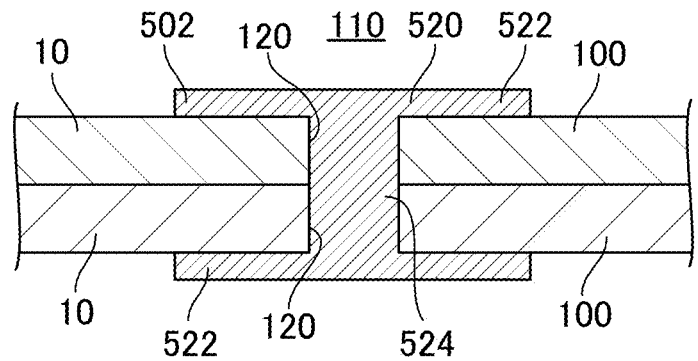

FIG. 19 is an enlarged sectional view showing a state in which opposed side faces of the casings of two voxels are coupled together by the closing connector.

Figure 20A:
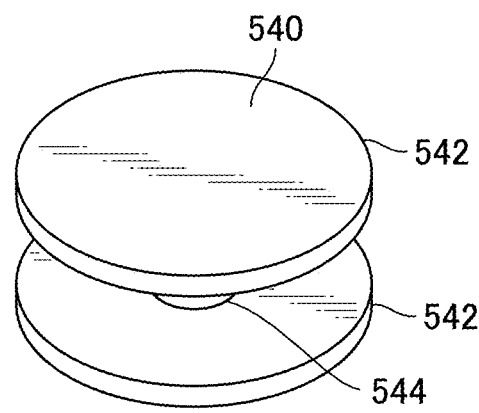

FIG. 20A is a perspective view showing a first sealing member.

Figure 20B:
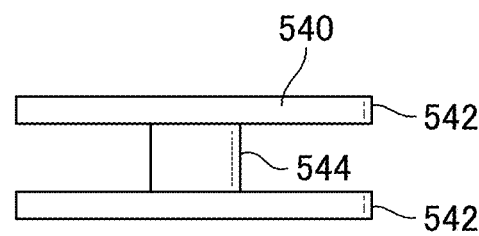

FIG. 20B is a front view showing the first sealing member.

Figure 20C:
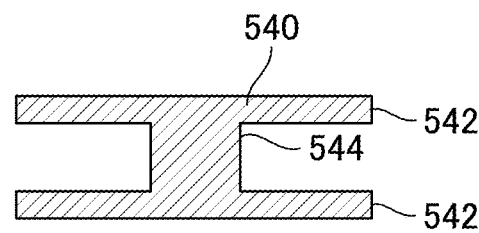

FIG. 20C is a vertical sectional view showing the first sealing member.

Figure 21:
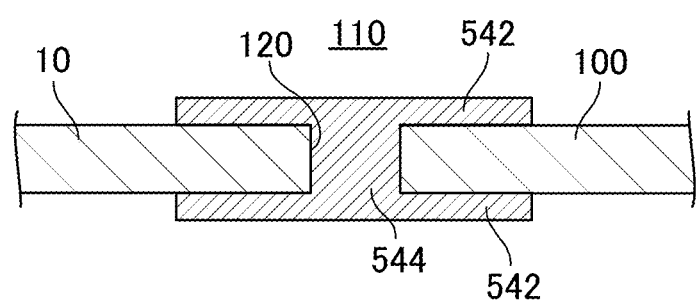

FIG. 21 is an enlarged sectional view showing a state in which an opening of the casing of the voxel is sealed by the first sealing member.

Figure 22A:
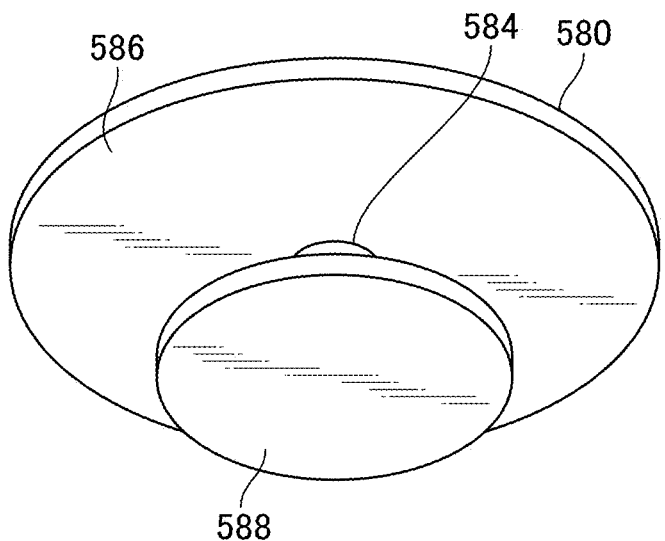

FIG. 22A is a perspective view showing a second sealing member.

Figure 22B:
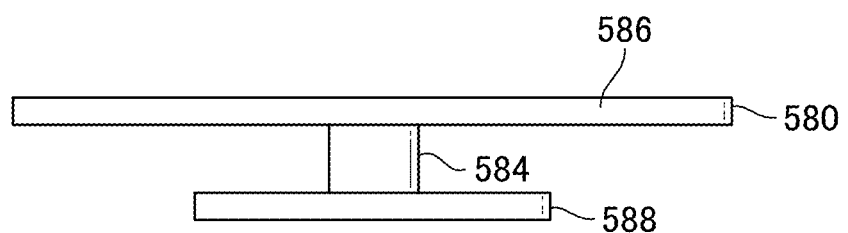

FIG. 22B is a front view showing the second sealing member.

Figure 22C:
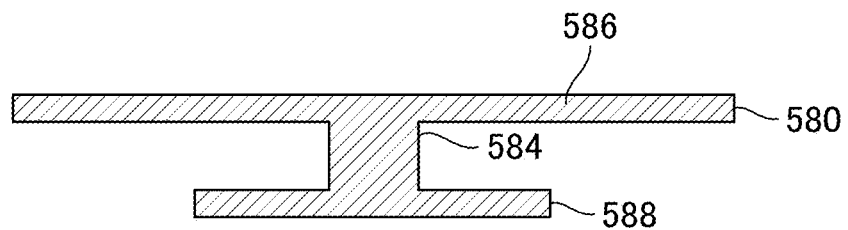

FIG. 22C is a vertical sectional view showing the second sealing member.

Figure 23:
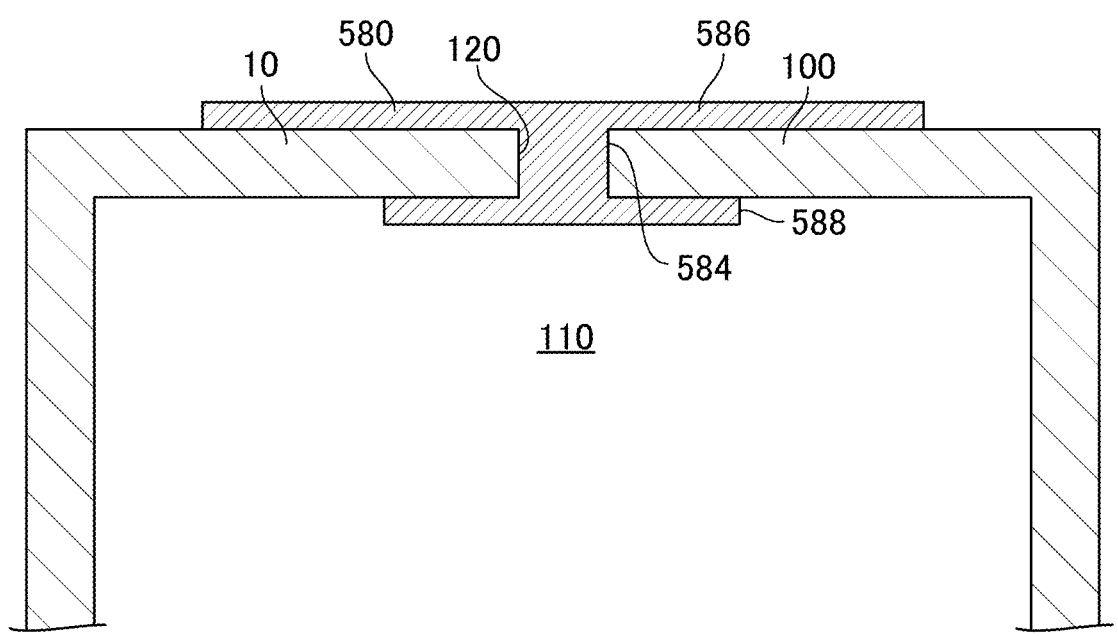

FIG. 23 is an enlarged sectional view showing a state in which an opening of the casing of the voxel is sealed by the second sealing member.

Figure 24A:
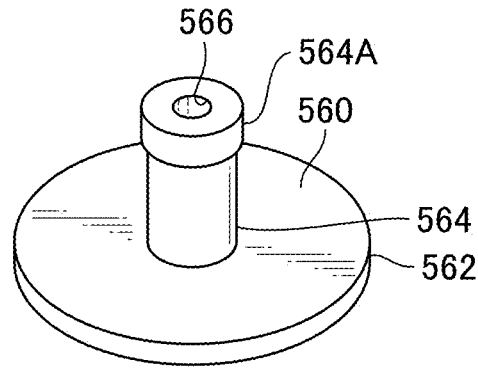

FIG. 24A is a perspective view showing a tube connector.

Figure 24B:
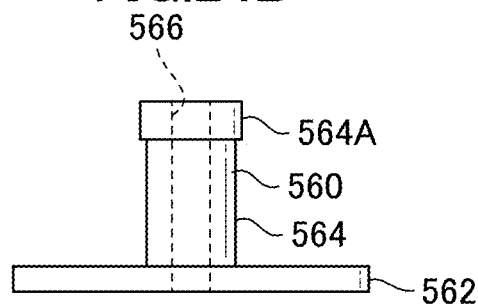

FIG. 24B is a front view showing the tube connector.

Figure 24C:
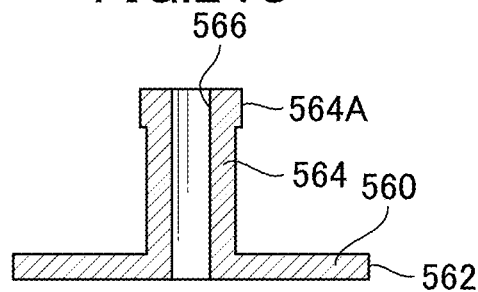

FIG. 24C is a vertical sectional view showing the tube connector.

Figure 25:
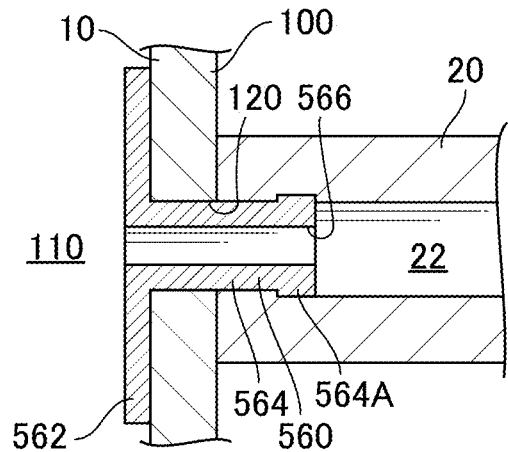

FIG. 25 is an enlarged sectional view showing a state in which a silicone tube is connected to the voxel by the tube connector.

Figure 26:
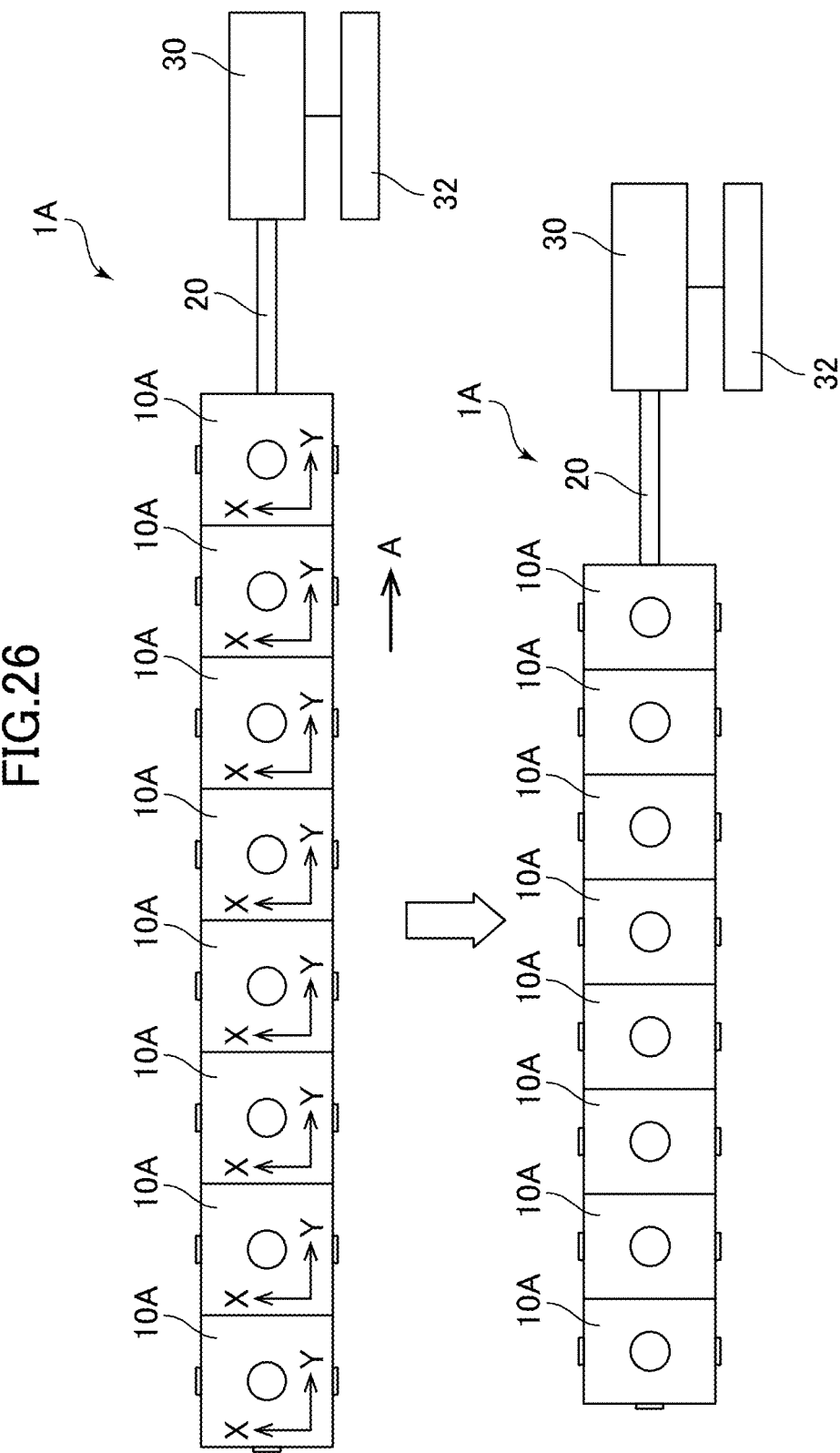

FIG. 26 is a plan view showing pre- and post-deformation shapes of a soft robot according to an embodiment in which a contraction type voxel is applied to all voxels of the robot illustrated in FIG. 1.

Figure 27:
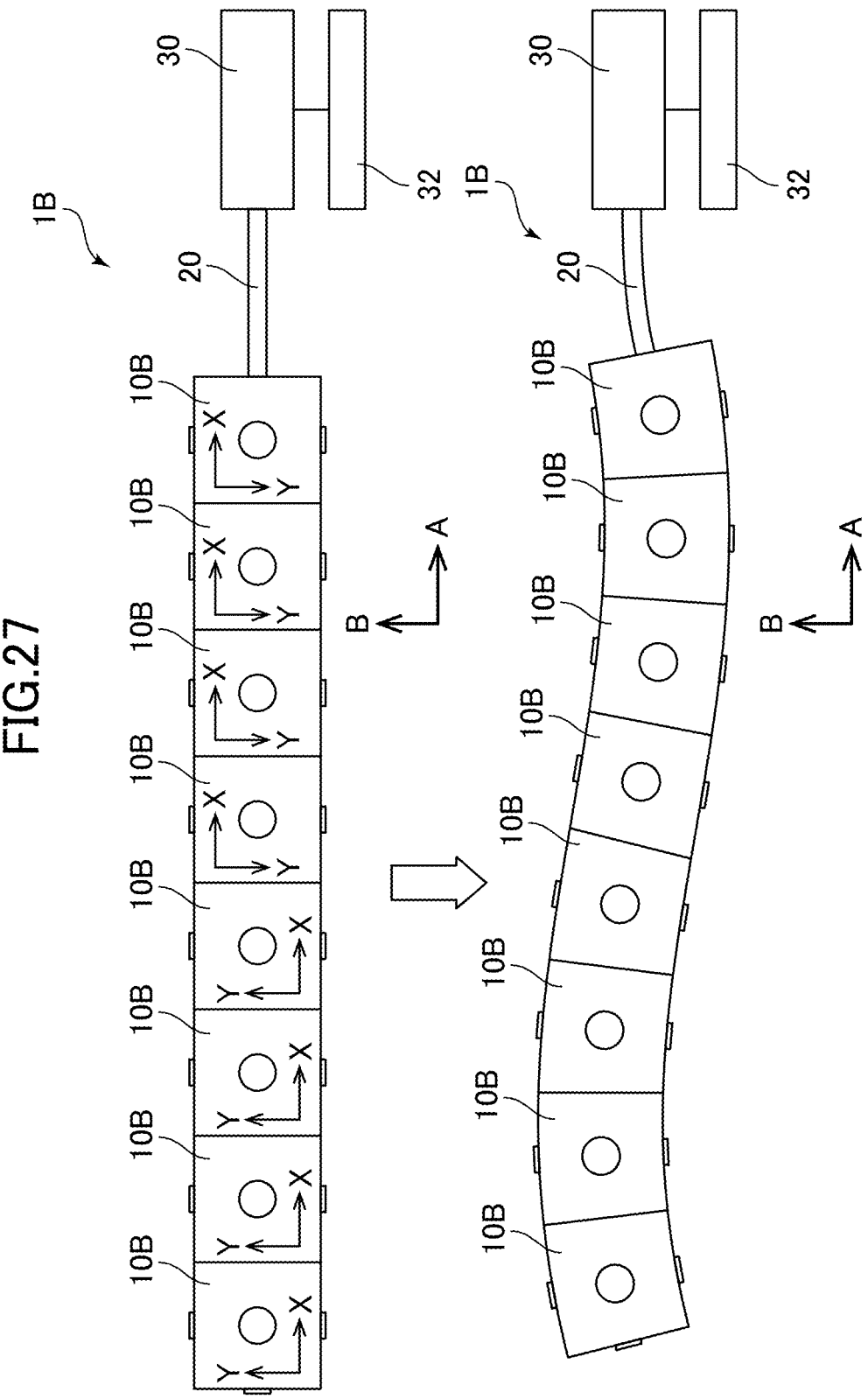

FIG. 27 illustrates pre- and post-deformation shapes of a soft robot according to an embodiment in which a bending type voxel is applied to all voxels of the robot illustrated in FIG. 1.

Figure 28:
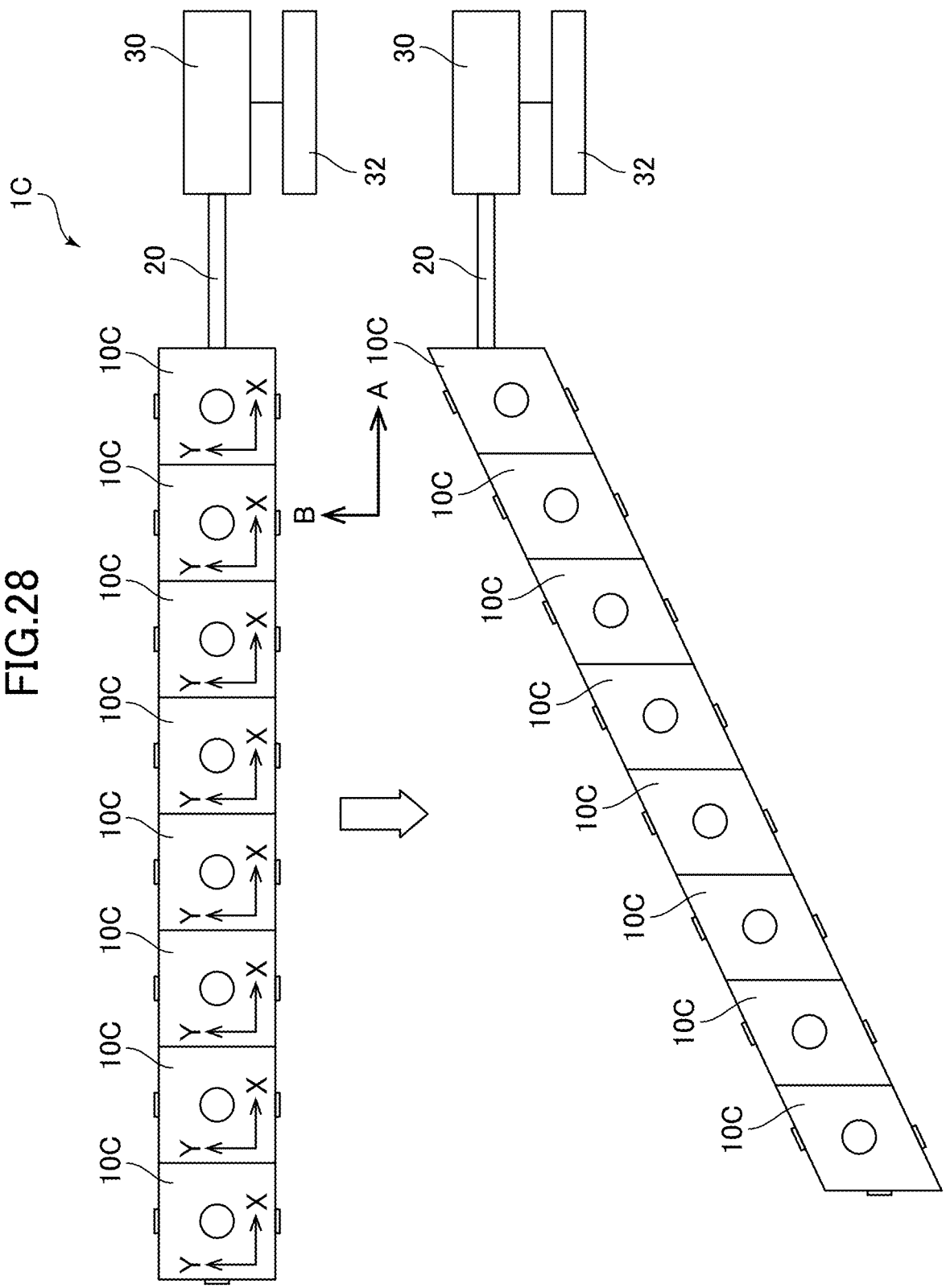

FIG. 28 illustrates pre- and post-deformation shapes of a soft robot according to an embodiment in which a shear type voxel is applied to all voxels of the robot illustrated in FIG. 1.

FIG. 29 illustrates pre- and post-deformation shapes of a soft robot according to an embodiment in which a shear type voxel is applied to all voxels of the robot illustrated in FIG. 1.

Figure 30A:
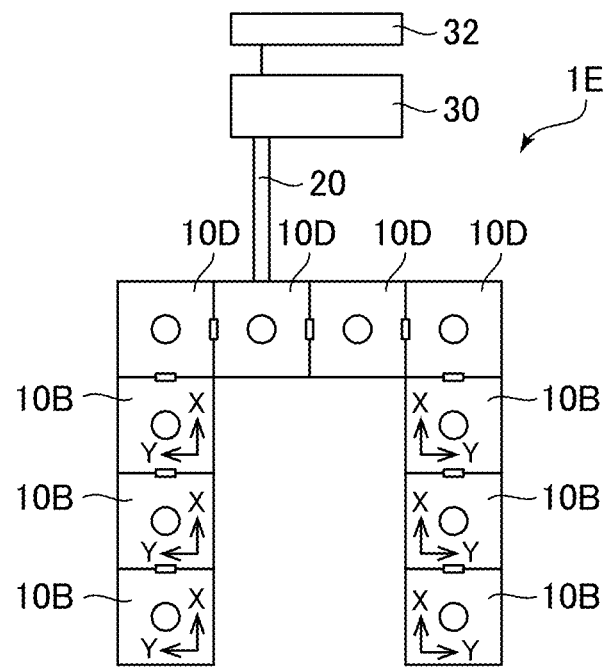

FIG. 30A is a front view showing the configuration of a soft robot as a first assembly example, in a pre-deformation state.

Figure 30B:
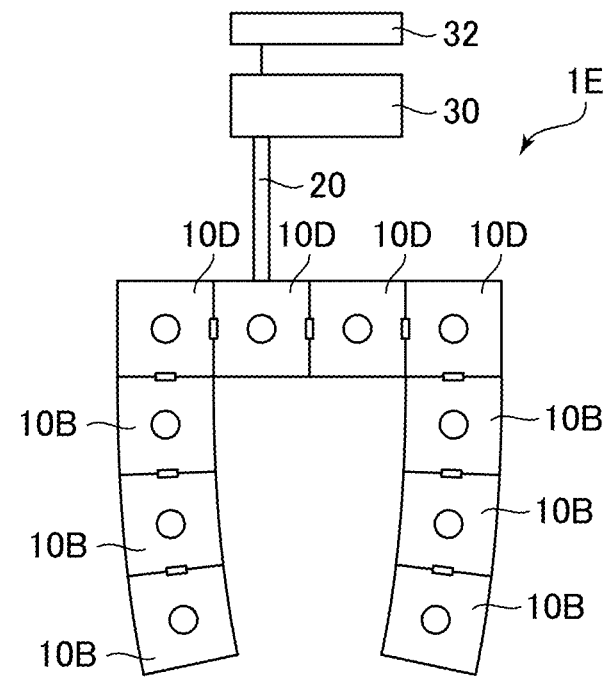

FIG. 30B is a front view showing the configuration of the soft robot as the first assembly example, in a post-deformation state.

Figure 31A:
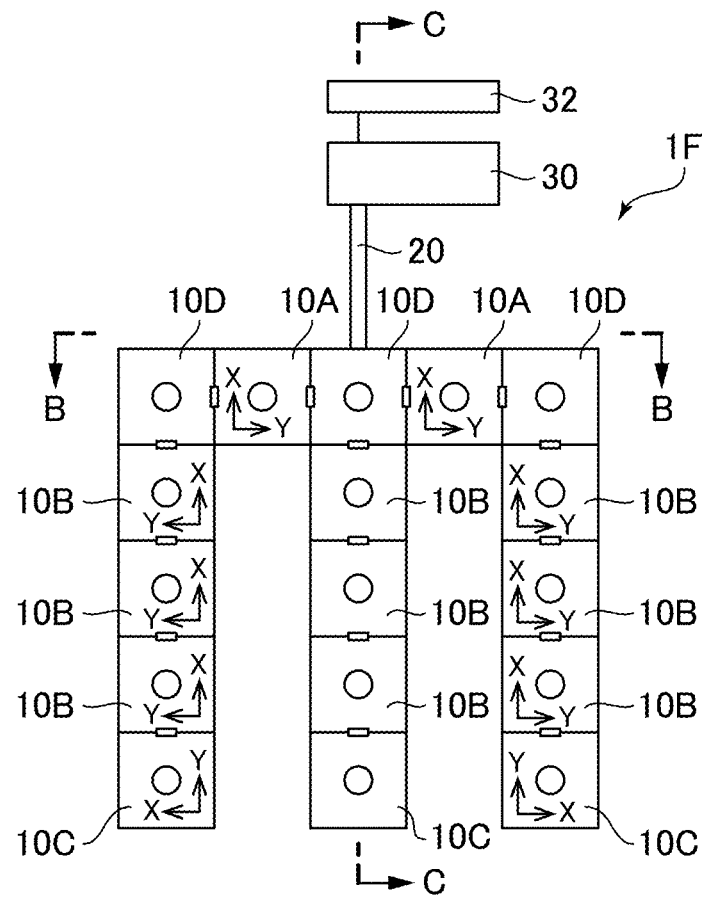

FIG. 31A is a front view showing the configuration of a soft robot as a second assembly example, in a pre-deformation state.

Figure 31B:
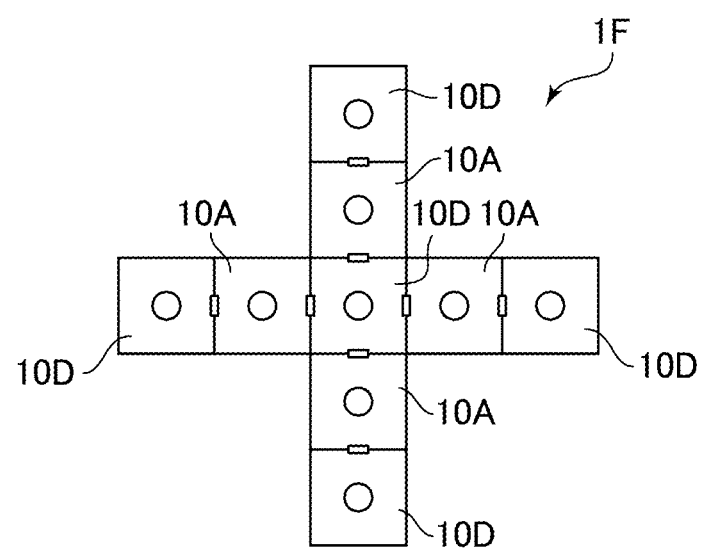

FIG. 31B is a sectional view of B-B in FIG. 31A.

Figure 31C:
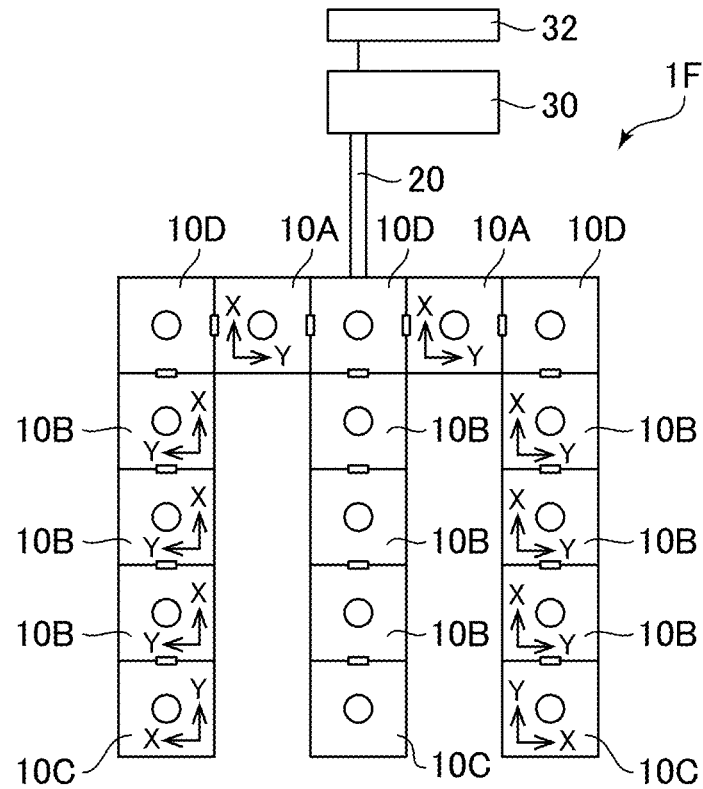

FIG. 31C is a sectional view of C-C in FIG. 31A.

Figure 31D:
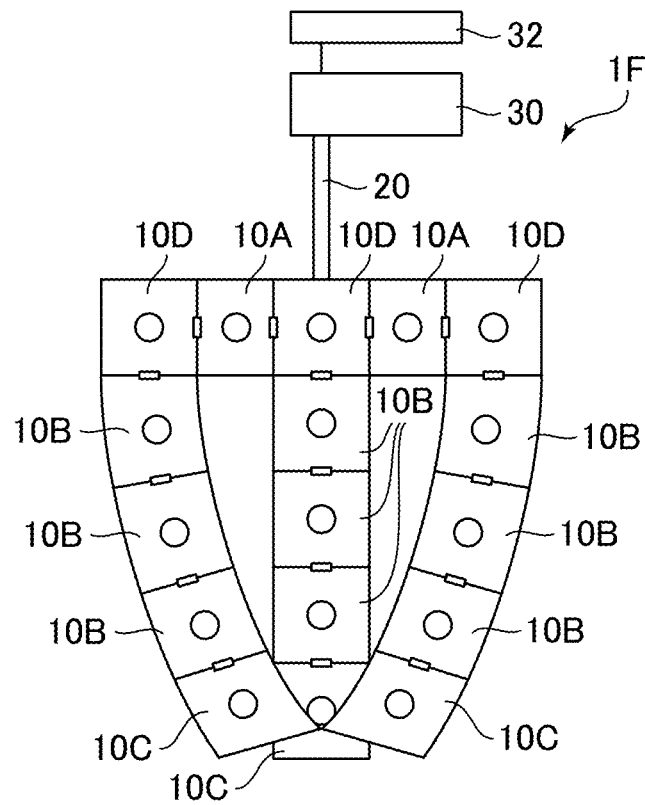

FIG. 31D is a front view showing the configuration of the soft robot as the second assembly example, in a post-deformation state.

Figure 32A:
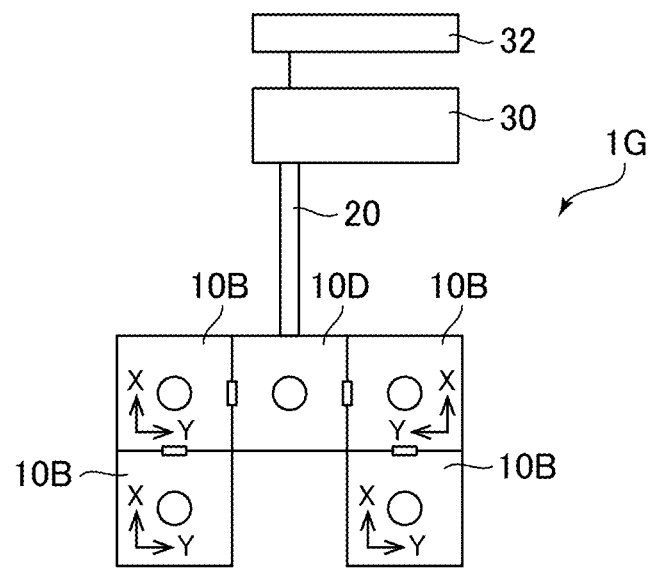

FIG. 32A is a front view showing the configuration of a soft robot as a third assembly example, in a pre-deformation state.

Figure 32B:
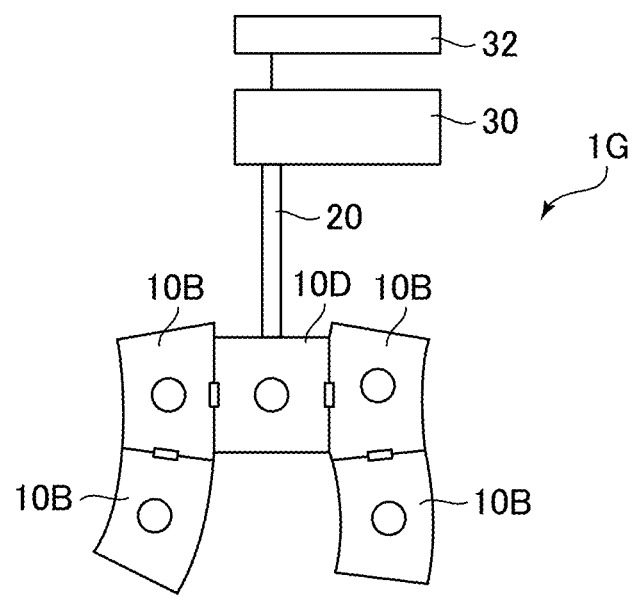

FIG. 32B is a front view showing the configuration of the soft robot as the third assembly example, in a post-deformation state.

Figure 33A:
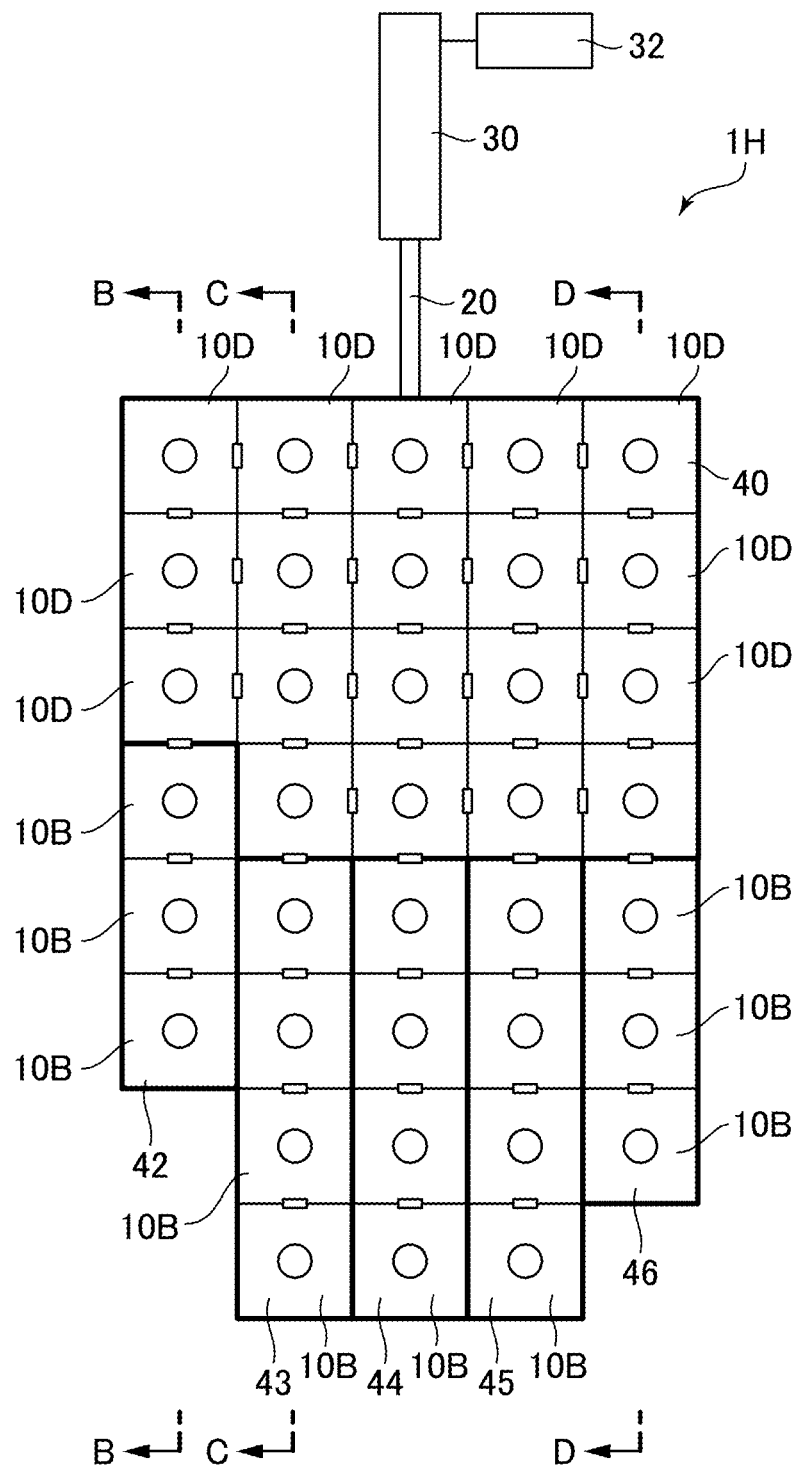

FIG. 33A is a front view showing the configuration of a soft robot as a fourth assembly example, in a pre-deformation state.

Figure 33B:
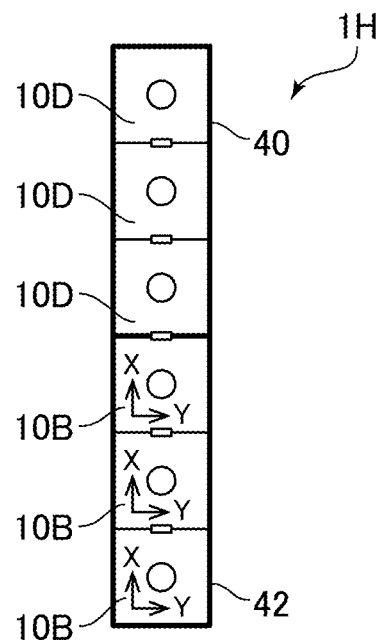

FIG. 33B is a sectional view of B-B in FIG. 33A.

Figure 33C:
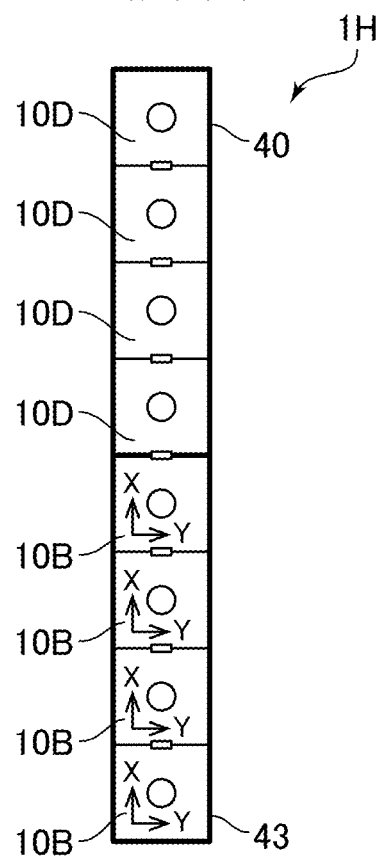

FIG. 33C is a sectional view of C-C in FIG. 33A.

Figure 33D:
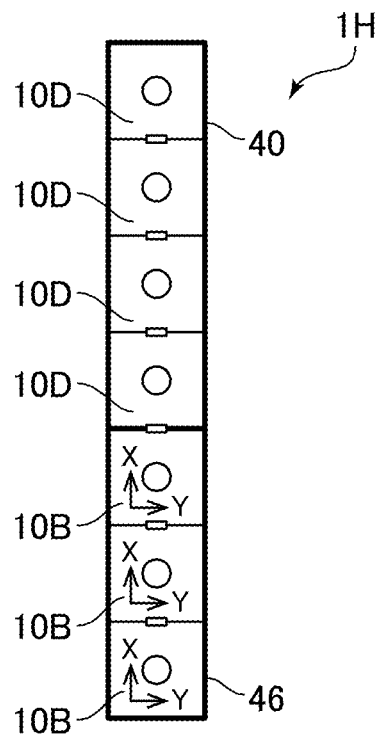

FIG. 33D is a sectional view of D-D in FIG. 33A.

Figure 33E:
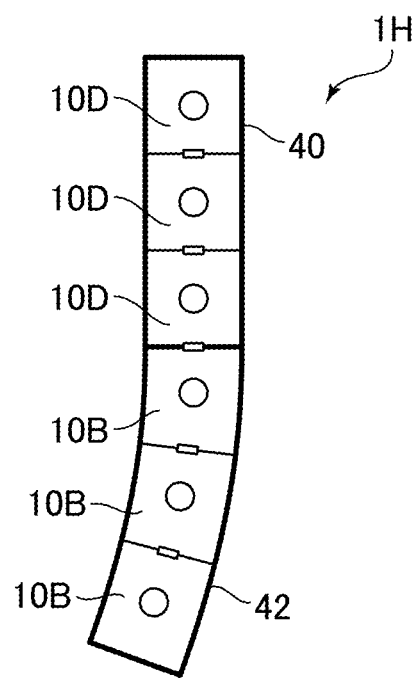

FIG. 33E is a sectional view of B-B in FIG. 33A in a post-deformation state.

Figure 33F:
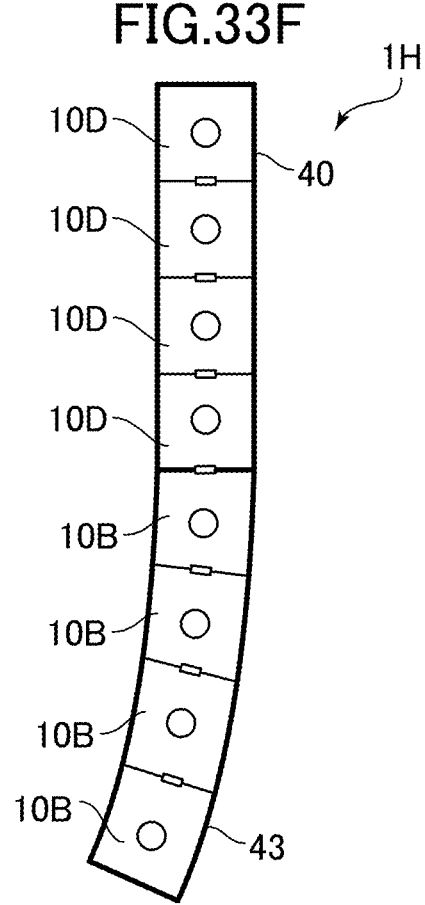

FIG. 33F is a sectional view of C-C in FIG. 33A in the post-deformation state.

Figure 33G:
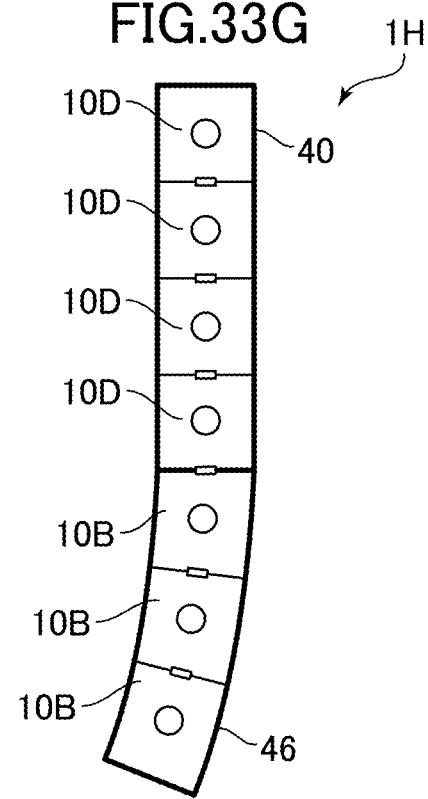

FIG. 33G is a sectional view of D-D in FIG. 33A in the post-deformation state.

Figure 34:
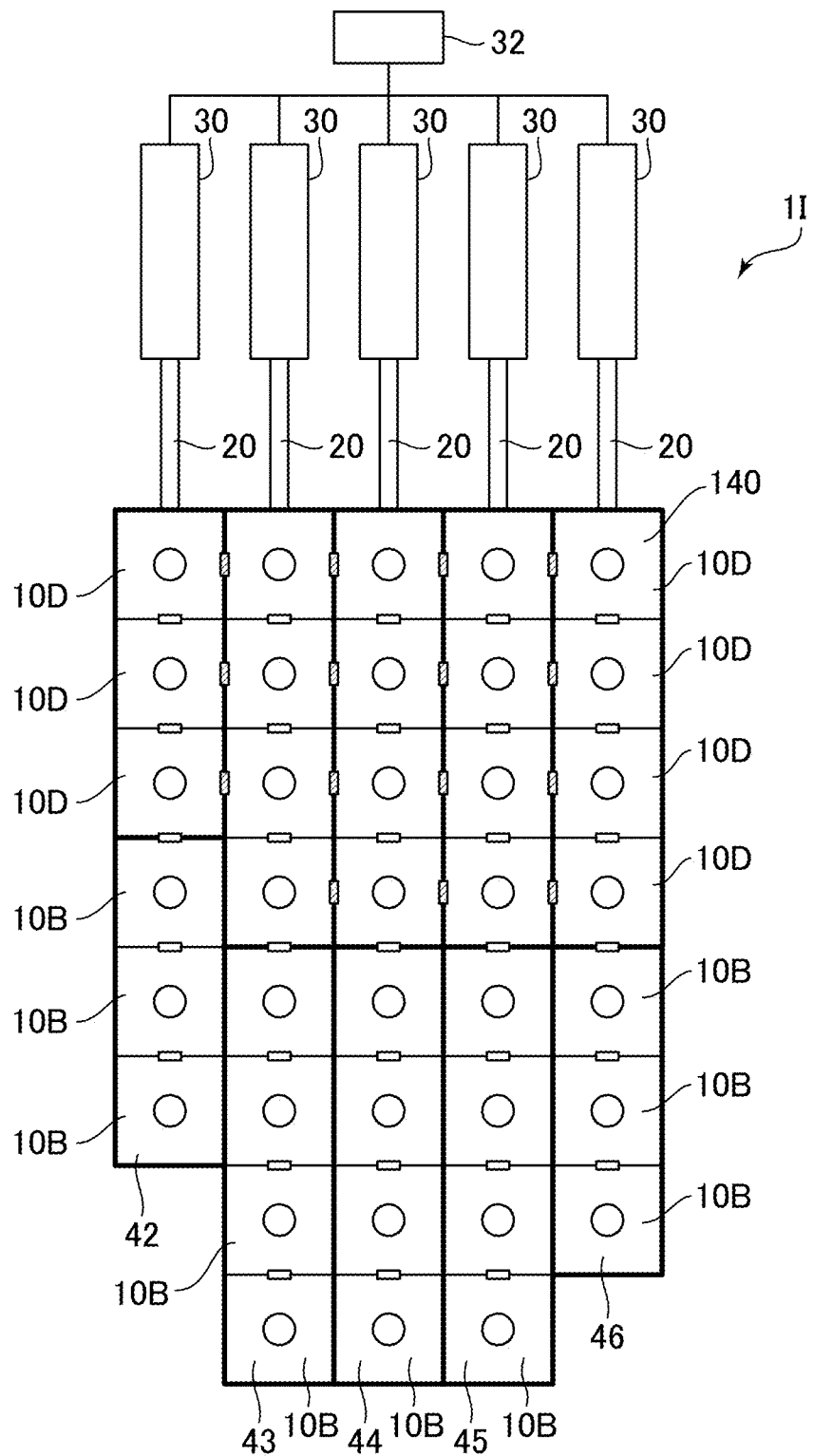

FIG. 34 is a front view showing the configuration of a soft robot as a fifth assembly example.

Figure 35A:
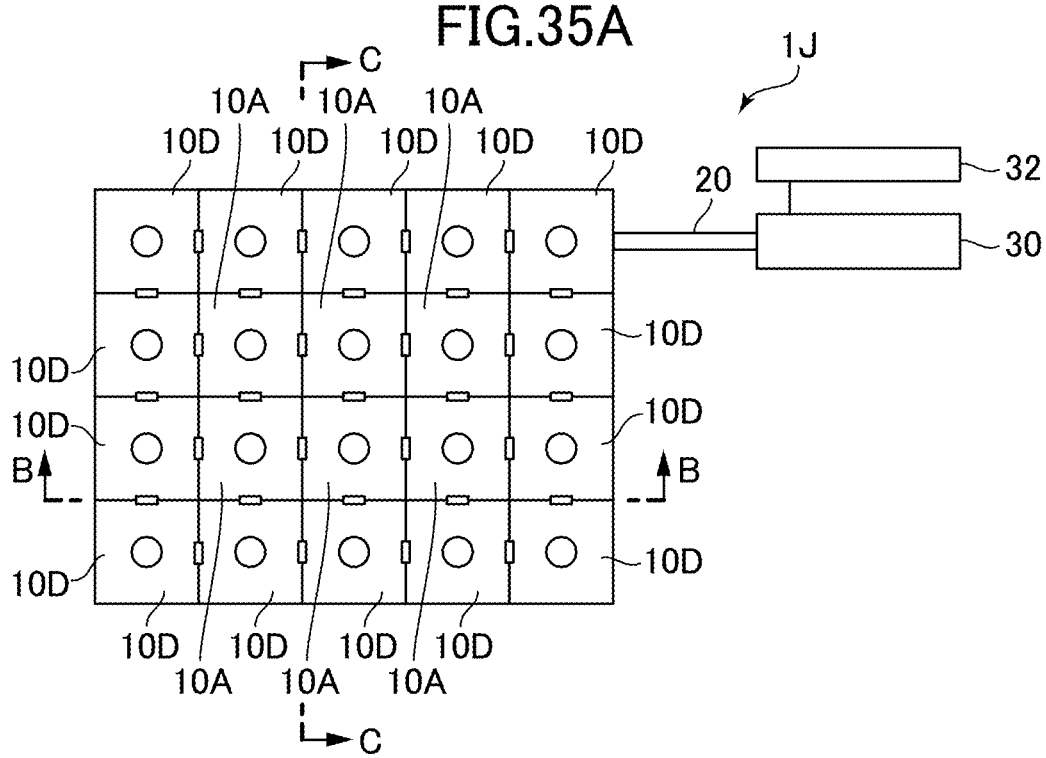

FIG. 35A is a top view showing the configuration of a soft robot as a sixth assembly example, in a pre-deformation state.

Figure 35B:
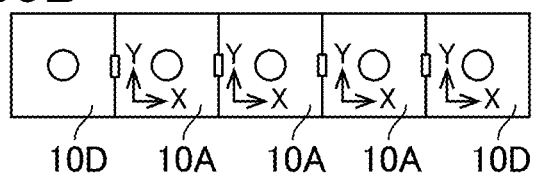

FIG. 35B is a sectional view of B-B in FIG. 35A in a pre-deformation state.

Figure 35C:
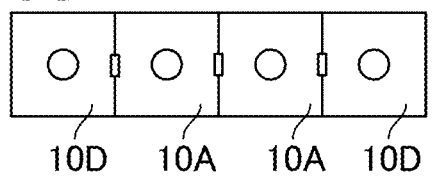

FIG. 35C is a sectional view of C-C in FIG. 35A in the pre-deformation state.

Figure 35D:
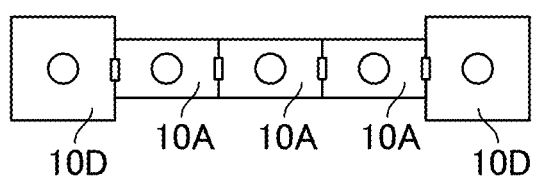

FIG. 35D is a sectional view of B-B in FIG. 35A in a post-deformation state.

Figure 35E:
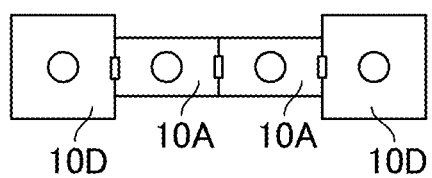

FIG. 35E is a sectional view of C-C in FIG. 35A in the post-deformation state.

Figure 36A:
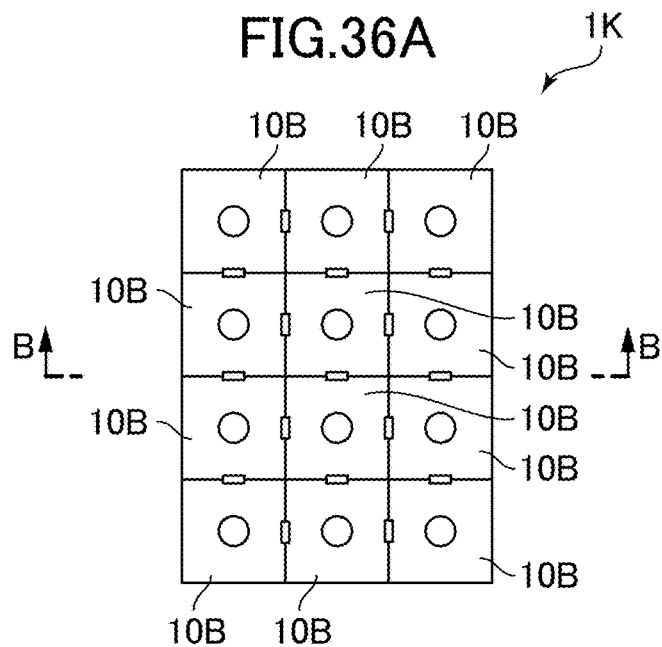

FIG. 36A is a top view showing the configuration of a soft robot as a seventh assembly example, in a pre-deformation state.

Figure 36B:
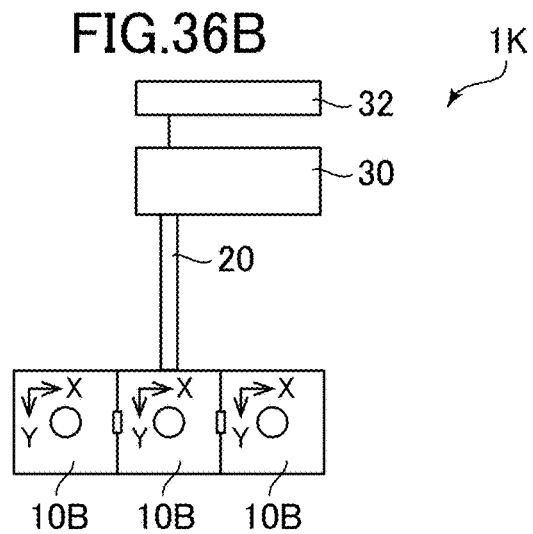

FIG. 36B is a sectional view of B-B in FIG. 36A in the pre-deformation state.

Figure 36C:
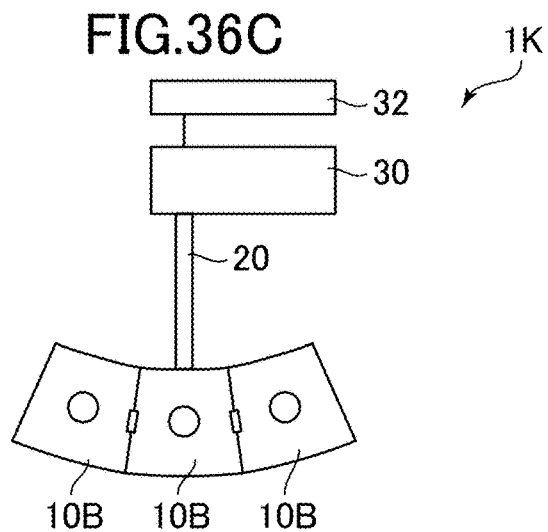

FIG. 36C is a sectional view of B-B in FIG. 36A in a post-deformation state.

Figure 37A:
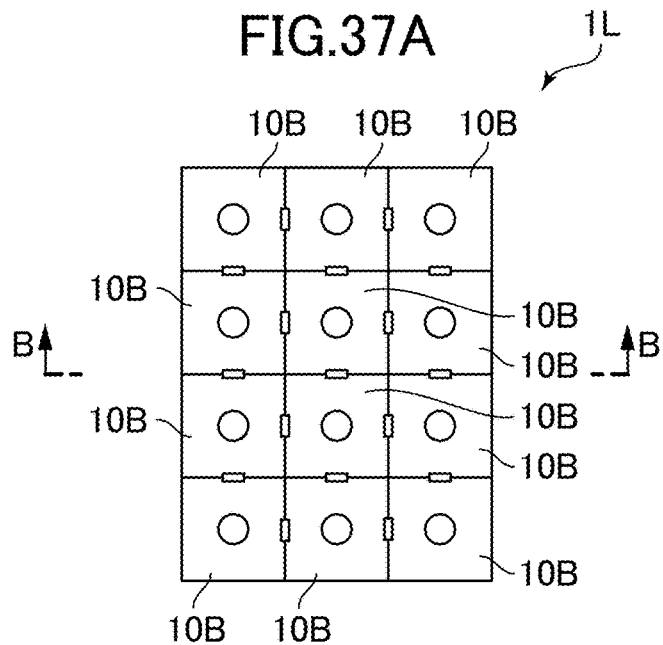

FIG. 37A is a top view showing the configuration of a soft robot as an eighth assembly example, in a pre-deformation state.

Figure 37B:
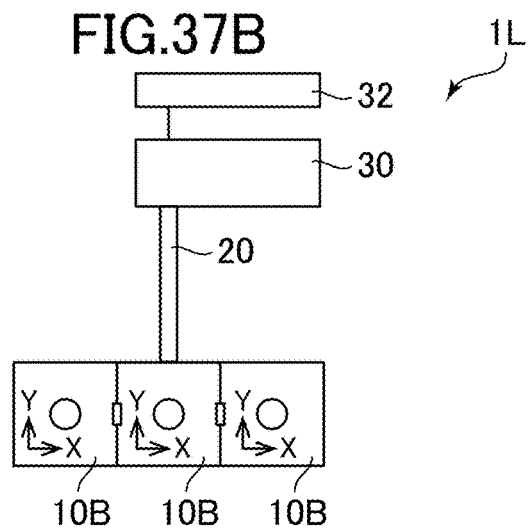

FIG. 37B is a sectional view of B-B in FIG. 37A in the pre-deformation state.

Figure 37C:
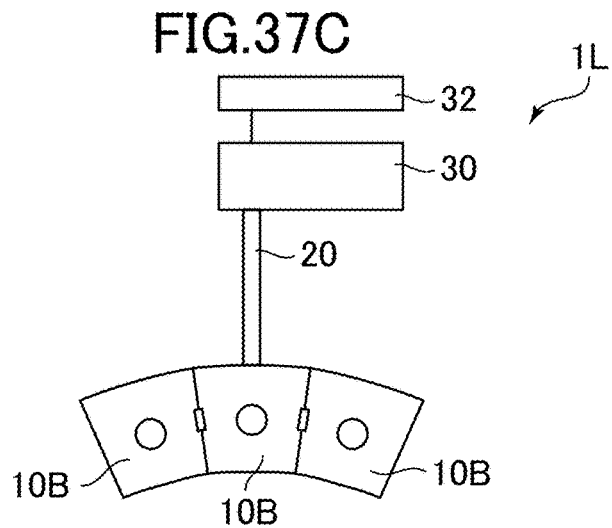

FIG. 37C is a sectional view of B-B in FIG. 37A in a post-deformation state.

Figure 38A:
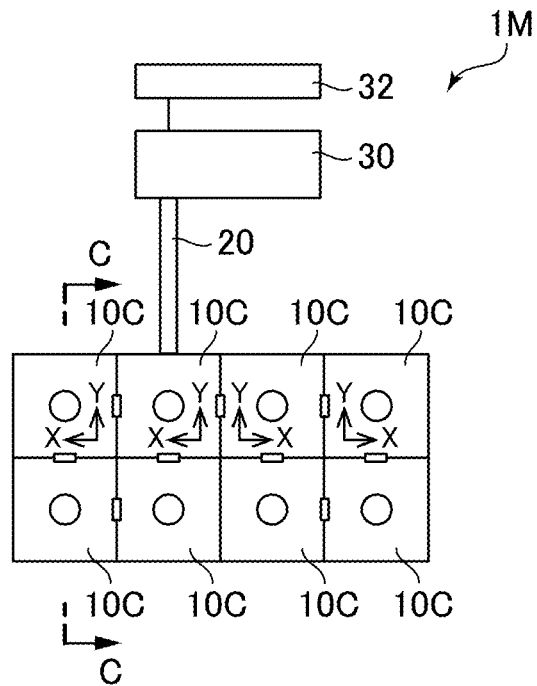

FIG. 38A is a top view showing the configuration of a soft robot as a ninth assembly example, in a pre-deformation state.

Figure 38B:
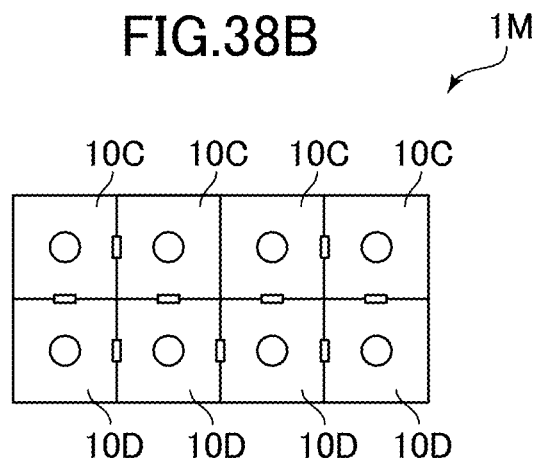

FIG. 38B is a front view showing the configuration of the soft robot as the ninth assembly example, in the pre-deformation state.

Figure 38C:
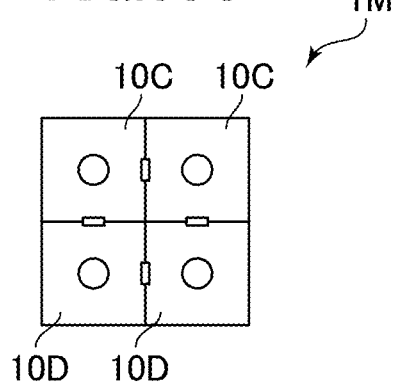

FIG. 38C is a sectional view of C-C in FIG. 38A in the pre-deformation state.

Figure 38D:
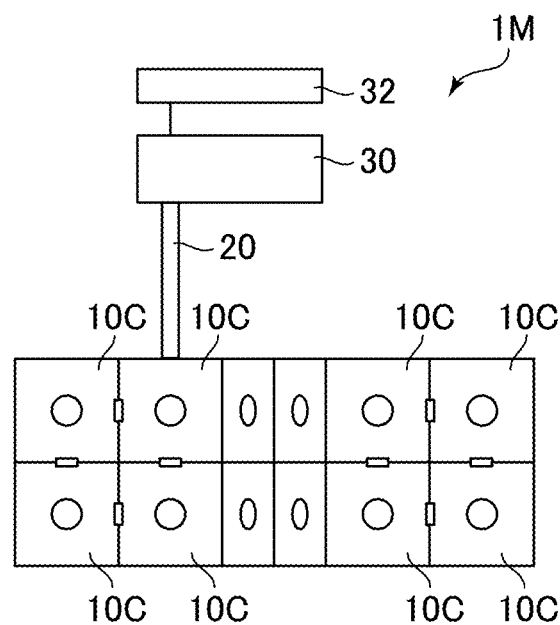

FIG. 38D is a top view showing the configuration of the soft robot as the ninth assembly example, in a post-deformation state.

Figure 38E:
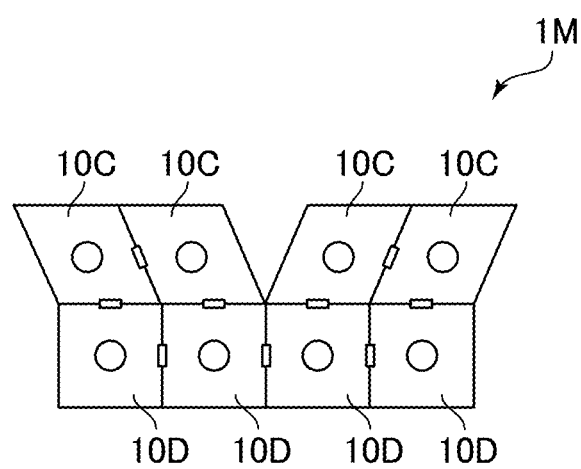

FIG. 38E is a front view showing the configuration of the soft robot as the ninth assembly example, in the post-deformation state.

Figure 39:
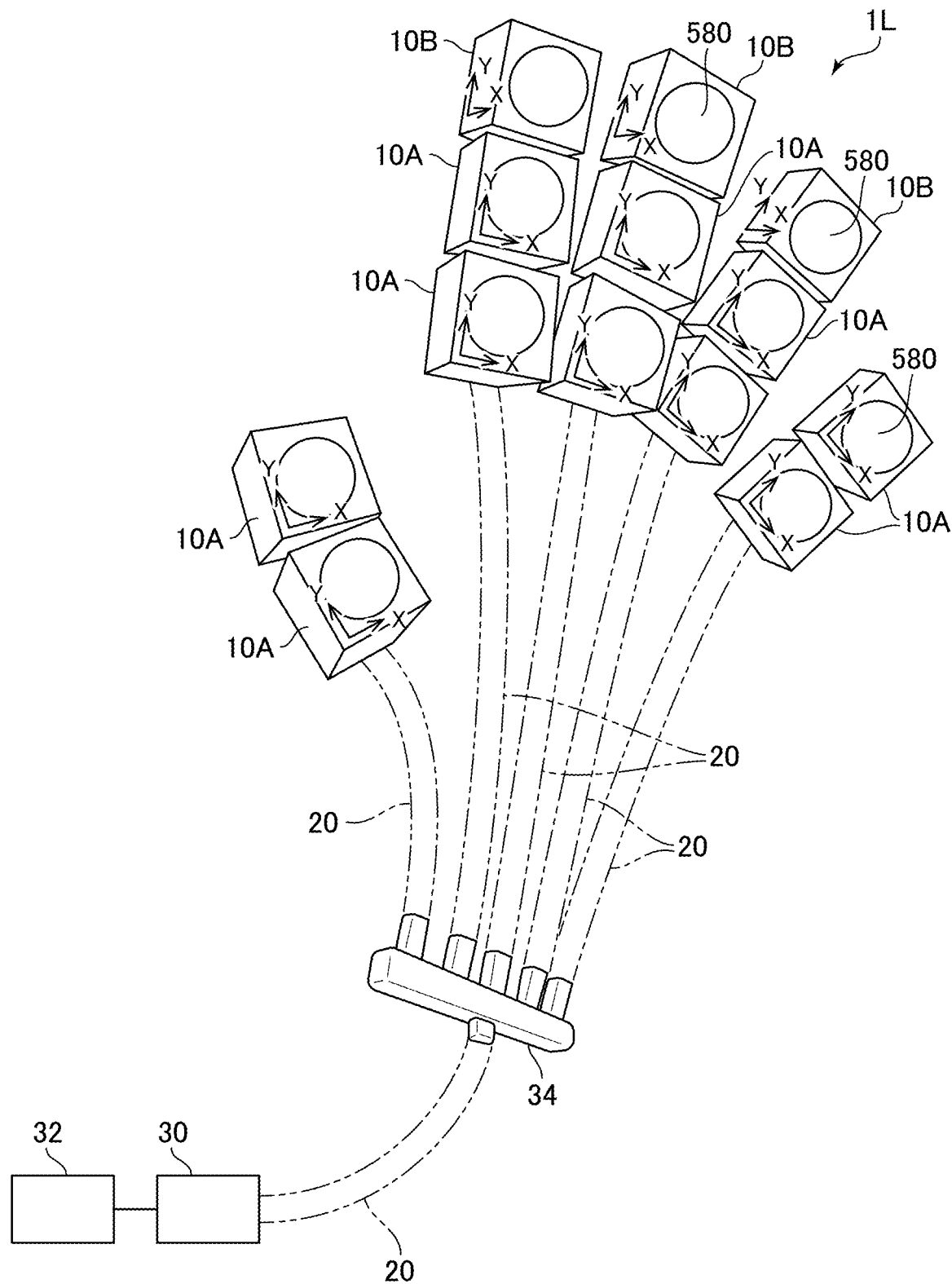

FIG. 39 is a perspective view showing the configuration of a soft robot as a tenth assembly example, in a pre-deformation state.

Figure 40:
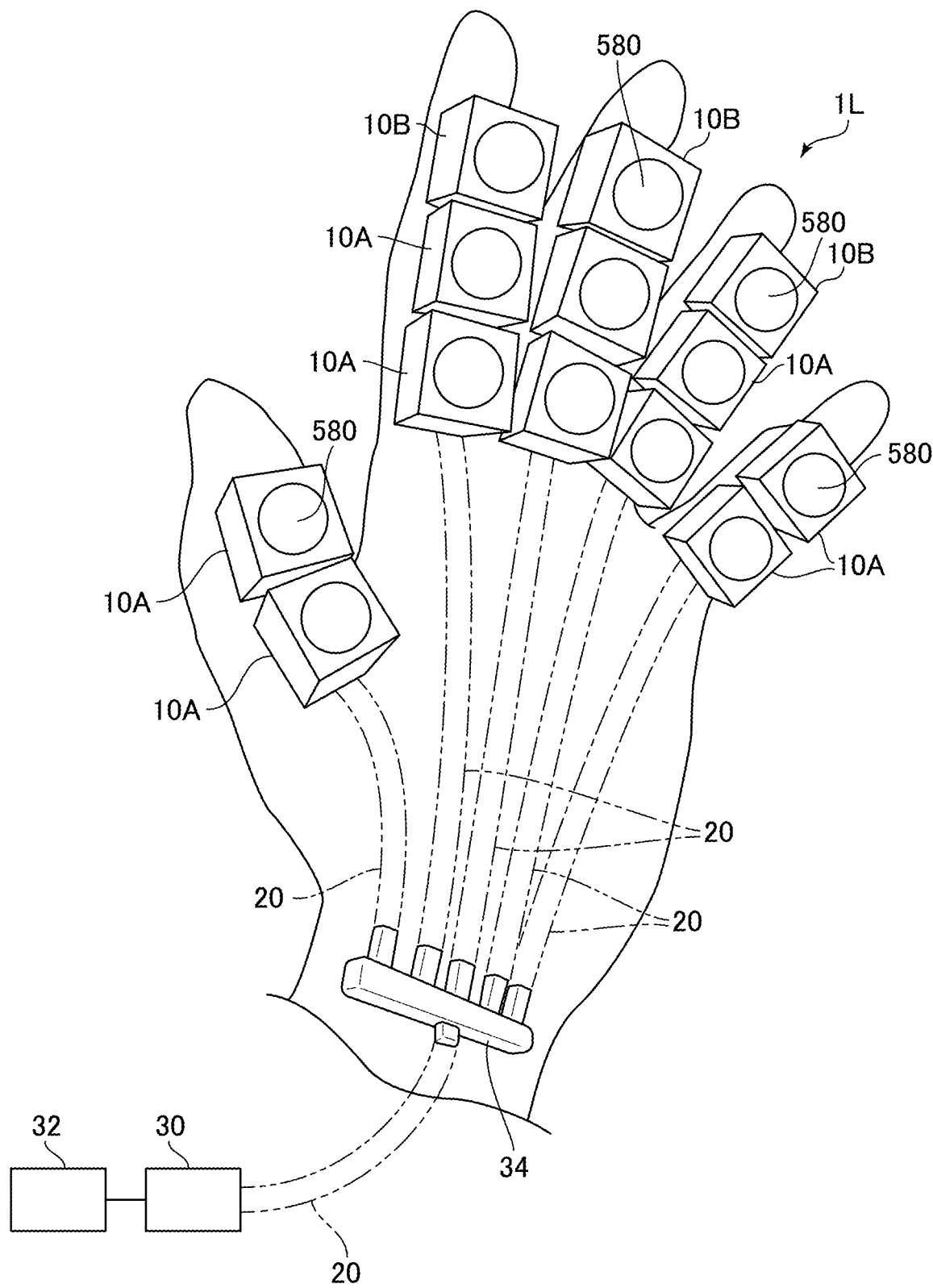

FIG. 40 is a perspective view showing the configuration of the soft robot as the tenth assembly example attached to the patient's hand, in the pre-deformation state.

Figure 41:
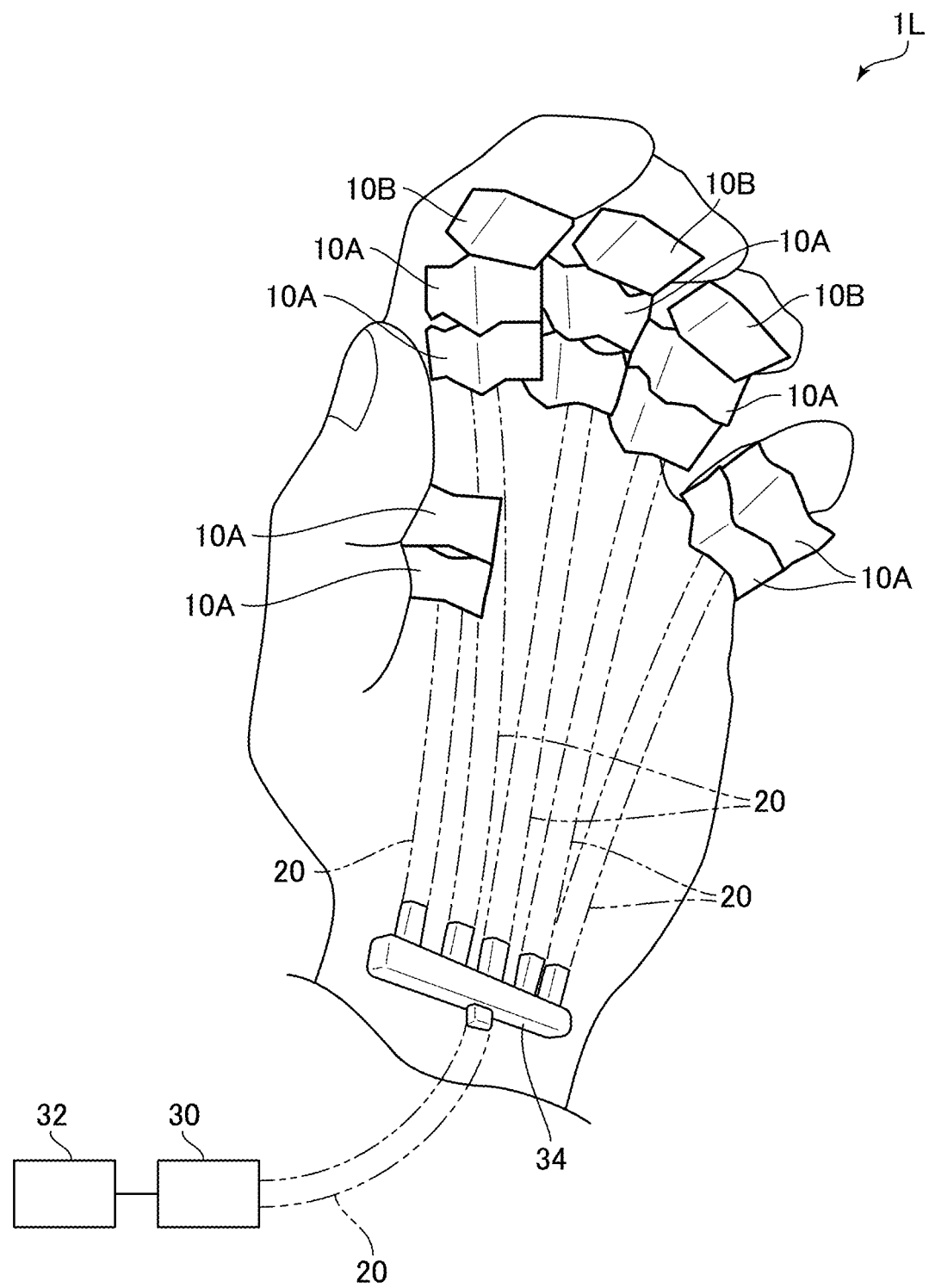

FIG. 41 is a perspective view showing the configuration of the soft robot as the tenth assembly example attached to the patient's hand, in the pre-deformation state.

DESCRIPTION OF EMBODIMENTS

With reference to the drawings, a soft robot according to an embodiment of the present invention will now be described in detail. However, the present invention is not limited to specific embodiments described below, but various aspects may be taken within the scope of the technical idea of the present invention. For example, the soft robot need not necessarily be entirely formed of a flexible material, but may be at least partly formed of a flexible material. Similarly, it may be at least partly constituted by voxels coupled together as a module.

<Soft Robot>

Figure 1B:
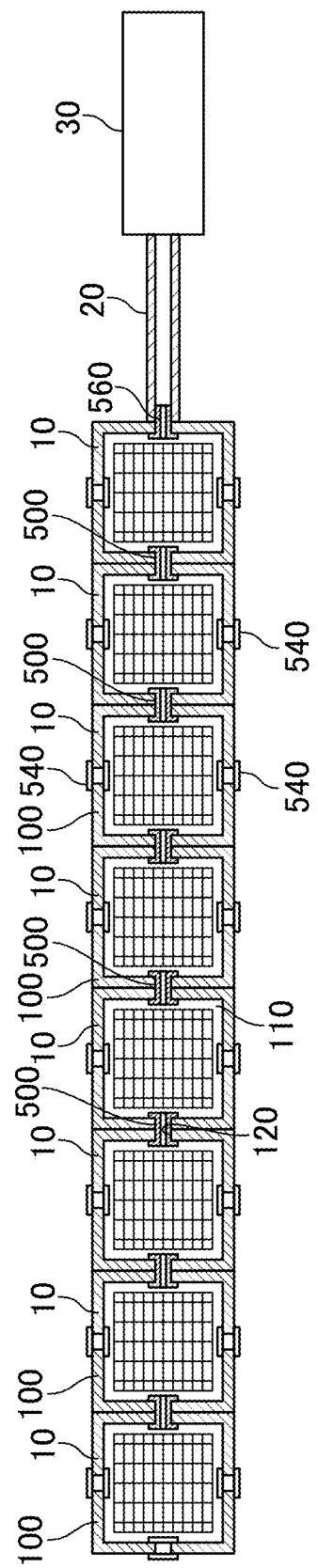
FIG. 1B is a vertical sectional view taken along a longitudinal direction, showing the overall configuration of the soft robot according to the one embodiment of the present invention.
Figure 1C:
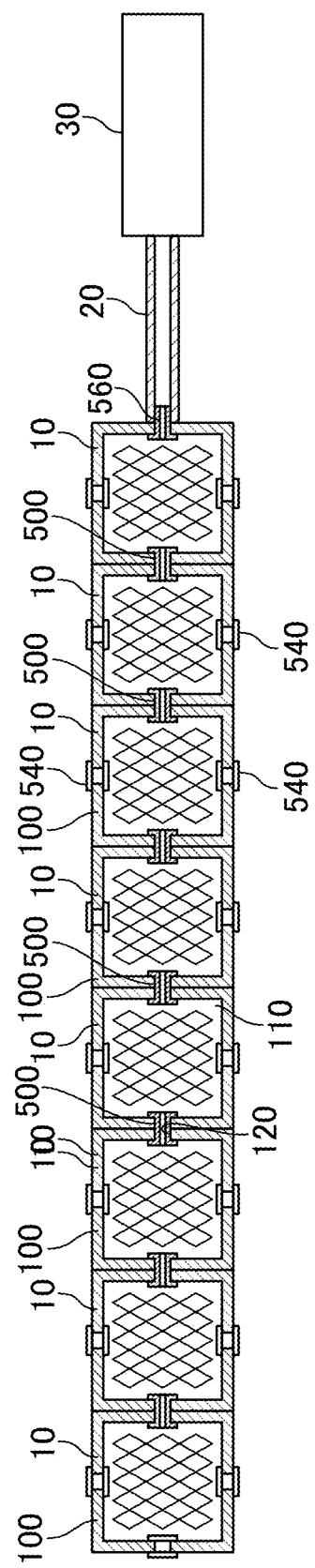
FIG. 1C is a sectional view of C-C in FIG. 1A.
Figure 1D:
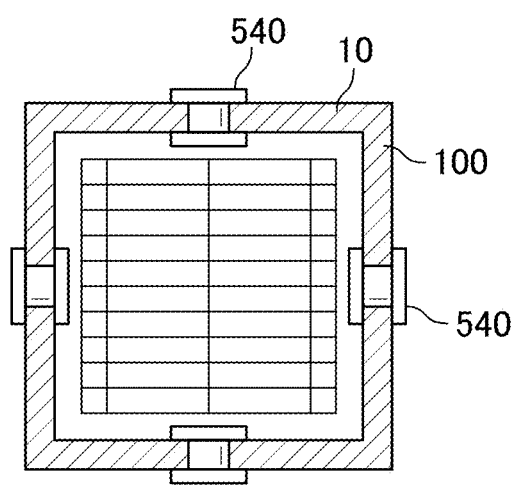
FIG. 1D is a sectional view of D-D in FIG. 1A.

FIGS. 1A-1D illustrate the overall configuration of a soft robot according to one embodiment of the present invention, wherein: FIG. 1A is a side view; FIG. 1B is a vertical sectional view taken along a longitudinal direction; FIG. 1C is a sectional view of C-C in FIG. 1A; and FIG. 1D is a sectional view of D-D in FIG. 1A. As shown in FIG. 1, the soft robot 1 according to this embodiment comprises: a plurality of voxels 10 coupled together in one line; a silicone tube 20 connected to a voxel 10 at one end of the line in a coupling direction; a suction pump 30 connected to the silicone tube 20; and a control device 32 for controlling the suction pump 30.

The plurality of voxels 10 are coupled together in one line, and a casing 100 of each of the voxels 10 is coupled to a casing 100 of an adjacent one of the remaining voxels 10 in a state in which they are fluidically communicated with each other. Any adjacent two of the voxels 10 are coupled together by the after-mentioned fluid-communicating connector 500.

The silicone tube 20 is comprised of a hollow silicone. The silicone tube 20 has one end being in fluid communication with the inside of the casing 100 of the voxel 10 at the one end in the coupling direction, and the other end connected to the suction pump 30.

The suction pump 30 is, for example, an electrically-driven suction pump, and can suck gas (air) in the plurality of voxels 10 and discharge it to the outside, via the silicone tube 20.

The control device 32 is electrically connected to the suction pump 30, and controls driving of the suction pump 30. In a case where the suction pump 30 is manually driven, the control device 32 may be omitted.

<Voxel>

Figure 2A:
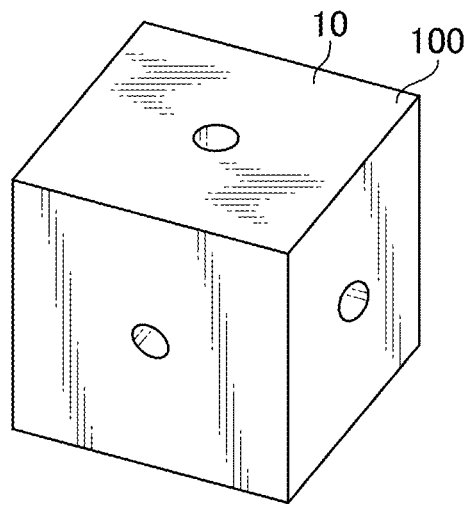
FIG. 2A is a perspective view showing the configuration of a voxel of the robot illustrated in FIG. 1 A.
Figure 2B:
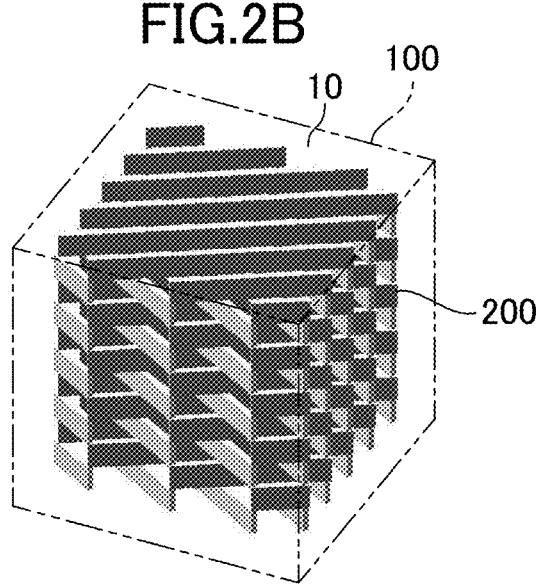
FIG. 2 B is a perspective view showing the configuration of the voxel of the robot illustrated in FIG. 1A, wherein a casing is indicated by a broken line.
FIG. 2C is a front view showing the configuration of the voxel of the robot illustrated in FIG. 1A.
FIG. 2D is a front sectional view showing the configuration of the voxel of the robot illustrated in FIG. 1A.
FIG. 2E is a sectional view of E-E in FIG. 2D.
FIG. 2F is a sectional view of F-F in FIG. 2D.
Figure 2C:
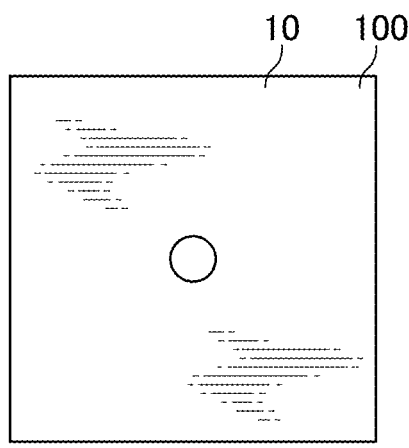
Figure 2D:
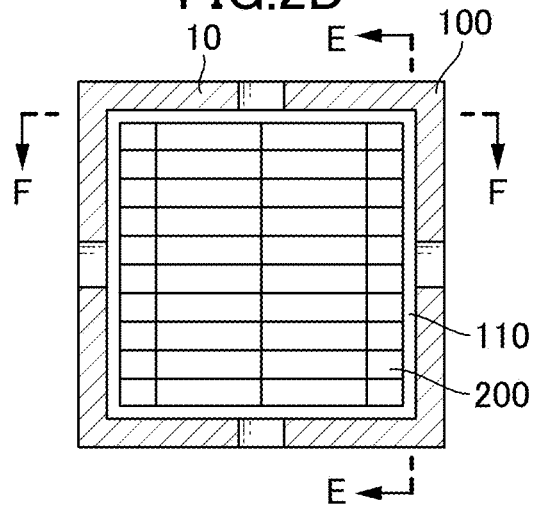
Figure 2E:
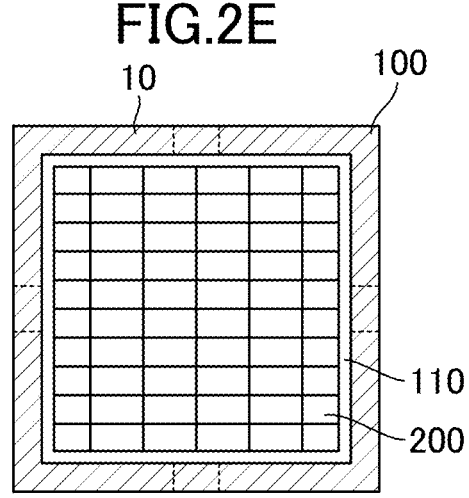
Figure 2F:
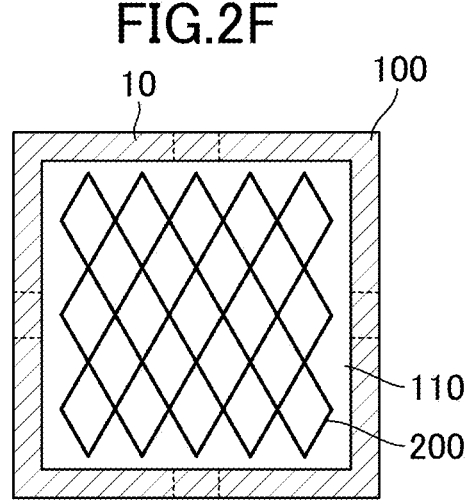

FIGS. 2A-2F are views showing the configuration of the voxel in the robot illustrated in FIG. 1A. FIG. 2A is a perspective view; FIG. 2B is a perspective view, wherein the casing is indicated by a broken line; FIG. 2C is a front view; FIG. 2D is a front sectional view; FIG. 2E is a sectional view of E-E in FIG. 2D; and FIG. 2F is a sectional view of F-F in FIG. 2D.

The voxel 10 is a robot component module (robot-constituting module) a plurality of which are connected together to constitute the soft robot 1. The term "module" here means a component which is attachable and detachable with respect to another identical component, and is a basic unit of a component a plurality of which are connected together in conformity to a required function and/or shape of a robot to constitute the robot.

As shown in FIGS. 2A-2F, the voxel 10 comprises: a casing 100 whose outer shape is cubic; and a deformation-regulating member 200 housed in the casing 100. An internal space 110 is formed in the casing 100, and the generally approximately cube-shaped deformation-regulating member 200 is received in the internal space 110. The shape of the internal space 110 is similar to the outer shape of the casing 100, and is a cubic shape in this embodiment. The deformation-regulating member 200 has a shape similar to the shape of the internal space 110, as a whole, and is a cubic shape in the present embodiment. The deformation-regulating member 200 is received in the internal space 110 almost without any gap with respect to each wall of the casing 100. The term "almost without any gap" here includes not only a state in which the deformation-regulating member 200 is in contact with an inner wall of the casing 100 but also a case where a several-mm gap is formed between the deformation-regulating member 200 and the inner wall of the casing 100.

The deformation-regulating member 200 is a member for, in a situation where as a result of discharging a working fluid in the internal space 110 of the casing 100 to depressurize the internal space 110, the casing 100 contracts, regulating the outer shape of the casing 100 to a desired shape of deformation. In a state before the casing 100 is depressurized, the deformation-regulating member 200 has a cubic shape as a whole, because no pressure acts thereon from the casing. It should be noted that the term "has a cubic shape as a whole" need not necessarily be strictly cubic, and may be a shape which can be received in the cube-shaped internal space 110 without any gap therebetween.

With regard to the deformation-regulating member, in this embodiment, four types of deformation-regulating members are used in which the deformation of the voxel during depressurization is regulated with respect to three axis directions of the cube of the deformation-regulating member, as follows.

(1) Contraction

When the inside of the casing is depressurized, the voxel contracts in one of the three directions, but does not substantially deform in the remaining two directions.

(2) Bending

When the inside of the casing is depressurized, the voxel contracts in one of the three directions and curves along another one of the three directions, but does not substantially deform in the remaining one direction.

(3) Shear Deformation

When the inside of the casing is depressurized, the voxel contracts in one of the three directions and shear-deforms in another one of the three directions, but does not substantially deform in the remaining one direction.

(4) No Deformation

When the inside of the casing is depressurized, the voxel does not substantially deform in the three directions.

In FIGS. 2A-2 F, the after-mentioned first deformation-regulating member 200 corresponding to contraction is shown as a member for regulating the shape of deformation of the voxel during depressurization. However, second-fourth deformation-regulating members 220, 240, 260 corresponding to bending, shear-deformation and no-deformation may be applied depending on the shape of deformation required for the voxel, and any other suitable deformation-regulating members different in material or shape may be used. The detailed configurations of the first-fourth deformation-regulating members 200, 220, 240, 260 will be described in detail later.

<Casing>

Figure 3A:
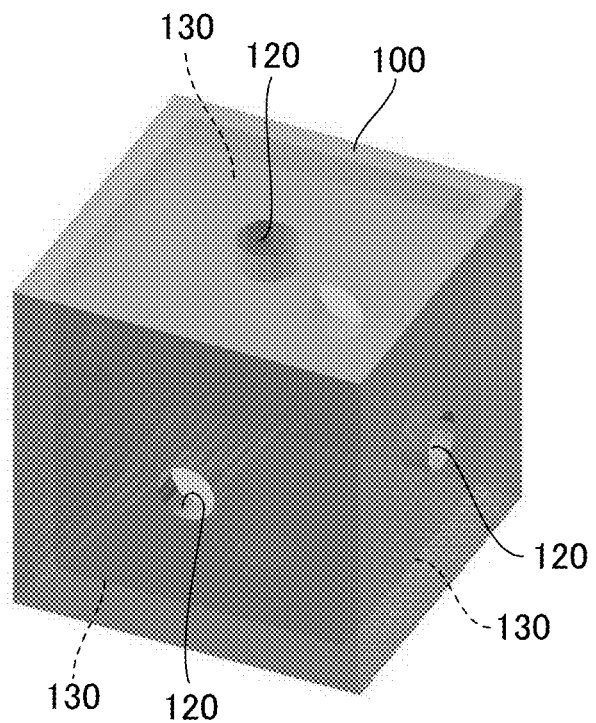
FIG. 3 A is a perspective view showing the casing of the voxel illustrate in FIG. 2A.
FIG. 3B is a front view showing the casing of the voxel illustrated in FIG. 2A.
Figure 3B:
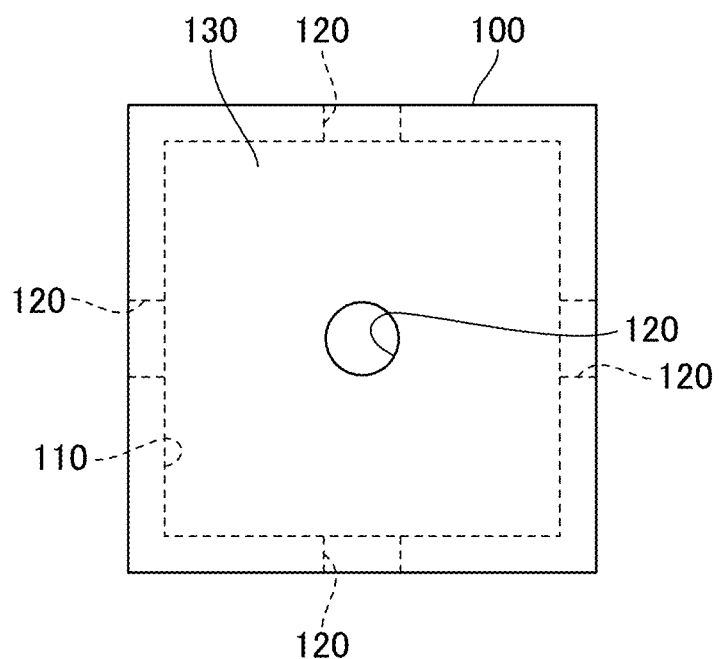

FIGS. 3A and 3B illustrate the casing of the voxel illustrated in FIG. 2A, wherein FIG. 3A is a perspective view, and FIG. 3B is a front view. As shown in FIGS. 3A and 3B, the casing 100 is made of silicone and formed to have a cube-shaped outer shape, and has six square-shaped walls 130. An inner space 110 having a shape similar to the outer shape of the casing 100, i.e., a cubic shape, is formed inside the casing 100. A circular opening 120 is formed at the center of each of the walls 130 of the casing 100.

A material making up the casing 100 may be composed of a flexible resin or the like, as long as it is contractable when the internal space 110 of the casing 100 is depressurized.

<Voxel Production Method>

Figure 4A:
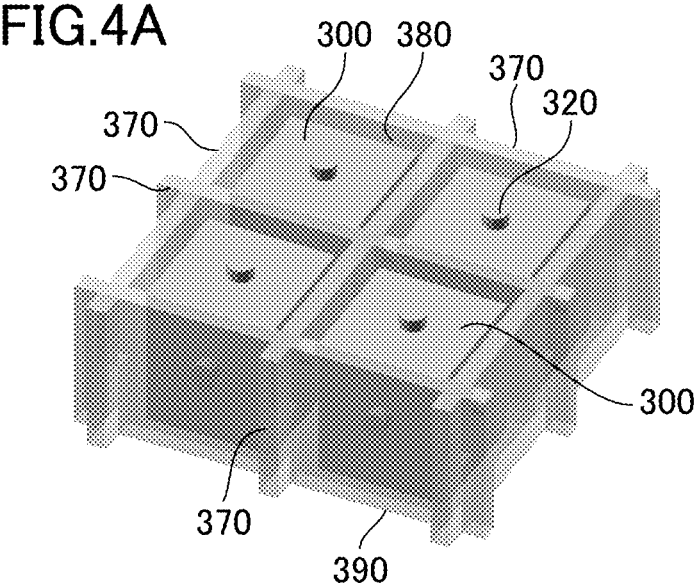
FIG. 4A is a diagram (1) for explaining a method of producing the casing.

In describing a first production method for the voxel, a production method for the casing will be described below. FIGS. 4A-4 F are diagrams for explaining a method of producing the casing, and FIGS. 5A and 5B are perspective views showing an inner mold and a bottom mold used when producing the casing, respectively. As shown in FIG. 5A, the inner mold 300 comprises a cube-shaped base 310 and a protrusion 320 protruding perpendicularly from the surface of the base 310. The base 310 of the inner mold 300 is formed into a cubic shape having a size corresponding to the internal space 110. The protrusion 320 is formed on each of five face of the base 310 except for a bottom face thereof, i.e., the protrusion is not formed on the bottom face. The protrusion 320 has a columnar shape having a size corresponding to the opening 120 of the casing, and is formed such that the central axis thereof passes through the center of each face. The protrusion 320 has a protruding length equal to the thickness of the casing 100.

As illustrated in FIG. 5B, the bottom mold 330 comprises: a bottom panel 340; a frame 350 standingly provided on an outer periphery of the bottom panel 340; and a protrusion 360 formed to protrude upwardly from the bottom panel 340. The bottom panel 340 has a square shape. The length of one side of the inside of the frame 350 1 is greater than twice the length of one side of the outer shape of the casing 100. The protrusion 360 is a columnar shape having a size corresponding to the opening 120 of the casing 100. As will be described later, the protrusion 360 is disposed such that, when a casing intermediate body 410 is placed in conformity to the corner of the frame, the center of the casing intermediate body 410 positionally coincides with the center of the protrusion 360, in plan view.

As shown in FIG. 4A, when producing the casing, first of all, a partition plate 370 is installed perpendicularly on a flat bottom plate 390 in a grid pattern, so that a plurality of chambers 380 are formed by the bottom plate 390 and the partition plate 370. Each of the width and depth of each of the chambers 380 is set to be equal to the length of one side of the casing 100. Then, the mold 300 is placed in each of the chambers 380 such that each side face of the mold 300 and the partition plate 370 become parallel to each other, and the width between the side face of the mold 300 and the partition plate 370 becomes constant over the entire circumference.

Figure 4B:
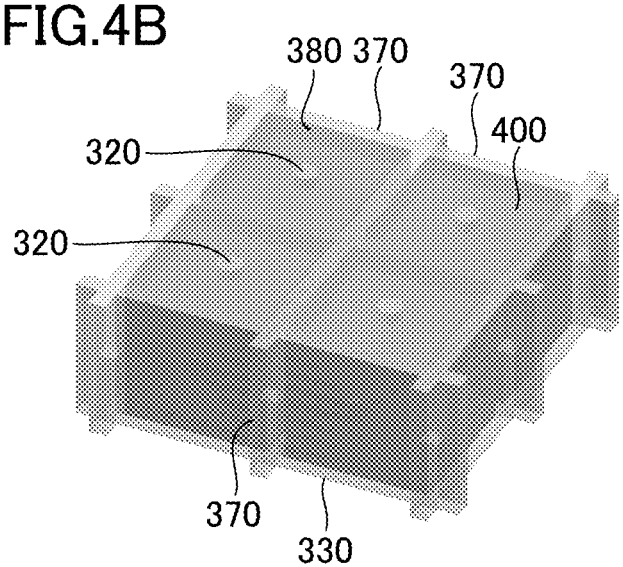
FIG. 4B is a diagram (2) for explaining the method of producing the casing.

Subsequently, as shown in FIG. 4B, silicone 400 in a liquid state is cast into each of the chambers 380 inside the partition plate 370. The silicone 400 is filled in each of the chambers 380 up to a height equal to atop face of the protrusion 320 located upwardly. The casing intermediate body 410 (FIG. 4C) is produced by curing the filled silicone 400. The casing intermediate body 410 is in a state in which the five faces of the casing 100 are formed, i.e., is in a state in which the bottom thereof is open.

Figure 4C:
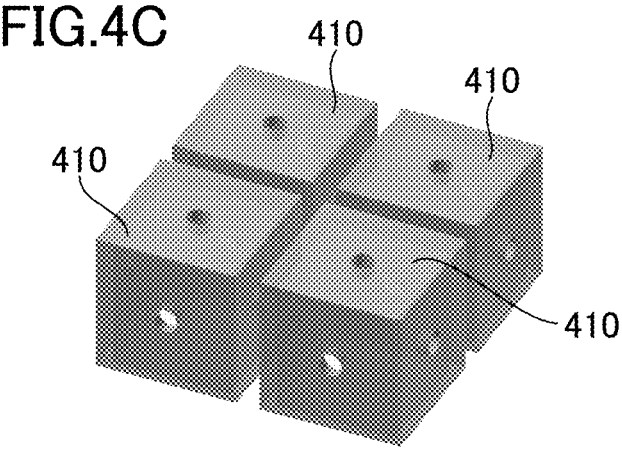
FIG. 4C is a diagram (3) for explaining the method of producing the casing.
Figure 5A:
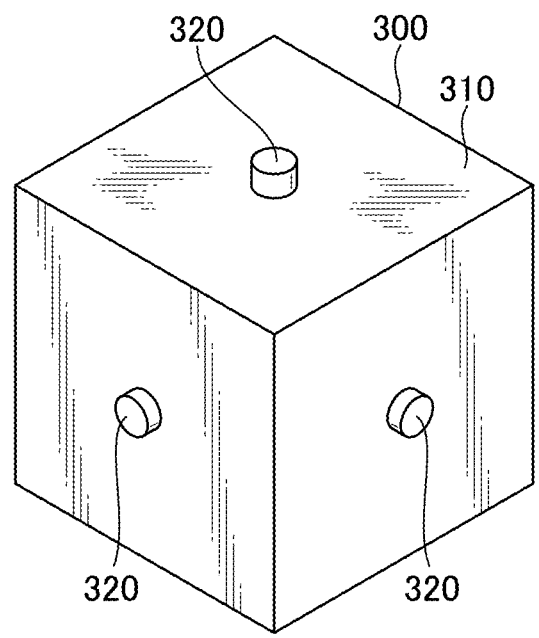
FIG. 5A is a perspective view showing an inner mold used when producing the casing.
Figure 5B:
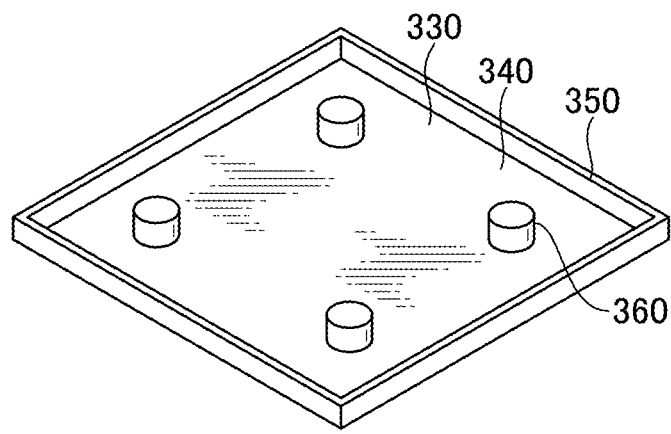
FIG. 5B is a perspective view showing a bottom mold used when producing the casing.

Subsequently, as shown in FIG. 4C, the partition plate 370, the bottom plate 390, and the mold 300 are released, and deburring of the casing intermediate body 410 is performed.

Figure 4D:
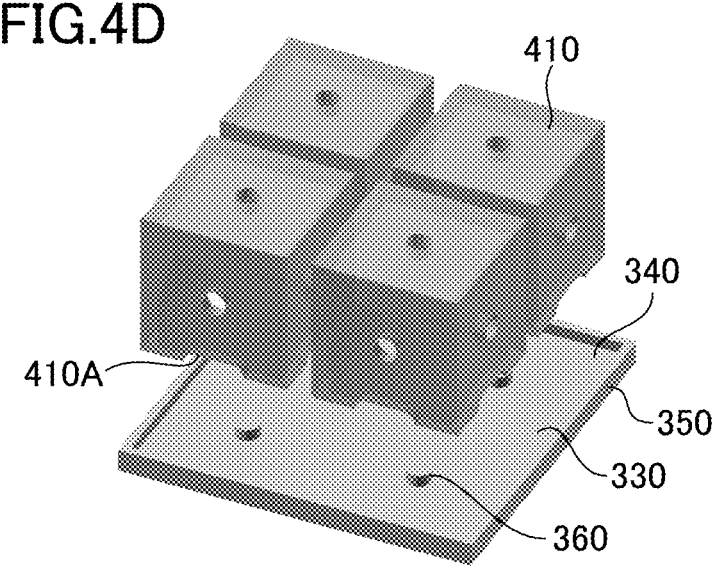
FIG. 4D is a diagram (4) for explaining the method of producing the casing.

Subsequently, as shown in FIG. 4D, the casing intermediate body 410 is placed on the bottom mold 330 such that one corner of a bottom portion of the casing intermediate body 410 is brought into contact with a corresponding one corner of the frame 350. Preferably, a cutout 410A is formed in a lower edge of the casing intermediate body 410 to allow liquid silicone to easily flow into the inside of the casing intermediate body 410.

Figure 4E:
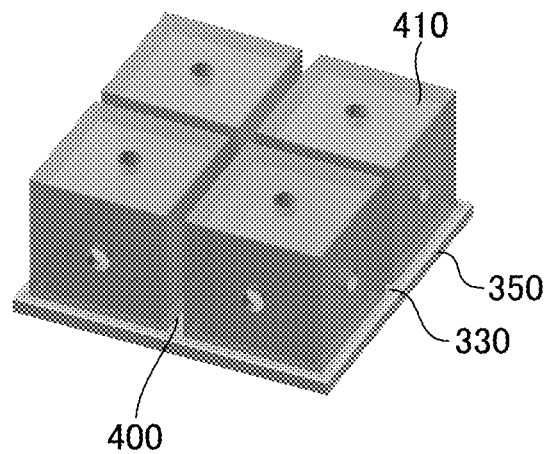
FIG. 4E is a diagram (5) for explaining the method of producing the casing.
Figure 4F:
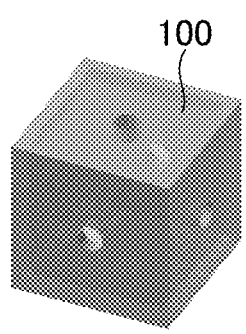
FIG. 4F is a diagram (6) for explaining the method of producing the casing.

Subsequently, as shown in FIG. 4E, the silicone 400 in the liquid state is cast into the frame 350 of the bottom mold 330 up to a height equal to the thickness of the casing 100. Then, after the cast silicone 400 is cured, the bottom mold 330 is released and deburring is performed, thereby producing the casing 100 as shown in FIG. 4G.

Then, the opening 120 of the casing 100 is expanded, and the deformation-regulating member in a compressed state is inserted into the internal space 110 from the opening 120. Since the casing 100 is formed from silicone, the opening 120 can be expanded to the extent that the deformation-regulating member in the compressed state can be inserted therethrough. It is noted that the deformation-regulating member can be disposed inside the casing 110 by placing the casing intermediate body 410 on the bottom mold 330 with the deformation-regulating member disposed inside the casing intermediate body 410, and then casting the silicone 400 into the bottom mold 330.

Alternatively, the voxel may also be produced by the following second production method. FIGS. 6A-6D are diagrams for explaining the second production method for producing the voxel. In the second production method for the voxel, a core formed from a water-soluble filament is used to produce the voxel. FIG. 7 is a perspective view showing a core used in the second production method for the voxel. As shown in FIG. 7, the core 600 comprises a housing 602 and a lid member 604.

The housing 602 is a cube-shaped casing formed by assembling five square-shaped plates 606 to have an open upper face. A protrusion 608 is formed at the center of an outer face of each of the plates 606. A cube-shaped space is formed inside the housing 602, wherein this internal space is formed in dimensions capable of receiving the deformation-regulating member 200 while preventing an internal movement of the deformation-regulating member 200.

The lid member 604 is a square-shaped plate, and a protrusion 608 is formed on the center of an outer face thereof.

Each of the protrusions 608 of the housing 602 and the lid member 604 has a columnar shape having a size corresponding to the opening 120 of the casing, and an central axis of each of the protrusions 608 is formed such that it passes through the center of a corresponding one of the plates 606 and the lid member 604. Each of the protrusions 608 has a protruding length equal to the thickness of the casing 100.

When the upper face of the housing 602 is closed by the lid member 604, the housing 602 has a cubic shape having a size corresponding to the internal space 110.

Each of the housing 602 and the lid member 604 can be produced, e.g., by forming a water-soluble filament by a 3D printer. As the water-soluble filament, a PVA (polyvinyl alcohol) filament or the like may be used.

Figure 6A:
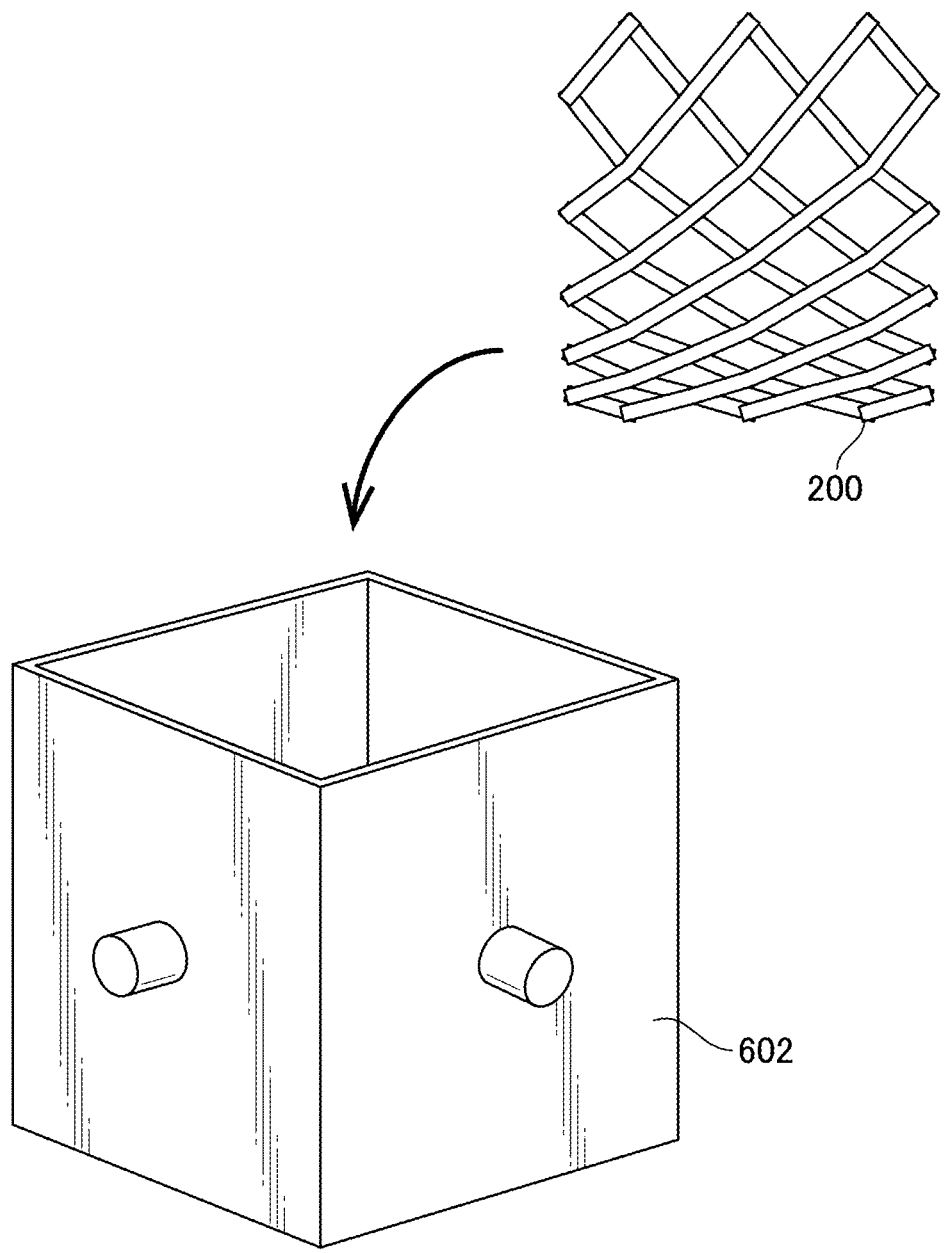
FIG. 6A is a diagram for explaining a second production method for producing the voxel.
Figure 6B:
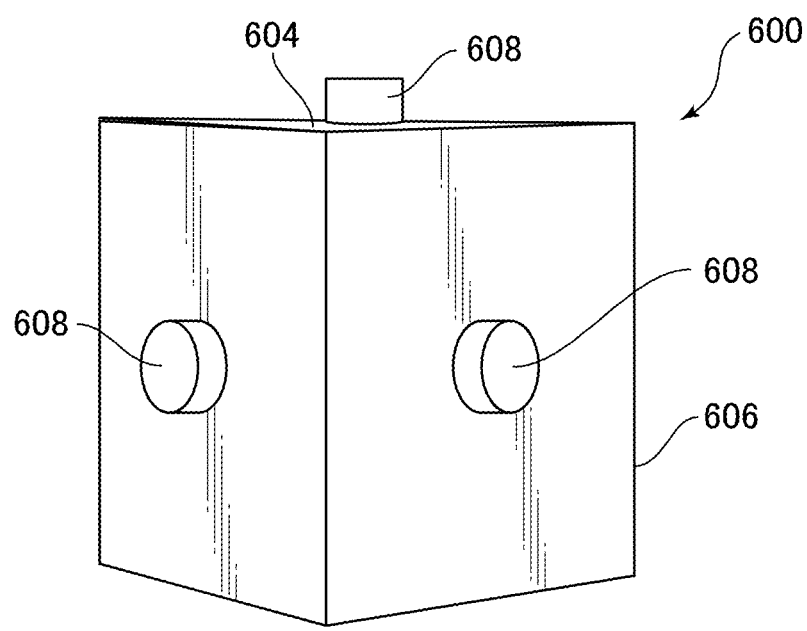
FIG. 6B is a diagram for explaining the second production method for producing the voxel.
Figure 7:
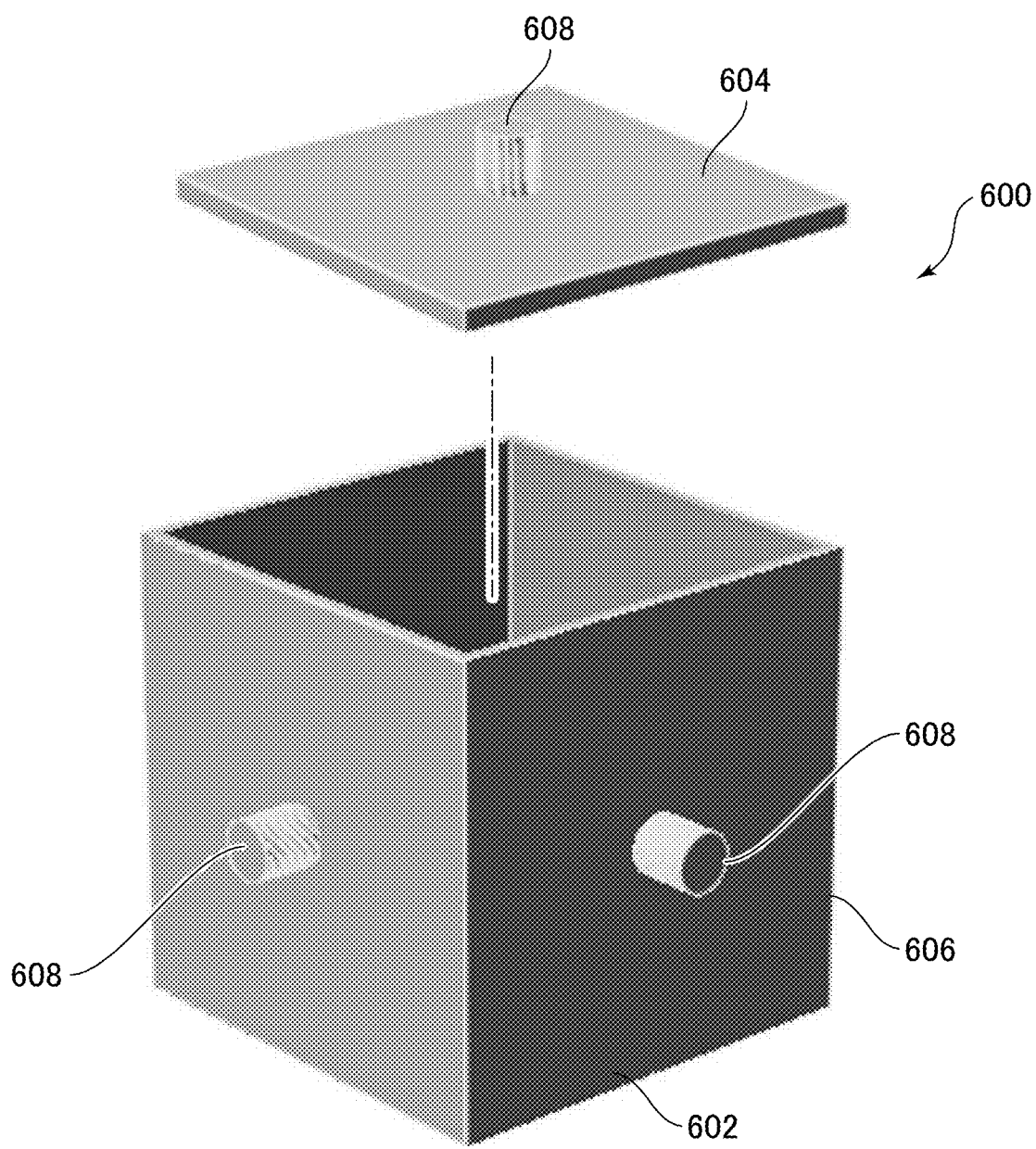
FIG. 7 is a perspective view showing a core used in the second production method for the voxel.

In order to produce the voxel, first of all, as shown in FIG. 6A, the deformation-regulating member 200 is received in the housing 602 of the core 600. Then, as shown in FIG. 6B, the lid member 604 is attached to close the upper face of the housing 602.

Figure 6C:
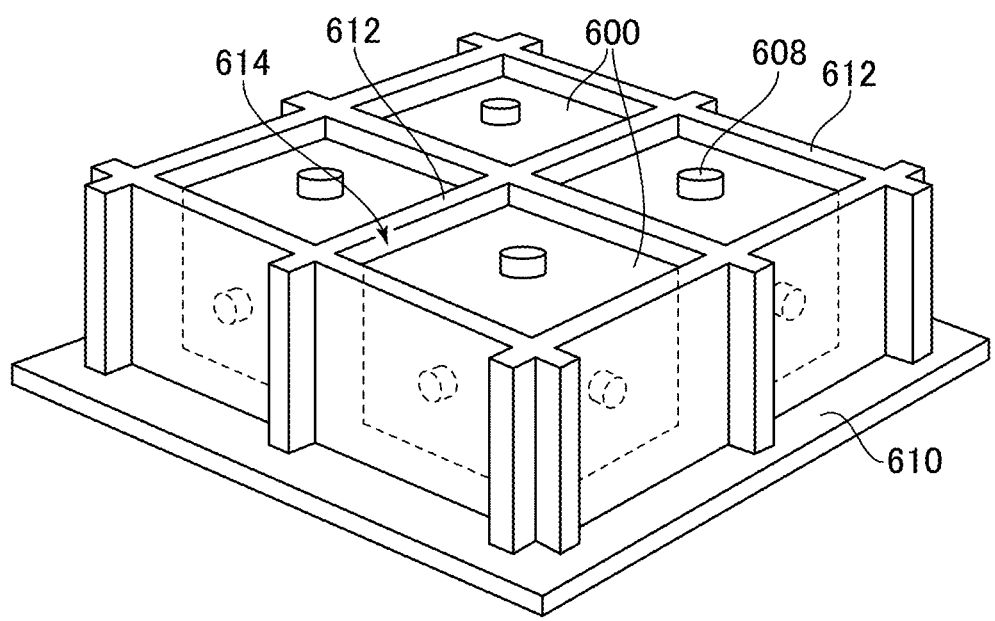
FIG. 6C is a diagram for explaining the second production method for producing the voxel.

Subsequently, as shown in FIG. 6C, a partition plate 612 is installed perpendicularly on a flat bottom plate 610 in a grid pattern, so that a plurality of chambers 614 are formed by the bottom plate 610 and the partition plate 612. Each of the width and depth of each of the chambers 614 is set to be equal to the length of one side of the casing 100. Then, the core 600 housing the deformation-regulating member 200 is placed in each of the chambers 614 such that a distance between each face of the core 600 and each of the bottom plate 610 and the partition plate 612 is constant. This results in a state in which distal ends of the protrusions of the core 600 are in contact with the partition plate 612.

Subsequently, silicone 400 in a liquid state is cast into each of the chambers 614 inside the partition plate 612. The silicone 400 is filled in each of the chambers 614 up to a height equal to a top face of the protrusion 608 of the lid member 604 located upwardly. Then, when the silicone 400 is cured, the bottom plate 610 and the partition plate 612 are released, and deburring of the cured silicone 400 (casing 100) is performed.

Figure 6D:
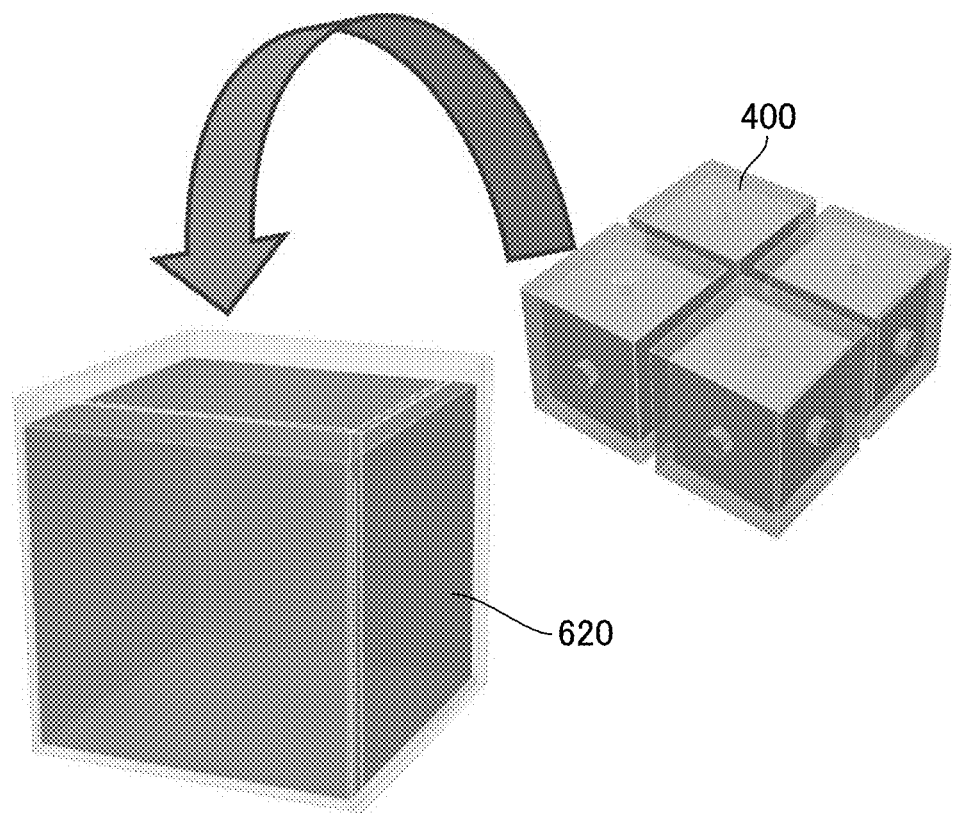
FIG. 6D is a diagram for explaining the second production method for producing the voxel.
Figure 6E:
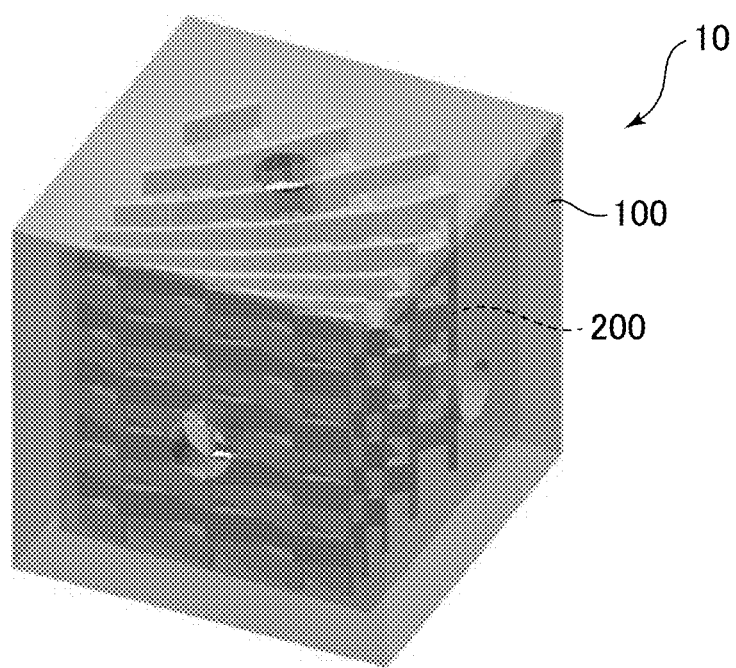
FIG. 6E is a diagram for explaining the second production method for producing the voxel.

Subsequently, as shown in FIG. 6D, the cured silicone 400 is put into a water tank 620 and immersed in water. Thus, the core 600 made of the water-soluble filament is dissolved in water, so that the voxel 10 in which the deformation-regulating member 200 is housed in the casing 100 can be produced, as shown in FIG. 6 E. When removing the core 600, it is not limited to immersing it in water, but an injection needle may be stuck into one of the protrusions 608, to inject water into the core 600 from the injection needle.

<Deformation-Regulating Member>
(1) In Case of Contraction

Figure 8A:
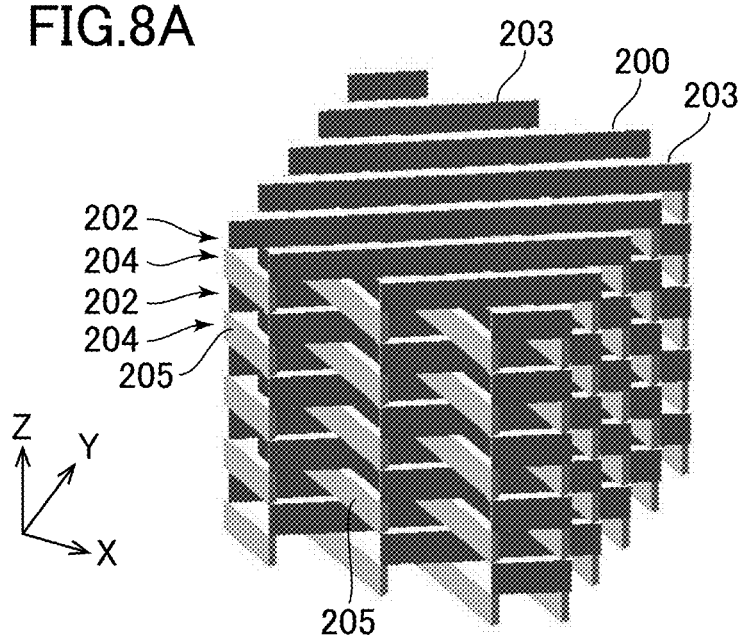
FIG. 8A is a perspective view showing a first deformation-regulating member when the shape of deformation of the voxel during depressurization is contraction.
Figure 8B:
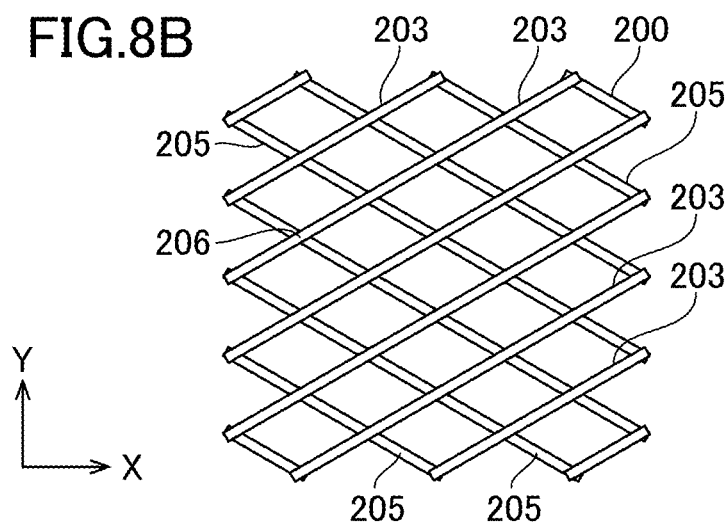
FIG. 8B is a plan view showing the first deformation-regulating member when the shape of deformation of the voxel during depressurization is contraction.
Figure 8C:
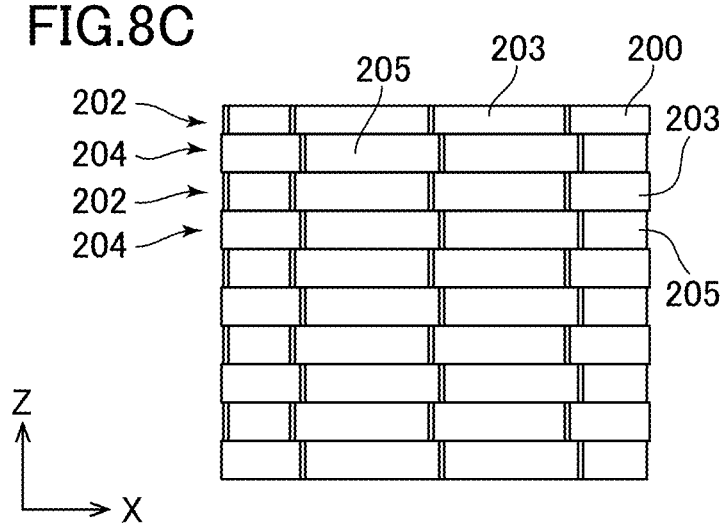
FIG. 8C is a front view showing the first deformation-regulating member when the shape of deformation of the voxel during depressurization is contraction.

FIGS. 8A-8C illustrate a first deformation-regulating member when the shape of deformation of a voxel during depressurization is contraction, wherein: FIG. 8A is a perspective view; FIG. 8B is a plan view; and FIG. 8C is a front view. The following description will be made on the assumption that three axis directions of the cubic shape of the first deformation-regulating member are an X-axis, a Y-axis, and a Z-axis, as illustrated in FIGS. 8A to 8C.

The first deformation-regulating member 200 has a cubic shape as a whole, and is formed from, e.g., TPU (thermoplastic polyurethane). The first deformation-regulating member 200 may be formed using, e.g., a 3D printer. The material forming the first deformation-regulating member 200 may be any other suitable material as long as it has a desired elasticity, and the production method may also be other suitable method although the method using the 3D printer is efficient.

As shown in FIGS. 8A-8C, the first deformation-regulating member 200 is constructed by alternately laminating a first layer 202 in which a plurality of first plate-shaped parts 203 are arranged in parallel in an XY plane, and a second layer 204 in which a plurality of second plate-shaped parts 205 are arranged in parallel in the XY plane. The first plate-shaped parts 203 provided in the first layer 202 do not intersect each other, and the second plate-shaped parts 205 provided in the second layer 204 do not intersect each other.

Each of the first plate-shaped parts 203 constituting the first layer 202 is composed of a plate-shaped segment placed perpendicularly to the XY plane. Each of the first plate-shaped parts 203 linearly extends at a given positive angle to the X axis, and is inclined in a direction toward the positive side of the Y-axis (i.e., in an up direction in FIG. 8B), as gradually going in a direction toward the positive side of the X-axis (i.e., in a right direction in FIG. 8B). The angle of each of the first plate-shaped parts 203 with respect to the X-axis is 45 degrees or less, and in this embodiment, is set to 30 degrees. A plurality of sets of the first plate-shaped parts 203, each set of which constitutes a respective one of a plurality of the first layers 202, are all in the same arrangement, and are arranged to overlap each other as viewed from the Z-axis direction.

Each of the second plate-shaped parts 205 constituting the second layer 204 is composed of a plate-shaped segment placed perpendicularly to the XY plane. Each of the second plate-shaped parts 205 linearly extends at a given negative angle to the X axis, and is inclined in a direction toward the negative side of the Y-axis (i.e., in a down direction in FIG. 8B), as gradually going in a direction toward the X-axis (i.e., in the right direction in FIG. 8B). The angle of each of the second plate-shaped parts 205 with respect to the X-axis is equal to the angle of each of the first plate-shaped parts 203 with respect to the X-axis, in terms of absolute value. The angle of each of the second plate-shaped parts with respect to the X-axis is 45 degrees or less, and in this embodiment, is set to 30 degrees. A plurality of sets of the second plate-shaped parts, each set of which constitutes a respective one of a plurality of the second layers, are all in the same arrangement, and are arranged to overlap each other as viewed from the Z-axis direction.

As shown in FIG. 8B, the first plate-shaped parts 203 constituting the first layer 202 and the second plate-shaped parts 205 constituting the second layer 204 form diamond-shaped (rhombus-shaped) grids in the XY plane. Grid points 206 of the diamond-shaped grids are aligned in the X-axis direction and in the Y-axis direction. In each of the diamond-shaped grids, the length of a diagonal line in the X-direction (X-axis directional diagonal line) is greater than the length of a diagonal line in the Y direction (Y-axis directional diagonal line). Further, the lengths of the X-axis directional diagonal lines of the plurality of diamond shapes are constant, and the lengths of the Y-axis directional diagonal lines of the plurality of diamond shapes are constant. In each of the diamond-shaped grids, two vertices each formed by at an acute angle are opposed to each other in in the X-axis direction, and two vertices each formed by an obtuse angle are opposed to each other in the Y-axis direction. In this embodiment, an acute vertex angle in each of the diamond-shaped grids is set to 60 degrees. Further, in this embodiment, three unitary grids are arranged side-by-side in the X-axis direction, and five unitary grids are arranged side-by-side in the Y-axis direction. Further, five tiers each composed of the first layer and the second layer are arranged in the Z-axis direction. With such a configuration, the first deformation-regulating member 200 has less elasticity in the Y direction (deformation direction) than elasticity in the X direction.

Further, as mentioned above, the plurality of sets of first plate-shaped parts 203, each set of which constitutes a respective one of the plurality of first layers 202, are all in the same arrangement, and the plurality of sets of second plate-shaped parts 205, each set of which constitutes a respective one of the plurality of second layers 204, are all in the same arrangement. Therefore, the set of first plate-shaped parts 203 of the first layer 202 and the set of second plate-shaped parts 205 of the second layer 204 are alternately arranged side-be-side linearly in the Z-axis direction at the grid points 206 of the diamond shapes. This results in having very high elasticity in the Z-axis direction.

Figure 9A:
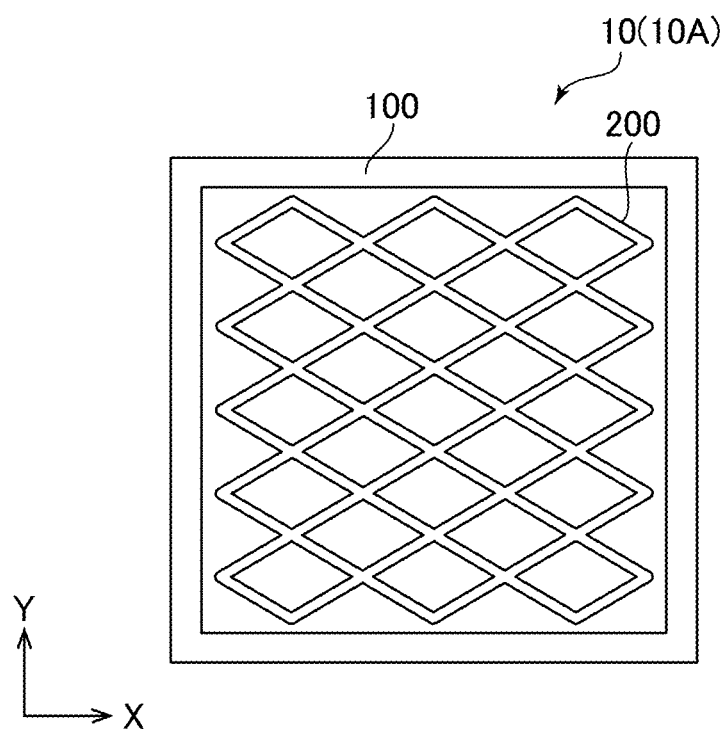
FIG. 9A is a sectional view showing the voxel in which the first deformation-regulating member is housed, in a state before the deformation due to depressurization.
Figure 9B:
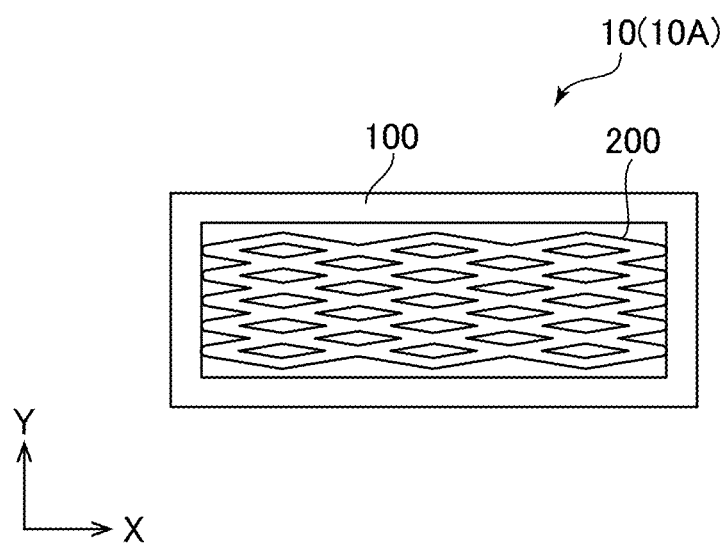
FIG. 9B is a sectional view showing the voxel in which the first deformation-regulating member is housed, in a state after the deformation due to depressurization.

FIGS. 9A and 9B are sectional views showing a state before deformation due to depressurization of the voxel in which the first deformation regulation member is housed and a state after the deformation, respectively. As mentioned above, in the first deformation-regulating member 200, elasticity in the Y-axis direction is less than elasticity in the X-direction, and elasticity in the Z-axis direction is very large. When the inside of the voxel 10A is depressurized, the casing 100 contracts, and the side wall of the casing 100 presses the first deformation-regulating member 200 in the X-axis direction, the Y-axis direction, and the Z-axis direction toward the center thereof. Thus, during depressurization, the voxel 10A housing the first deformation-regulating member 200 contracts in the Y-axis direction more largely than in the X-axis direction, as illustrated in FIGS. 9A and 9B, and almost does not contract in the Z-axis direction. Further, by adjusting the angle with respect to the X-axis, the plate thickness, etc., of each of the set of first plate-shaped parts of the first layer and the set of second plate-shaped parts of the second layer to sufficiently increase elasticity in the X-direction, it becomes possible to cause the voxel during depressurization to contract only in the Y-axis direction almost without contraction in the X-axis and Z-axis directions.

In this embodiment, elasticity in the Y-axis direction is reduced, and elasticity in the X-axis direction is increased. However, the present invention is not limited thereto. For example, each vertex angle of the diamond shapes may be set to 90 degrees to equalize elasticity in the X-axis direction and elasticity in the Y-axis direction. In this case, almost no contraction occurs in the Z-axis direction, and large contraction occurs in the X-axis direction and the Y-axis direction. Alternatively, by adjusting the lengths of the diagonal lines in each of the diamond shapes, the plate thickness of the first plate-shaped parts 203 and the second plate-shaped parts 205, and the material constituting the first deformation-regulating member, it also becomes possible to make elasticities in the X-axis direction, the Y-axis direction, and the Z-axis direction different from each other.

The voxel in which such a first deformation-regulating member is housed in the casing will hereinafter be referred to as "contraction type voxel", wherein the Y-axis direction will hereinafter be referred to as "contraction direction".

(2) In Case of Bending

FIGS. 10A-10C illustrate a second deformation-regulating member when the shape of deformation of a voxel during depressurization is bending, wherein: FIG. 10A is a perspective view; FIG. 10B is a plan view; and FIG. 10C is a front view. The following description will be made on the assumption that three axis directions of the cubic shape of the second deformation-regulating member are an X-axis, a Y-axis, and a Z-axis, as illustrated in FIGS. 10A to 10C.

The second deformation-regulating member 220 has a cubic shape as a whole, and is formed from, e.g., TPU (thermoplastic polyurethane). The second deformation-regulating member 220 may be formed using, e.g., a 3D printer. The material forming the second deformation-regulating member 220 may be any other suitable material as long as it has a desired elasticity, and the production method may also be any other suitable method although the method using the 3D printer is efficient.

As shown in FIGS. 10A-10C, the second deformation-regulating member 220 is constructed by alternately laminating a first layer 222 in which a plurality of first plate-shaped parts 223 are arranged in parallel in an XY plane, and a second layer 224 in which a plurality of second plate-shaped parts 225 are arranged in parallel in the XY plane. The first plate-shaped parts 223 provided in the first layer 222 do not intersect each other, and the second plate-shaped parts 225 provided in the second layer 224 do not intersect each other.

Each of the first plate-shaped parts 223 constituting the first layer 222 is composed of a plate-shaped segment placed perpendicularly to the XY plane. Each of the first plate-shaped parts 223 extends at a given angle to the X axis, and is inclined in a direction toward the positive side of the Y-axis (i.e., in the up direction in FIG. 10B), as gradually going in a direction toward the positive side of the X-axis (i.e., in the right direction in FIG. 10B). Further, at every other grid point 226A among grid points 226A, 226B at which each of the first plate-shaped parts 223 intersects the second plate-shaped parts 225 in XY plane view, an inclination angle of each of the first plate-shaped parts 223 with respect to the X-axis changes, i.e., an angle with respect to the X-axis becomes larger as a Y-axis coordinate value gradually increases. In this embodiment, the angle with respect to the X-axis is set to 15° at the point where the Y-axis coordinate value is 0, and the maximum angler is 50°. A plurality of sets of the first plate-shaped parts 223, each set of which constitutes a respective one of a plurality of the first layers 222, are all in the same arrangement, and are arranged to overlap each other as viewed from the Z-axis direction.

Each of the second plate-shaped parts 225 constituting the second layer 224 is composed of a plate-shaped segment placed perpendicularly to the XY plane. Each of the second plate-shaped parts 225 extends at a given angle to the X axis, and is inclined in a direction toward the positive side of the Y-axis (i.e., in the up direction in FIG. 10B), as gradually going in a direction toward the negative side of the X-axis (i.e., in a left direction in FIG. 10B). Further, at every other grid point 226A among the grid points 226A, 226B at which each of the second plate-shaped parts 225 intersects the first plate-shaped parts 223 in XY plane view, an inclination angle of each of the second plate-shaped parts 225 with respect to the X-axis changes, i.e., an angle with respect to the X-axis becomes larger as the Y-axis coordinate value gradually increases. In this embodiment, the angle with respect to the X-axis is set to −15° at the point where the Y-axis coordinate value is 0, and the maximum angler is 50°. A plurality of sets of the second plate-shaped parts 225, each set of which constitutes a respective one of a plurality of the second layers 224, are all in the same arrangement, and are arranged to overlap each other as viewed from the Z-axis direction.

As shown in FIG. 10B, the first plate-shaped parts 223 constituting the first layer 222 and the second plate-shaped parts 225 constituting the second layer 224 form quadrilateral grids in the XY plane. The grids formed by the first plate-shaped parts 223 and the second plate-shaped parts 225 comprise a plurality of diamond-shaped grids, or a plurality of quadrilateral grids in each of which two of four sides thereof located on the positive side of the Y-axis have the same length, and the remaining two sides located on the negative side of the Y-axis have the same length, wherein the length of the two sides located on the positive side of the Y-axis is greater than the length of the remaining two sides located on the negative side of the Y-axis; wherein the plurality of diamond-shaped grids or quadrilateral grids are arranged side-by-side in a staggered pattern.

With regard to the diamond shapes formed in the above manner, the widths thereof in the X-axis direction are constant, and the widths thereof in the Y-axis direction become larger as gradually going in a direction toward the positive side of the Y-axis. In this embodiment, three diamond-shaped grids are arranged side-by-side in the X-axis direction, and five diamond-shaped grids are arranged side-by-side in the Y-axis direction. Further, five tiers each composed of the first layer and the second layer are arranged in the Z-axis direction. Further, the angle of two vertices of the diamond-shaped grid opposed to each other in the X-axis directional is set to 30 degrees, 45 degrees, 60 degrees, 75 degrees, and 100 degrees in this order along a direction toward the positive side of the Y-axis. Thus, in the diamond-shaped grids, the length in the Y-axis direction with respect to the width in the X-direction is relatively small on the side where a Y-coordinate value is small, and the length in the Y-axis direction with respect to the width in the X direction becomes larger toward the side where the Y-coordinate value is large.

With such a configuration, the second deformation-regulating member 220 has less elasticity in the Y direction (deformation direction) than elasticity in the X direction.

Further, in the second deformation-regulating member 220, elasticity in the X-axis direction is greater than elasticity in the Y-axis direction in a portion with a small Y-coordinate value, and elasticity in the X-axis direction and elasticity in the Y-axis direction are substantially equal to each other in a portion with a large Y-coordinate value. In addition, in the second deformation-regulating member 220, the portion with a small Y-coordinate value is almost not elongated in the X-axis direction even if the port is compressed by a Y-axis directional compressive force, whereas the portion with a large Y-coordinate value is elongated in the X-axis direction when compressed by the Y-axis directional compressive force.

Further, as mentioned above, the plurality of sets of first plate-shaped parts 223, each set of which constitutes a respective one of the plurality of first layers 222, are all in the same arrangement, and the plurality of sets of second plate-shaped parts 225, each set of which constitutes a respective one of the plurality of second layers 224, are all in the same arrangement. Thus, the set of first plate-shaped parts 223 of the first layer 222 and the set of second plate-shaped parts 225 of the second layer 224 are alternately arranged side-by-side linearly in the Z-axis direction at the grid points of the diamond shapes. This results in having very high elasticity in the Z-axis direction.

As above, in the second deformation-regulating member 220, the portion with a small Y-coordinate value is almost not elongated in the X-axis direction even if it is compressed by the Y-axis directional compressive force, whereas the portion with a large Y-coordinate value is elongated in the X-axis direction when compressed by the Y-axis directional compressive force. As a result, during depressurization, the voxel curves along the X-axis direction such that both sides thereof in the X-axis direction bend in a direction toward the negative side of the Y-axis, almost without contraction in the Z-axis direction.

FIGS. 11A and 11B are sectional views showing a state before deformation due to depressurization of the voxel 10 (10B) in which the second deformation-regulating member 220 is housed, and a state after the deformation. As mentioned above, in the second deformation-regulating member 220, the portion with a small Y-coordinate value is almost not elongated even if it is compressed by the Y-axis directional compressive force, whereas the portion with a large Y-coordinate value is elongated in the X-axis direction when compressed by the Y-axis directional compressive force. When the inside of the voxel 10B is depressurized, the casing 100 contracts, and the side wall of the casing 100 presses the second deformation-regulating member 220 in the X-axis direction, the Y-axis direction, and the Z-axis direction toward the center thereof. Thus, during depressurization, in the voxel 10B housing the second deformation-regulating member 220, a portion with a small Y-coordinate value is almost not elongated in the X-axis direction, whereas a portion with a large Y-coordinate value is elongated in the X-axis direction. As a result, the voxel curves along the X-axis direction such that both sides thereof in the X-axis direction bend in a direction toward the negative side of the Y-axis, as shown in FIGS. 11A and 11B. Since the second deformation-regulating member 220 has large elasticity in the Z-axis direction, the voxel 10B almost does contract in the Z-axis direction during depressurization.

The voxel 10B in which such a second deformation-regulating member 220 is housed in the casing 100 will hereinafter be referred to as "bending type voxel", wherein the X-axis direction will hereinafter be referred to as "bending axis direction", and the Y-axis direction will hereinafter be referred to as "bending direction".

(3) In Case of Shear

FIGS. 12A-12C illustrate a third deformation-regulating member when the shape of deformation of a voxel during depressurization is shear, wherein: FIG. 12A is a perspective view; FIG. 12B is a plan view; and FIG. 12C is a front view. The following description will be made on the assumption that three axis directions of the cubic shape of the third deformation-regulating member are an X-axis, a Y-axis, and a Z-axis.

The third deformation-regulating member 240 has a cubic shape as a whole, and is formed from, e.g., TPU (thermoplastic polyurethane). The third deformation-regulating member 240 may be formed using, e.g., a 3D printer. The material forming the third deformation-regulating member 240 may be any other suitable material as long as it has a desired elasticity, and the production method may also be any other suitable method although the method using the 3D printer is efficient.

As shown in FIGS. 12A-12C, the third deformation-regulating member 240 is constructed by alternately laminating a first layer 242 in which a plurality of first plate-shaped parts 243 are arranged in parallel in an XY plane, and a second layer 244 in which a plurality of second plate-shaped parts 245 are arranged in parallel in the XY plane. The first plate-shaped parts 243 provided in the first layer 242 do not intersect each other, and the second plate-shaped parts 245 provided in the second layer 244 do not intersect each other.

Each of the first plate-shaped parts 243 constituting the first layer 242 is composed of a plate-shaped segment placed perpendicularly to the XY plane. The first plate-shaped parts 243 linearly extend parallel to each other, while being inclined at a given positive angle to the X axis. In this embodiment, the angle of each of the first plate-shaped parts 243 with respect to the X-axis is set to 60°. A plurality of sets of the first plate-shaped parts 243, each set of which constitutes a respective one of a plurality of the first layers 242, are all in the same arrangement, and are arranged to overlap each other as viewed from the Z-axis direction.

Each of the second plate-shaped parts 245 constituting the second layer 244 is composed of a plate-shaped segment placed perpendicularly to the XY plane. Each of the second plate-shaped parts 245 linearly extends parallel to the X-axis. A plurality of sets of the second plate-shaped parts 245, each set of which constitutes a respective one of a plurality of the second layers 244, are all in the same arrangement, and are arranged to overlap each other as viewed from the Z-axis direction.

As shown in FIG. 12B, the first plate-shaped parts 243 constituting the first layer 242 and the second plate-shaped parts 245 constituting the second layer 244 form, in the XY plane, diamond-shaped (rhombus-shaped) grids each of whose one pair of parallel sides extend in the X-axis direction and each of whose other pair of parallel sides incline at a given angle to the X-axis. In the diamond-shaped grids, grid points 246 align along the X-axis direction and at an angle of 60° with respect to the Y-axis.

The diamond-shaped grids are formed into five lines in the Y-axis direction, and arranged in a staggered manner by offsetting an odd-numbered line and an even-numbered line from each other in the X-axis direction. In this embodiment, four or three unitary grids are arranged side-by-side in the X-axis direction, and five unitary grids are arranged side-by-side in the Y-axis direction. Further, five tiers each composed of the first layer and the second layer are arranged in the Z-axis direction.

With such a configuration, the third deformation-regulating member 240 has high elasticity against a compressive force in the X direction. Further, when a compressive force in the Y-axis direction acts on the third deformation-regulating member 240, the third deformation-regulating member 240 undergoes shear deformation such that it has a parallelogram shape as a whole (i.e. contracts in the Y-axis direction, wherein a portion thereof with a small Y-coordinate value is displaced in a direction toward the negative side of the X-axis, and a portion thereof with a large Y-coordinate value is displaced in a direction toward the positive side of the X-axis).

Further, as mentioned above, the plurality of sets of first plate-shaped parts 243, each set of which constitutes a respective one of the plurality of first layers 242, are all in the same arrangement, and the plurality of sets of second plate-shaped parts 245, each set of which constitutes a respective one of the plurality of second layers 244, are all in the same arrangement. Therefore, the set of first plate-shaped parts 243 of the first layer 242 and the set of second plate-shaped parts 245 of the second layer 244 are alternately arranged side-be-side linearly in the Z-axis direction at the grid points of the diamond shapes. This results in having very high elasticity in the Z-axis direction.

FIGS. 13A and 13B are sectional views showing a state before deformation due to depressurization of the voxel 10 (10C) in which the third deformation regulation member 240 is housed and a state after the deformation, respectively. As mentioned above, the third deformation-regulating member 240 has high elasticity against a compressive force in the X-direction, and when a compressive force in the Y-axis direction acts thereon, undergoes shear deformation such that it has a parallelogram shape as a whole. When the inside of the voxel 10C is depressurized, the casing 100 contracts, and the side wall of the casing 100 presses the third deformation-regulating member 240 in the X-axis direction, the Y-axis direction, and the Z-axis direction toward the center thereof. Thus, during depressurization, the voxel 10C housing the third deformation-regulating member 240 shear-deforms into a parallelogram shape as a whole although it does not contract in the X-axis direction, as shown in FIGS. 13A and 13B. Since the third deformation-regulating member 240 has large elasticity in the Z-axis direction, the voxel 10C almost does not contract in the Z-direction during depressurization.

As above, according to the third deformation-regulating member 240, during depressurization, the voxel almost does not contract in the Z-axis direction; contracts in the Y-axis direction; and almost does not contract in the X-axis direction, so that it shear-deforms as a whole.

The voxel in which such a third deformation-regulating member is housed in the casing will hereinafter be referred to as "shear type voxel", wherein a direction along which shear deformation occurs (X-axis direction) will hereinafter be referred to as "shear direction", and a direction along which contraction occurs (Y-axis direction) will hereinafter be referred to as "contraction direction"

(3) In Case of No-Deformation

FIGS. 14A-14C illustrate a fourth deformation-regulating member when the shape of deformation of a voxel during depressurization is no-deformation, wherein: FIG. 14A is a perspective view; FIG. 14B is a plan view; and FIG. 14C is a front view. The following description will be made on the assumption that three axis directions of the cubic shape of the fourth deformation-regulating member are an X-axis, a Y-axis, and a Z-axis.

The fourth deformation-regulating member 260 has a cubic shape as a whole, and is formed from, e.g., PLA (polylactic acid). The fourth deformation-regulating member 260 may be formed using, e.g., a 3D printer. The material forming the fourth deformation-regulating member may be any other suitable material as long as it has a desired elasticity, and the production method may also be any other suitable method although the method using the 3D printer is efficient.

As shown in FIGS. 14A-14C, the fourth deformation-regulating member 260 is constructed by alternately laminating a first layer 262 in which a plurality of first plate-shaped parts 263 are arranged in parallel in an XY plane, and a second layer 264 in which a plurality of second plate-shaped parts 265 are arranged in parallel in the XY plane. The first plate-shaped parts 263 provided in the first layer 262 do not intersect each other, and the second plate-shaped parts 265 provided in the second layer 264 do not intersect each other.

Each of the first plate-shaped parts 263 constituting the first layer 262 is composed of a plate-shaped segment placed perpendicularly to the XY plane. Each of the first plate-shaped parts 263 linearly extends at an angle of 45° to the X axis, and is inclined in a direction toward the positive side of the Y-axis (i.e., in the up direction in FIG. 14B), as gradually going in a direction toward the positive side of the X-axis (i.e., in the right direction in FIG. 14B). A plurality of sets of the first plate-shaped parts 263, each set of which constitutes a respective one of a plurality of the first layers 262, are all in the same arrangement, and are arranged to overlap each other as viewed from the Z-axis direction.

Each of the second plate-shaped parts 265 constituting the second layer 264 is composed of a plate-shaped segment placed perpendicularly to the XY plane. Each of the second plate-shaped parts 265 linearly extends at an angle of −45° to the X axis, and is inclined in a direction toward the negative side of the Y-axis (i.e., in the down direction in FIG. 14B), as gradually going in a direction toward the X-axis (i.e., in the right direction in FIG. 14B). A plurality of sets of the second plate-shaped parts 265, each set of which constitutes a respective one of a plurality of the second layers 264, are all in the same arrangement, and are arranged to overlap each other as viewed from the Z-axis direction.

As shown in FIG. 14B, the first plate-shaped parts 263 constituting the first layer 262 and the second plate-shaped parts 265 constituting the second layer 264 form square-shaped grids in the XY plane. Grid points of the square-shaped grids are aligned in the X-axis direction and in the Y-axis direction. With such a configuration, in the first deformation-regulating member 260, elasticity in the X direction (deformation direction) is equal to elasticity in the Y direction. Further, since the first deformation-regulating member 260 is formed from PLA, elasticity in the X direction and elasticity in the Y direction are very high.

Further, as mentioned above, the plurality of sets of first plate-shaped parts 263, each set of which constitutes a respective one of the plurality of first layers 262, are all in the same arrangement, and the plurality of sets of second plate-shaped parts 265, each set of which constitutes a respective one of the plurality of second layers 264, are all in the same arrangement. Therefore, the set of first plate-shaped parts 263 of the first layer 262 and the set of second plate-shaped parts 265 of the second layer 264 are alternately arranged side-be-side linearly in the Z-axis direction at the grid points 266 of the square shapes. This results in having very high elasticity in the Z-axis direction.

FIGS. 15A and 15B are sectional views showing a state before deformation due to depressurization of the voxel 10 (10C) in which the fourth deformation-regulating member 260 is housed and a state after the deformation, respectively. As mentioned above, in the fourth deformation-regulating member 260, elasticity is very high in the X-axis, Y-axis and Z-axis directions. Thus, in the voxel 10 (10D) housing the fourth deformation-regulating member 260, even if the inside of the casing 100 is depressurized and is urged to contract, the fourth deformation-regulating member 260 almost does not contract in the X-axis, Y-axis and Z-axis directions, and consequently the voxel 10D substantially does not deform.

The voxel 10D in which such a fourth deformation-regulating member 260 is housed in the casing 100 will hereinafter be referred to as "no-deformation type voxel"

The deformation-regulating member to be housed in the casing is not limited to the aforementioned configurations. For example, in a case where three-dimensional deformation is required, the arrangement of the plate-shaped parts in each layer may be changed. Alternatively, three-dimensional grids may be prepared, and the extension direction and thickness of each of a plurality of members forming the grids may be appropriately adjusted.

<Connector and Closing Member>

A connector for connecting voxels together, and a sealing member used for sealing an opening of a voxel will be described below. Described below are (1) a fluid-communicating connector for connecting adjacent two voxels together in a state in which internal spaces of the voxels are in fluid communication with each other; (2) a closing connector for connecting two voxels together without fluidically communicating between internal spaces of the connected voxels; (3) a sealing member for sealing an opening of a voxel, which is not connected to another voxel; and (4) a tube connector for connecting a voxel and a silicone tube together in a state in which an internal space of the voxel and the inside of the silicone tube are in fluid communication with each other.

(1) Fluid-Communicating Connector

FIGS. 16A-16C illustrate a fluid-communicating connector, wherein: FIG. 16A is a perspective view; FIG. 16B is a front view; and FIG. 16C is a vertical sectional view. The fluid-communicating connector is formed from, e.g., resin or the like. As shown in FIGS. 16A-16C, the fluid-communicating connector 500 comprises a columnar base 504, and a pair of circular parts 502 connected to both ends of the base 504, wherein the fluid-communicating connector 500 is formed rotationally symmetrically. Each of the circular parts 502 has a flat plate shape, and is attached such that the center thereof passes through a central axis of the base 504. The length of the base 504, i.e., a distance between the pair of circular parts 502, is approximately equal to twice the thickness of the casing 100. Further, the diameter of the base 504 is approximately equal to the inner diameter of the opening 120 of the casing 100. The fluid-communicating connector 500 further comprises a columnar communication hole 506 formed to penetrate the center of the base 504 and the circular parts 502.

FIG. 17 is an enlarged sectional view showing a state in which opposed side faces of the casings of two voxels are connected together by the fluid-communicating connector. As shown in FIG. 17, the fluid-communicating connector 500 couples adjacent two voxels 10 arranged such that one face of one of the voxels is opposed to one face of the other voxel, together in a state in which internal spaces 110 of the voxels are in fluid communication with each other. The fluid-communicating connector 500 is installed such that the pair of circular parts 502 are located inside the internal spaces 110 of the pair of voxels 10 to be coupled, respectively, and the base 504 penetrates through the openings 120 formed in the opposed walls of the pair of voxels 10, whereby the fluid-communicating connector 500 can couple the pair of voxels 10 together. In this state, the internal spaces 110 of the coupled voxels 10 are fluidically communicated with each other through the communication hole 506 formed in the fluid-communicating connector 500. When installing the fluid-communicating connector 500, one of the circular parts 502 may be inserted into the internal space 110 of one of the pair of voxels 10 from the opening 120 of the one voxel 10, and the other circular part 502 may be inserted into the internal space 110 of the other voxel 10 from the opening 120 of the other voxel 10. This results in a state in which the walls of the casings 100 of the pair of voxels 10 are sandwiched between the pair of circular parts 502, whereby the voxels 10 are connected together.

(2) Closing Connector

FIGS. 18A-18C illustrate a closing connector, wherein: FIG. 18A is a perspective view; FIG. 18B is a front view; and FIG. 18C is a vertical sectional view. The closing connector 520 is formed from, e.g., resin or the like. As shown in FIGS. 18A-18C, the closing connector 520 comprises a columnar base 524, and a pair of circular parts 522 connected, respectively, to opposite ends of the base 524, wherein the closing connector 520 is formed rotationally symmetrically. Each of the circular parts 522 has a flat plate shape, and is attached such that the center thereof passes through a central axis of the base 524. The length of the base 524, i.e., a distance between the pair of circular parts 522, is approximately equal to twice the thickness of the casing 100. Further, the diameter of the base 524 is approximately equal to the inner diameter of the opening 120 of the casing 100. The closing connector 520 is not formed with the communication hole as in the fluid-communicating connector.

FIG. 19 is an enlarged sectional view showing a state in which opposed side faces of the casings of two voxels are connected together by the closing connector. As shown in FIG. 19, the closing connector 520 couples adjacent two voxels 10 arranged such that one face of one of the voxels is opposed to one face of the other voxel, together in a state in which internal spaces 110 of the voxels are disconnected from each other. The closing connector 520 is installed such that the pair of circular parts 522 are located inside the internal spaces 110 of the pair of voxels 10 to be coupled, respectively, and the circular parts 522 penetrates through the openings 120 formed in the opposed walls of the pair of voxels 10, whereby the closing connector 520 can couple the pair of voxels 10 together. In this state, the openings 120 of the coupled voxels 10 are closed by the closing connector 520. When installing the closing connector 520, one of the circular parts 522 may be inserted into the internal space 110 of one of the pair of voxels 10 from the opening 120 of the one voxel 10, and the other circular part 522 may be inserted into the internal space 110 of the other voxel 10 from the opening 120 of the other voxel 10. This results in a state in which the walls of the casings 100 of the pair of voxels 10 are sandwiched between the pair of circular parts 522, whereby the voxels 10 are connected together.

(3) First Sealing Member

FIGS. 20A-20C illustrate a first sealing member, wherein: FIG. 20A is a perspective view; FIG. 20B is a front view; and FIG. 20C is a vertical sectional view. The first sealing member is formed from, e.g., resin or the like. As shown in FIGS. 20A-20C, the first sealing member 540 comprises a columnar base 554, and a pair of circular parts 542 connected, respectively, to opposite ends of the base 544. Each of the circular parts 542 has a flat plate shape, and is attached such that the center thereof is attached such that it passes through a central axis of the base 544. The length of the base 544, i.e., a distance between the pair of circular parts 542, is approximately equal to the thickness of the casing 100. Further, the diameter of the base 544 is approximately equal to the inner diameter of the opening 120 of the casing 100. The first sealing member 540 is not formed with the communication hole as in the fluid-communicating connector.

FIG. 21 is an enlarged sectional view showing a state in which the opening of the casing of the voxel is sealed by the first sealing member. As shown in FIG. 21, the first sealing member 540 closes the opening 120 formed in the casing of the voxel 10, which is not coupled to another voxel. The first sealing member 540 can be attached to the opening 120 of the voxel 10 by inserting one of the circular parts 542 into the internal space 110 of the voxel 10 from the opening 120 of the voxel 10. This results in a state in which the wall of the voxel 10 is sandwiched between the pair of circular parts 542, whereby the first sealing member 540 is attached to the opening 120 of the voxel 10 and thus the opening 120 is closed.

(4) Second Sealing Member

FIGS. 22A-22C illustrate a second sealing member, wherein: FIG. 22A is a perspective view; FIG. 22B is a front view; and FIG. 22C is a vertical sectional view. The second sealing member is formed from, e.g., resin or the like. As shown in FIGS. 22A-22C, the second sealing member 580 comprises: a columnar base 584; an outer circular part 586 connected to one of opposite ends of the base 584; and an inner circular part 588 connected to the other end of the base 584. Each of the circular parts 586, 588 has a flat plate shape, and is attached such that the center thereof is attached such that it passes through a central axis of the base 584. The diameter of the inner circular part 588 is set to be equal to the diameter of the circular parts 542 of the first sealing member 540, so as to prevent the casing from being damaged when inserting the inner circular part 588 into the casing 100 through the opening 120. On the other hand, the diameter of the outer circular part 586 is greater than the diameter of the inner circular part 588, and slightly less than the length of one side of the casing 100. The length of the base 584, i.e., a distance between the inner circular part 588 and the outer circular part 586, is approximately equal to the thickness of the casing 100. Further, the diameter of the base 584 is approximately equal to the inner diameter of the opening 120 of the casing 100. The second closing connector 580 is not formed with the communication hole as in the fluid-communicating connector.

FIG. 23 is an enlarged sectional view showing a state in which the opening of the casing of the voxel is sealed by the second sealing member. As shown in FIG. 23, the second sealing member 580 closes the opening 120 which is not coupled to another voxel. The second sealing member 580 can be attached to the opening 120 of the voxel 10 by inserting the inner circular part 588 into the internal space 110 of the voxel 10 from the opening 120 of the voxel 10. This results in a state in which the wall of the voxel 10 is sandwiched between the inner circular part 588 and the outer circular part 586, whereby the second sealing member 580 is attached to the opening 120 of the voxel 10 and thus the opening is closed.

With a view to imparting functionality and texture to surfaces when assembled as a soft robot, an outer surface of the outer circular part 586 is subjected to surface treatment, coating, or deposition of a surface material. For example, friction can be adjusted by forming the outer surface of the outer circular part 586 into a roughened surface or a smooth surface. Further, the outer surface of the outer circular part 586 may be coated with a resin such as an ultraviolet curable resin, and thereby formed as a glossy low friction surface.

Further, adherence to an object when gripping the object by the soft robot can be enhanced by applying a material such as a shape memory gel to the outer surface of the outer circular part 586. Further, a soft texture can be imparted to the surface of the soft robot by attaching a fabric or the like to the outer surface of the outer circular part 586. The outer circular part 586 located on the exterior side of the second sealing member 580 in this embodiment has a circular shape. However, the present invention is not limited thereto, but may be any other suitable shape such as a quadrilateral shape.

(5) Tube Connector

FIGS. 24A-24C illustrate a tube connector, wherein: FIG. 24A is a perspective view; FIG. 24B is a front view; and FIG. 24C is a vertical sectional view. The tube connector 560 is formed from, e.g., resin or the like. As shown in FIGS. 24A-24C, the tube connector 560 comprises a circular part 562, and a tubular part 564 standingly provided to the circular part 562, wherein the tube connector 560 is formed rotationally symmetrically. The circular part 562 has a circular flat plate shape. The tubular part 564 is provided to stand vertically with respect to the circular part 562, and formed in a tube shape. The tubular part 564 is formed such that a central axis thereof is aligned with the center of the circular part 562 in a straight line. The tubular part 564 has a diameter approximately equal to the inner diameter of the opening 120 of the casing 100, and a distal end of the tubular part 564 is increased in outer diameter and formed as an enlarged diameter portion 564A. The tube connecter 560 is formed with a columnar through-hole 566 which penetratingly extends from the circular part 562 to a distal end of the tubular part 564.

FIG. 25 is an enlarged sectional view showing a state in which a silicone tube is connected to a voxel by the tube connector. The tube connector 560 couples the voxel 10 and the silicone tube 20 together in a state in which the internal space 110 of the voxel 10 and an internal space 22 of the silicone tube 20 are in fluid communication with each other. The tube connector 560 is disposed such that the circular part 562 is located in the internal space 110 of the casing 100, and the tubular part 564 is inserted through the opening 120 formed in the wall of the voxel 10, wherein the voxel 10 and the silicone tube 20 can be connected together by inserting the tubular part 564 into the silicone tube 20. In this state, the internal space 110 of the voxel 10 achieves fluid communication through the through-hole 566 of the tube connector 560. When attaching the tube connector 560, the circular part 562 may be inserted into the internal space 110 from the opening 120 of the voxel 10, and then the tubular part 564 of the tube connector 560 may be inserted into the internal space 22 of the silicone tube 20.

<Robot Behavior>

Returning to FIGS. 1A-1D, the fluid-communicating connector 500 is attached to the openings 120 of the opposed faces of each adjacent pair of voxels 10, and the adjacent pair of voxels 10 are coupled together in a state in which the internal spaces 110 thereof are fluidically communicated with each other by the fluid-communicating connector 500.

Further, the tube connector 560 is attached to the opening 120 of the side face (face on the side opposite to the adjacent voxel) of an endmost (right end-side in FIG. 1A) one of the voxels 10. Then, one end of the silicone tube 20 is connected to the tubular portion 564 of the tube connector 560, and the suction pump 30 is connected to the other end of the silicone tube 20.

The sealing members 540 are attached, respectively, to other openings 120 of the voxels 10. With such a configuration, the internal spaces 110 of all the voxels 10 are in fluid communication with each other, and when the suction pump 30 is driven, the internal spaces 110 of all the voxels 10 are depressurized via the silicone tube 20.

The behavior of the soft robot to which each type of voxel is applied will be described below. The following description will be made based on a case where the internal spaces 110 of the voxels 10 are depressurized by the suction pump 30 in a state in which the face of the voxel 10, to which the tube connector connected with the suction pump 30 is attached, is fixed.

(1) Case where Contraction Type Voxel is Used

FIG. 26 is a plan view showing shapes before and after deformation of a soft robot according to an embodiment in which the contraction type voxel is applied to all the voxels of the robot illustrated in FIG. 1. In the soft robot 1A of this embodiment, voxels are coupled together such that a direction along which elasticity of the first deformation-regulating member is small (Y-axis direction) is equal to the coupling direction A of the voxels.

In the case where the contraction type voxels 10A are coupled together as shown in FIG. 26, when the suction pump 30 is controllably driven by the control device 32 to depressurize the internal spaces of the voxels 10A via the silicone tube 20, all the voxels 10A contracts in the direction along which elasticity is small (Y-axis direction). Thus, the voxels 10A constituting the soft robot 1A contracts in the coupling direction A.

Then, when the suction by the suction pump 30 is released, air flows into each voxel 10A, and each voxel 10A returns to the original cubic shape. Thus, the soft robot 1A returns to its initial shape.

(2) Case where Bending Type Voxel is Used

FIG. 27 shows shapes before and after deformation of a soft robot according to an embodiment in which the bending type voxel is applied to all the voxels of the robot illustrated in FIG. 1. In the soft robot 1 B of this embodiment, the bending axis direction (X-axis direction) of each of the bending type voxels 10B is equal to the coupling direction A of the voxels. Further, the bending direction (Y-axis direction) of four of the voxels 10B on the distal end side of the line of the voxels 10B is oriented in one direction B perpendicular to the coupling direction (oriented upwardly in the figure), and the bending direction (Y-axis direction) of four of the voxels 10B on the other side connected to the suction pump 30 is oriented in an opposite direction to the direction B (oriented downwardly in the figure).

In the case where the bending type voxels 10 B are coupled together as shown in FIG. 27, when the suction pump 30 is controllably driven by the control device 32 to depressurize the internal spaces of the voxels 10B via the silicone tube 20, the four voxels 10B on the distal end side curve such that it is convexed upwardly in the figure, and the four voxels 10B on the side of the suction pump 30 curve such that they are convexed downwardly in the figure. Consequently, the soft robot 1B curves in an S-shape.

Then, when the suction by the suction pump 30 is released, air flows into each voxel 10B, and each voxel 10B returns to the original cubic shape. Thus, the soft robot 1B returns to its initial shape.

(3) Case where Shear Type Voxel is Used

FIG. 28 shows shapes before and after deformation of a soft robot of an embodiment in which the shear type voxel is applied to all the voxels of the robot illustrated in FIG. 1. In the soft robot 1C of this embodiment, the shear direction (X-axis direction) of each of the shear types of voxels 10C is equal to the coupling direction A of the voxels 10C, and the contraction direction (Y-axis direction) is oriented in one direction B perpendicular to the coupling direction (oriented upwardly in the figure).

In the case where the shear type voxels 10C are coupled together as shown in FIG. 28, when the suction pump 30 is controllably driven by the control device 32 to depressurize the internal spaces of the voxels 10C via the silicone tube 20, each of the voxels 10C shear-deforms into a parallelogram shape. Consequently, the entire soft robot 1C deforms into a parallelogram shape. In this process, the soft robot 1C is inclined downwardly in FIG. 28 toward the distal end, as a whole, because the face of the voxel 10, to which the tube connector connected with the suction pump 30 is attached, is fixed.

Then, when the suction by the suction pump 30 is released, air flows into each voxel 10C, and each voxel 10C returns to the original cubic shape. Thus, the soft robot 1C returns to its initial shape.

(4) Case where Non-Deformation Type Voxel is Used

FIG. 29 shows shapes before and after deformation of a soft robot according to an embodiment in which the shear type voxel is applied to all the voxels of the robot illustrated in FIG. 1. In the soft robot 1D of this embodiment, a stacking direction (Z-axis direction) of each of the non-deformation type voxels 10D is oriented in a direction perpendicular to the coupling direction A of the voxels 10D.

In the case where the non-deformation type voxels 10 D are coupled together as shown in FIG. 29, the shape of the voxels 10D does not substantially deform even when the suction pump 30 is controllably driven by the control device 32 to depressurize the internal spaces of the voxels 10D via the silicone tube 20. Consequently, the entire soft robot 1D does not deform.

OTHER ASSEMBLY EXAMPLES

The soft robots as shown in FIG. 1 and FIGS. 26-29 are reconstructible. Specifically, a robots having a different shape and operation can be reconstructed by: separating the voxels; detaching the connectors, the sealing members and the tube connectors from the separated voxels; and recoupling the voxels together by attaching the connectors, the sealing members and the tube connectors thereto in a new manner. Examples of a soft robot assembly constructed using the aforementioned voxels, connector, sealing member, and tube connector will be shown below. In the following description, a white rectangle is shown at a part corresponding to an opening to which the fluid-communicating connector is attached; a black rectangle is shown at a part corresponding to an opening to which the closing connector is attached; and no rectangle is shown at a part to which the sealing member or the tube connector is attached.

(1) First Assembly Example

FIGS. 30A and 30B are front views showing the configuration of a soft robot of a first assembly example, wherein FIG. 30A shows a pre-deformation state, and FIG. 30B shows a post-deformation stat. As shown in FIGS. 30A and 30B, the soft robot 1E of the first assembly example is configured to function as a two-finger type end effector. In the soft robot 1 E, four non-deformation type voxels 10D are connected in a horizontal direction by the fluid-communicating connectors 500, and three bending type voxels 10B are connected by the fluid-communicating connectors 500 to extend downwardly from each of two of the voxels 10D located on opposite ends thereof. In this way, the internal spaces of all the voxels 10 B, 10 D are fluidically communicated with each other. Each of the bending type voxels 10B is disposed such that the bending axis direction (X-axis direction) is oriented in an up-down direction, and the bending direction is oriented outwardly in the horizontal direction. The silicone tube 20 is connected to the opening of the upper face of second one of the four non-deformation type voxels 10D arranged side-by-side in the horizontal direction.

As shown in FIG. 30B, when the suction pump 30 is controllably driven by the control device 32 to depressurize the internal spaces of the voxels 10B, 10D via the silicone tube 20, each of the non-deformation type voxels 10D almost does not deform, but each of the bending type voxels 10B curves such that a horizontally outward portion thereof is convexed. Since an upper end of each of the two sets of bending e type voxels 10B is connected to the non-deformation type voxel 10D, a lower end thereof moves inwardly. This makes it possible to pinch and hold a workpiece by the two sets of bending type voxels 10B.

Then, when the suction by the suction pump 30 is released, air flows into each of the voxels 10B, 10D, and each of the voxels 10B, 10D returns to the original cubic shape. Thus, the soft robot 1E returns to its initial shape.

(2) Second Assembly Example

FIGS. 31A-31D illustrate the configuration of a soft robot of a second assembly example, wherein: FIG. 31A is a front view in a pre-deformation state; FIG. 31B is a sectional view of B-B in FIG. 31 A; FIG. 31C is a sectional view of C-C in FIG. 31A; and FIG. 31D is a front view in a post-deformation state. As shown in FIGS. 31A-31D, the soft robot 1F of the second assembly example is configured to function as a four-finger type end effector.

The soft robot 1F is configured such that a plurality of voxels 10A, 10D are connected by the fluid-communicating connectors 500 to form a cruciform shape extending horizontally in a front-rear direction and in a right-left direction, and four sets of a plurality of voxels 10B, 10C are connected, respectively, to four voxels 10D at respective distal ends of the cruciform shape to extend downwardly. The voxels 10A, 10D connected in the cruciform shape comprise five voxels 10A, 10D connected together in the front-rear direction, and five voxels 10A, 10D connected together in the right-left direction, wherein the non-deformation type voxel 10D is disposed at each of the center and four distal ends of the cruciform shape, and the contraction type voxel 10A is disposed between the center voxel 10D and each of the distal-end voxel 10D. Each of the contraction type voxel 10 A is disposed such that the contraction direction (Y-axis direction) is equal to the coupling direction (a right-left direction in FIG. 31A and FIG. 31C).

Three bending type voxels 10B are connected to the voxel 10D at each distal end of the cruciform shape by the fluid-communicating connectors 500 to extend downwardly, and the shear type voxel 10C is connected to a lower end of a lowermost one of the bending type voxels 10B by the fluid-communicating connector 500. Each of the bending type voxels 10B is disposed such that the bending axis direction (X-axis direction) is oriented in the up-down direction, and the bending direction is oriented outwardly in the horizontal direction. Further, the shear-type voxel 10C is disposed such that the shear direction (X-axis direction) is oriented in an in-out direction, and the contraction direction (Y-axis direction) is oriented in the up-down direction. In this way, the internal spaces of all the voxels 10A, 10B, 10C, 10D are fluidically communicated with each other. The silicone tube 20 is connected to the opening of the upper surface of the voxel 10D disposed at the center of the cruciform shape.

As shown in FIG. 31D, when the suction pump 30 is controllably driven by the control device 32 to depressurize the internal spaces of the voxels 10A, 10B, 10C, 10D via the silicone tube 20, the non-deformation type voxels 10D almost do not deform, but the contraction type voxels 10A contract in the horizontal direction. Thus, the non-deformation type voxels 10D at the distal ends of the cruciform shape move toward the center. Further, each of the bending type voxels 10B connected, respectively, to the non-deformation type voxels 10D at the distal ends of the cruciform shape curves such that a horizontally outward portion thereof is convexed. Thus, the shear type voxel 10C connected to the lower end of the bending type voxel 10B moved inwardly. In addition, the shear type voxel 10C shear-deforms, and a lower end thereof moves inwardly. This makes it possible to pinch and hold a workpiece by a finger part composed of four sets of the bending type voxels 10B and the shear type voxel 10C.

Then, when the suction pump 30 is controlled by the control device 32 to release the suction by the suction pump 30, air flows into each of the voxels 10A, 10B, 10C, 10D, and each of the voxels 10A, 10B, 10C, 10D returns to the original cubic shape. Thus, the soft robot 1F returns to its initial shape.

(3) Third Assembly Example

FIGS. 32A and 32B are a front view showing the configuration of a soft robot of a third assembly example, wherein FIG. 32A shows a pre-deformation stat, and FIG. 32B shows a post-deformation state. As shown in FIGS. 32A and 32B, the soft robot 1G of the third assembly example is configured to function as a walking type soft robot 1G. In the soft robot 1G, three voxels 10B, 10D are connected in the horizontal direction by fluid-communicating connectors 500 to form a base, and the curving type voxel 10B is connected to each of two voxels 10B located at opposite end of the base, by a fluid-communicating connectors 500, to form a leg. In this way, the internal spaces of all the voxels 10B, 10D are fluidically communicated with each other.

Each of the front-end and rear-end voxels 10B constituting the base is disposed such that the bending axis direction (X-axis direction) is oriented in the up-down direction, and the bending direction (Y-axis direction) is oriented centrally in the horizontal direction. The voxel 10B constituting the front leg is disposed such that the bending axis direction (X-axis direction) is oriented in the up-down direction, and the bending direction (Y-axis direction) is oriented centrally in the horizontal direction. The voxel 10B constituting the rear leg is disposed such that the bending axis direction (X-axis direction) is oriented in the up-down direction, and the bending direction (Y-axis direction) is oriented rearwardly in the horizontal direction. The silicone tube 20 is connected to the opening of the upper face of the non-deformation type voxel 10D.

As shown in FIG. 32B, when the suction pump 30 is controllably driven by the control device 32 to depressurize the internal spaces in the voxels 10B, 10D via the silicone tube 20, the non-deformation type voxel 10D almost does not deform, but each of the bending type voxels 10B connected to the upper and lower sides on the front side of the base curves such that a horizontally rearward portion thereof is convexed. Further, the voxel 10B on the rear side of the base curves such that a horizontally rearward portion thereof is convexed, and the voxel 10B of the rear leg curves such that a horizontally forward portion thereof is convexed. Thus, a lower surface of the voxel 10B constituting the rear leg becomes horizontal, and the voxel 10B constituting the front leg moves forwardly.

Then, from this state, when the suction by the suction pump 30 is released, air flows into each of the voxels 10B, 10D, and each of the voxel 10B, 10D returns to the original cubic shape, and thus the soft robot 1G returns to its initial shape. In this process, the entire soft robot 1G is drawn forwardly by the voxel 10B constituting the front leg.

By repeating the state in which the internal spaces of the voxels 10B and 10D are depressurized by the suction pump 30 and the state in which the depressurization is released in the above manner, the soft robot 1G moves forwardly (left side of FIG. 32A and FIG. 32B).

(4) Fourth Assembly Example

FIGS. 33A-33G are diagrams showing the configuration of a soft robot of a fourth assembly example. FIG. 33A is a front view in a pre-deformation state; FIG. 33B is a sectional view of B-B in FIG. 33A; FIG. 33C is a sectional view of C-C in FIG. 33A; and FIG. 33D is a sectional view of D-D in FIG. 33 A. Further, FIG. 33E is a sectional view of B-B in FIG. 33A in a post-deformation state; FIG. 33F is a sectional view of C-C in FIG. 33 A in the post-deformation state; and FIG. 33G is a sectional view of D-D in FIG. 33 A in the post-deformation state.

As shown in FIGS. 33A to 33D, the soft robot 1H of the fourth assembly example is configured to function as a soft robot 1H imitating a hand of a person.

The soft robot 1H comprises a palm portion 40 formed by connecting non-deformation type voxels 10D together, and five finger portions 42, 43, 44, 45, 46 each extending downwardly from the palm portion 40.

In the palm portion 40, non-deformation type voxels 10D are connected in the horizontal direction in the form of five lines. In the first line, three voxels 10D are connected together in the up-down direction, and in each of the second-fifth lines, four voxels 10D are connected together in the up-down direction. The voxels 10D at respective upper ends of the five lines are aligned in the horizontal direction. The voxels 10D constituting the palm portion 40 and located adjacent to each other in the up-down or horizontal direction are connected by the fluid-communicating connector 500.

Each of the finger portions 42, 43, 44, 45, 46 comprises a plurality of bending type voxels 10B connected together in the up-down direction. Each of the finger portions 42, 46 in the first and fifth lines is formed by connecting three voxels 10B together, and each of the finger portions 43, 44, 45 in the second-fourth lines is formed by connecting four voxels 10B together. The voxels 10B constituting respective ones of the finger portions 42, 43, 44, 45, 46 and located at respective upper ends of the finger portions 42, 43, 44, 45, 46 are connected, respectively, to the voxels 10D constituting the palm portion 40 and located at a lower end of the palm portion 40 by the fluid-communicating connectors 500. All openings of side faces of the finger portions 42, 43, 44, 45, 46 (faces each facing in a lateral direction of FIG. 33A and faces facing in a direction perpendicular to the drawing sheet of FIG. 33A) are closed by the sealing members 540.

The voxels 10B constituting the finger portions 42, 43, 44, 45, 46 are arranged such that the bending axis direction (X-axis direction) is oriented in the up-down direction, and the bending direction (Y-axis direction) is oriented forwardly (in the right direction of FIG. 33B, FIG. 33C, FIG. 33D). Thus, the voxels 10D constituting the palm portion 40 and the voxels 10B constituting the finger portions 42, 43, 44, 45, 46 are in a state in which the internal spaces thereof are in fluid communication with each other.

The silicone tube 20 is connected to the opening of the upper face of the uppermost central voxel 10D constituting the palm portion 40.

As shown in FIGS. 33E-33G, when the suction pump 30 is driven to depressurize the internal spaces of the voxels 10B, 10D via the silicone tube 20, the non-deformation type voxels 10D constituting the palm portion 40 almost do not deform, but each of the bending type voxels 10B constituting each finger part 42, 43, 44, 45, 46 curves such that a rearward portion thereof is convex. This makes it possible to curve the finger portions 42, 43, 44, 45, 46 as if to close a hand.

Further, from this state, when the suction by the suction pump 30 is released, air flows into each of the voxels 10B, 10D, and each of the voxels 10B, 10D returns to the original cubic shape, and thus the soft robot 1H returns to its initial shape.

(5) Fifth Assembly Example

FIG. 34 is a front view showing the configuration of a soft robot of a fifth assembly example. The soft robot of the fifth assembly example is different from the soft robot of the fourth assembly example, in terms of the configuration of the palm portion and the number of suction pumps 30.

As shown in FIG. 34, in the soft robot 1I of the fifth assembly example, the voxels 10D constituting a palm portion 140 are connected in the up-down direction by the fluid-communicating connectors 500, and adjacent voxels 10D each constituting a respective one of adjacent lines are connected together by the closing connector 520. Thus, the non-deformation type voxels 10D constituting the first line of the palm portion 140 and the bending type voxels 10B constituting the finger portion 42 of the first line are in a fluid communication state. Similarly, the non-deformation type voxels 10D constituting the second line of the palm portion 140 and the bending type voxels 10B constituting the finger portion 42 of the second line are in fluid communication with each other; the non-deformation type voxels 10D constituting the third line of the palm portion 140 and the bending type voxels 10B constituting the finger portion 42 of the third line are in fluid communication with each other; the non-deformation type voxels 10D constituting the fourth line of the palm portion 140 and the curing type voxels 10B constituting the finger portion 42 of the fourth line are in fluid communication with each other; and the non-deformation type voxels 10D constituting the fifth line of the palm portion 140 and the curing type voxels 10B constituting the finger portion 42 of the fifth line are in fluid communication with each other. The voxels 10B, 10D constituting each line are not in fluid communication with the voxels 10B, 10D constituting other lines.

Five suction pumps 30 are connected to the upper faces of the uppermost voxels 10D of the first-fifth lines of the palm portion 140 through five silicone tubes 20, respectively. Each of the suction pumps 30 is electrically connected to the control device 32, and the control device 32 can drive the suction pumps 30, independently.

In the soft robot 1I of the fifth assembly example having such a configuration, the finger portions 42, 43, 44, 45, 46 can be curved independently. Specifically, for example, by driving only the suction pump 30 connected to the voxels 10D constituting the palm portion 140 of the first line by the control device 32, the insides of the voxels 10D of the first line and the voxels 10B of the first line can be depressurized to curve only the finger portion 42 of the first line. Similarly, the finger portions 43, 44, 45, 46 of the second-fifth limes can be curved, independently.

(6) Sixth Assembly Example

FIGS. 35A-35E illustrate the configuration of a soft robot of a sixth assembly example, wherein FIGS. 35A-35C show a pre-deformation state, and FIGS. 35D and 35E show a post-deformation state. Further, FIG. 35A is atop view; FIGS. 35B and 35D are sectional views of B-B in FIG. 35A; and FIGS. 35C and 35E are sectional views of C-C in FIG. 35A. In each sectional view, the fluid-communicating connector is shown by overlapping a white rectangle. As shown in FIGS. 35A to 35E, the soft robot 1J of the sixth assembly example is configured as a planar soft robot. In the soft robot 1J, voxels 10A and 10D are connected together by the fluid-communicating connectors 500 to form five lines in the lateral direction, and the four lines in the vertical direction. In this way, the internal spaces of all the voxels 10 A and 10 D are fluidically communicated with each other.

The non-deformation type voxel 10D is used as each of the voxels located on the outer periphery of the assembly, and the contraction type voxel 10A is used as each of the voxels constituting of three inside lines in the lateral direction and two inside lines in the vertical direction. The voxels 10A in a center region consisting of three inside lines in the lateral direction and two inside lines in the vertical direction are arranged such that the contraction direction (Y-axis direction) is oriented in the up-down direction (up-down direction in FIG. 35B and FIG. 35C). The silicone tube 20 is connected to the opening of the side face of the non-deformation type voxel 10D located at one corner.

As shown in FIGS. 35D and 35E, when the suction pump 30 is controllably driven by the control device 32 to depressurize the internal spaces in the voxels 10A, 10 D via the silicone tube 20, each of the non-deformation type voxels 10D almost does not deform, but each of the contraction type voxels 10A contracts vertically. Thus, the central region of an upper surface of the soft robot 1J is concaved.

Further, from this state, when the suction by the suction pump 30 is released, air flows into each of the voxels 10A, 10D, and each of the voxels 10A, 10D returns to the original cubic shape, and thus the soft robot 1J returns to its initial planar shape.

For example, the soft robot 1J according to this assembly example may be incorporated in apart of a vehicle interior. In this case, the soft robot 1J is normally kept in a flat state, and the central region of the soft robot 1J can be concaved as needed to utilize it as a pocket for allowing an object to be placed therein.

(7) Seventh Assembly Example

FIGS. 36A-36C illustrate the configuration of a soft robot of a seventh assembly example, wherein FIG. 36A and FIG. 36B show a pre-deformation state, and FIG. 36C shows a post-deformation state. Further, FIG. 36A is a top view, and FIGS. 36B and 36C are sectional views of B-B in FIG. 36A. In each sectional view, the fluid-communicating connector is shown by overlapping a white rectangle. As shown in FIGS. 36A-36C, the soft robot 1K of the seventh assembly example is configured as a planar soft robot. In the soft robot 1K, voxels 10 B are connected by the fluid-communicating connectors 500 to form three lines in the lateral direction and four lines in the vertical direction. In this way, the internal spaces of all the voxels 10B are fluidically communicated with each other.

The bending type voxel 10B is used as each of the voxels. Each of the voxels 10B is disposed such that the bending direction (Y-axis direction) is oriented downwardly (in the down direction in FIG. 36B), and the bending axis direction (X-axis direction) is oriented in the lateral direction (the right-left direction in FIG. 36B). The silicone tube 20 is connected to the opening of the upper face of the voxel 10B located in the second line in the lateral direction and the second line in the vertical direction.

As shown in FIG. 36C, when the suction pump 30 is controllably driven by the control device 32 to depressurize the internal spaces of the voxels 10B via the silicone tube 20, each of the bending type voxels 10B curves such that a lower portion thereof is convexed. Thus, the soft robot 1K has a curved shape in which both ends thereof in the lateral direction move upwardly, and a central region thereof in the lateral direction moves downwardly, almost without any change in the vertical direction (the up-down direction in FIG. 36A), as a whole.

Then, from this state, when the suction by the suction pump 30 is released, air flows into each of the voxels 10B, and each of the voxels 10B returns to the original cubic shape, whereby the soft robot 1K returns to its initial planar shape.

For example, the soft robot 1K according to this assembly example may be incorporated into a vent of an air conditioner, and used as a louver. In this case, the soft robot 1K is normally kept in a flat state to allow wind to be blown straight, and if necessary, the soft robot 1K can be curved to change a blowing direction of wind.

(8) Eighth Assembly Example

FIGS. 37A-37C illustrate the configuration of a soft robot of an eighth assembly example, wherein FIGS. 37A and 37B show in a pre-deformation state, and FIG. 37C shows a post-deformation state. Further, FIG. 37A is a top view, and FIGS. 37B and 37C are sectional views of B-B in FIG. 37A. In each sectional view, the fluid-communicating connector is shown by overlapping a white rectangle. As shown in FIGS. 37A-37C, the soft robot 1L of the eighth assembly example is configured as a planar soft robot. In the soft robot 1L, voxels 10 B are connected together by the fluid-communicating connectors 500 to form three lines in the lateral direction and four liners in the vertical direction. In this way, the internal spaces of all the voxels 10 B are fluidically communicated with each other.

The bending type voxel 10 B is used as each of the voxels. Each of the voxels 10B is disposed such that the bending direction (Y-axis direction) is oriented upwardly (in the up direction in FIG. 37B), and the bending axis direction (X-axis direction) is oriented in the lateral direction (the right-left direction of FIG. 37B). The silicone tube 20 is connected to the opening of the upper face of the voxel 10 B located in the second line in the lateral direction and in the second line in the vertical direction.

As shown in FIG. 37C, when the suction pump 30 is controllably driven by the control device 32 to depressurize the internal spaces of the voxels 10B via the silicone tube 20, each of the bending type voxels 10B curves such that an upper portion thereof is convexed. Thus, the soft robot 1K has a curved shape in which both ends thereof in the lateral direction move downwardly, and a central region thereof in the lateral direction moves upwardly, almost without any change in the vertical direction (the up-down direction of FIG. 36A), as a whole.

Then, from this state, when the suction by the suction pump 30 is released, air flows into each of the voxels 10B, and each of the voxels 10B returns to the original cubic shape, whereby the soft robot 1L returns to its initial planar shape.

(9) Ninth Assembly Example

FIGS. 38A-38E illustrate the configuration of a soft robot of a ninth assembly example, wherein FIGS. 38A-38C show a pre-deformation state, and FIGS. 38D and 38E show a post-deformation state. Further, FIGS. 38A and 38D are top views; FIGS. 38B and 38E are front views; and FIG. 38C is a sectional view of C-C in FIG. 38A. In each sectional view, the fluid-communicating connector is shown by overlapping a white rectangle. As shown in FIGS. 38A to 38E, the soft robot 1M of the ninth assembly example is configured as a quadrilateral parallelepiped-shaped soft robot. In the soft robot 1M, voxels 10C, 10D are connected together by the fluid-communicating connector 500 to form: four lines in the lateral direction; two lines in a vertical direction (depth direction); and two lines in a height direction. In this way, the internal spaces of all the voxels 10C, 10 D are fluidically communicated with each other.

The non-deformation type voxel 10D is used in each lower line in the height direction, and the shear type voxel 10C is used in each upper line the height direction. Among the upper lines in the height direction, each of the voxels 10C constituting the left-side two lines in the lateral direction is disposed such that the shear direction (X-axis direction) is oriented leftwardly, and the contraction direction (Y-axis direction) is oriented upwardly, and each of the voxels 10C constituting the right-side two lines in the lateral direction is disposed such that the shear direction (X-axis direction) is oriented rightwardly, and the contraction direction (Y-axis direction) is oriented upwardly. The silicone tube 20 is connected to the opening of the side face of the voxel 10D located in the second line in the lateral direction and in the second line in the vertical direction among the lower lines in the height direction.

As shown in FIGS. 38D and 38E, when the suction pump 30 is controllably driven by the control device 32 to depressurize the internal spaces of the voxels 10C, 10D via the silicone tube 20, each of the non-deformation type voxels 10D constituting the lower lines almost does not deform, but each of the shear type voxels 10C constituting the upper lines shear-deforms. Each of the voxels 10C constituting the left-side two lines in the lateral direction contracts in the up-down direction and shear-deforms such that the upper face thereof moves leftwardly. On the other hand, each of the voxels 10C constituting the right-side two lines in the lateral direction contracts in the up-down direction and shear-deforms such that the upper face thereof moves rightwardly. Thus, a groove extending in the vertical direction will be formed on an upper surface of the entire soft robot 1M Then, from this state, when the suction by the suction pump 30 is released, air flows into each of the voxels 10C, 10D, and each of the voxels 10C, 10D returns to the original cubic shape, whereby the soft robot 1M returns to its initial quadrilateral parallelepiped shape.

For example, the soft robot 1M according to this assembly example may be incorporated into a floor or roof. In this case, the soft robot 1M is normally kept in a flat state, and when a top surface thereof gets wet due to rain or the like, deforms such that a groove is formed in the top surface so as to guide water along this groove.

(10) Tenth Assembly Example

FIGS. 39-41 illustrate the configuration of a soft robot of a tenth assembly example, wherein: FIG. 39 is a perspective view showing a pre-deformation state; FIG. 40 is a perspective view showing a state in which the soft robot in the pre-deformation state is attached to the hand of a patient; and FIG. 41 is a perspective view showing a state in which the soft robot in a post-deformation state is attached to the hand of the patient. As shown in FIGS. 39-41, the soft robot 1L of the tenth assembly example comprises: a control device 32; a suction pump 30 which can be driven by the control device 32; a tube 20 extending from the suction pump 30; a branch plug 34 connected to a distal end of the tube 20; five tubes 20 extending from the branch plug 34 toward the fingers of the patient, respectively; and voxels 10A, 10B connected to the tubes 20.

The branch plug 34 is a plug capable of providing fluid communication between the tube 20 extending from the suction pump 30 and the tubes 20 each extending to a respective one of the fingers.

Two contraction types of voxels 10A are connected in series to each of the two tubes 20 corresponding to the thumb and the little finger. Each of the two contraction types of voxels 10A is disposed such that the contraction direction (Y-axis direction) is oriented in a connection direction (direction along the finger).

Two contraction types of voxels 10A and one shear type voxel 10B are connected, in this order from the base end of the finger, in series to each of the tubes 20 corresponding to the forefinger, the middle finger, and the third finger. Each of the two contraction types of voxels 10A is disposed such that the contraction direction (Y-axis direction) is oriented in the connection direction (direction along the finger). Further, the shear-type voxel 10B is disposed such that the shear direction (X-axis direction) is oriented in a direction toward the palm, and the contraction direction (Y-axis direction) is the direction along the finger.

The second sealing member 580 is attached to each of the openings of front and back faces of the voxels 10A, 10B. For example, a material (e.g., highly adhesive shape memory gel) capable of providing enhanced adhesion to the palm or an object is preferably applied to each of the second sealing members 580 of the voxels 10A, 10B located on the side coming into contact with the palm, i.e., located inside with respect to the hand. The fluid-communicating connector 500, the first sealing member 540, and the tube connector 560 are attached to the other openings of the voxels 10A, 10 B.

As shown in FIGS. 40 and 41, the soft robot 1L is fixed to the hand of the patient such that connection parts of the voxels 10A, 10B are located at respective positions corresponding to the joints of the fingers. With regard to the fixing of the soft robot 1L to the hand of the patient, for example, each finger and the voxel may be fixed together by applying an adhesive material to the second sealing member 580 on the side coming into contact with the palm, or may be fixed by a band or the like.

In a state in which the soft robot 1L is fixed to the hand in this manner, the suction operation of the suction pump 30 is controlled by the control device 32. Thus, each of the voxels 10A attached on the side of the base ends of the forefinger, the middle finger, and the third finger contracts, and each of the voxels 10B attached on the side of distal ends of these fingers shear-deforms such that a distal end-side portion thereof moves inwardly. Further, each of the voxels 10A attached to the thumb and the little finger contracts. Since the voxels 10A, 10B deform in the above manner, a force to close each finger is given to the hand of the patient by the soft robot 1L.

For example, the soft robot 1L may be applied to a patient with peripheral nerve disorder, and used as a device for rehabilitation. In this case, suction and release of the suction pump may be repeated to allow the patient to experience interval of finger bending.

Alternatively, it is possible to assist a patient to close his/her hand by controlling the suction operation of the suction pump 30 by the control device 32. Thus, the soft robot 1L can be used as an assist device to allow even a patient who cannot sufficiently move the muscle of fingers to grip an object by his/her hand As above, the soft robot according to this embodiment is constructed by coupling voxels having different shapes of deformation together. Thus, for example, by using voxels having different dimensions, it is possible to construct a rehabilitation or assist device conforming to dimensions of a region of a patient requiring rehabilitation or assist.

As described above, according to the above embodiment, since the deformation-regulating member 200, 220, 240 or 260 for regulating deformation of the voxel 10; 10A, 10B, 10C or 10D, when air in the casing 100 is discharged, is housed in the voxels 10, it is possible to cause the voxel 10 to deform into a desired shape when air is discharged. Thus, various movements can be realized by coupling the voxels 10; 10A, 10B, 10C, and/or 10D, together to construct the soft robot 1; 1A, 1B, 1C, 1D, 1E, 1F, 1G, 1H, 1I, 1J, 1K, 1L, or 1M.

Although air is used as the working fluid in each of the above embodiment and the above assembly examples, the working fluid is not limited thereto, but may be any of various gases, or liquid such as water.

Further, although the above embodiment and the above assembly examples have been described based on an example where the casing (outer shape of the voxel) has a cubic shape, and the deformation-regulating member has a cubic shape, the present invention is not limited thereto. For example, the outer shape of the casing may be a quadrilateral parallelepiped shape, and the shape of the internal space of the casing may be a quadrilateral parallelepiped shape similar to the outer shape. In this case, the deformation-regulating member may have a quadrilateral parallelepiped shape similar to the shape of the internal space. Alternatively, the shape of the casing may be a polygonal columnar shape, a circular columnar shape, or a regular polyhedral shape, depending on the shape and function required for the robot. However, considering reconstruction of the robot, a cubic shape provides higher versatility to the voxels.

LIST OF REFERENCE SIGNS 1, 1A, 1B, 1C, 1D, 1E, 1F, 1G, 1H, 1I, 1J, 1K, 1L, 1M: soft robot
10, 10A, 10B, 10C, 10D: voxel
20: silicone tube
22: internal space
30: suction pump
32: control device
34: branch plug
40: palm portion
42, 43, 44, 45, 46: finger portion
100: casing
110: internal space
120: opening
130: wall
140: palm portion
200: first deformation-regulating member
202: first layer
203: first plate-shaped part
204: second layer
205: second plate-shaped part
206: grid point
220: second deformation-regulating member
222: first layer
223: first plate-shaped part
224: second layer
225: second plate-shaped part
226A, 226: grid point
240: third deformation-regulating member
242: first layer
243: first plate-shaped part
244: second layer
245: second plate-shaped part
246: grid point
260: fourth deformation-regulating member 262: first layer
263: first plate-shaped part
264: second layer
265: second plate-shaped part
300: mold
300: inner mold
310: base
320: protrusion
330: bottom mold
340: bottom panel
350: frame
360: protrusion
370: partition plate
380: chamber
390: bottom plate
400: silicone
410: casing intermediate body
410A: cutout
500: fluid-communicating connector
502: circular part
504: base
506: communication hole
520: closing connector
522: circular part
523: base
540: first sealing member
542: circular part
544: base
546: tubular part
560: tube connector
562: circular part
564: tubular part
564A: enlarged diameter portion
566: through-hole
580: second sealing member
584: base
586: outer circular part
588: inner circular part

The invention claimed is:

1. A robot component module constituting at least a portion of a robot, comprising: a polyhedral-shaped casing contractable according to discharge of a working fluid from an internal space thereof; and
a deformation-regulating member housed in the casing to regulate deformation of the robot component module when the working fluid in the casing is discharged;
wherein a plurality of the robot component modules can be coupled together to constitute at least at least a portion of the robot.

2. The robot component module as recited in claim 1, wherein an outer shape of the casing is a quadrilateral parallelepiped shape, or a cubic shape, and the deformation-regulating member has a pre-deformation shape which is similar to the outer shape of the casing.

3. The robot component module as recited in claim 2, wherein the deformation-regulating member has a different elasticity in at least one axis direction among an X-axis direction, a Y-axis direction, and a Z-axis direction which are orthogonal to each other, with respect to an elasticity in the remaining axis directions.

4. The robot component module as recited in claim 2, wherein the deformation-regulating member is configured to, when being compressed in one axis direction among an X-axis direction, a Y-axis direction, and a Z-axis direction which are orthogonal to each other, undergo shear deformation in either one of the remaining axis directions.

5. The robot component module as recited in claim 2, wherein the deformation-regulating member is configured to, when being compressed in one axis direction among an X-axis direction, a Y-axis direction, and a Z-axis direction which are orthogonal to each other, bend in either one of the remaining axis directions.

6. The robot component module as recited in claim 2, wherein the deformation-regulating member comprises:
a first layer comprised of a plurality of first plate-shaped parts placed perpendicularly to an XY plane defined by an X-axis direction, a Y-axis direction, and a Z-axis direction which are orthogonal to each other, along the XY plane; and
a second layer comprised of a plurality of second plate-shaped parts placed perpendicularly to the XY plane along the XY plane;
wherein the first layer and the second layer are alternately laminated in the Z-axis direction.

7. The robot component module as recited in claim 6, wherein the first plate-shaped parts and the second plate-shaped parts are arranged to form a plurality of quadrilateral grids as viewed from the Z-axis direction.

8. The robot component module as recited in claim 7, wherein the first plate-shaped parts and the second plate-shaped parts are arranged to form a plurality of diamond-shaped quadrilateral frames each of whose diagonal lines are located along the X-axis direction and the Y-axis direction, respectively, wherein the X-axis directional diagonal line has a length different from a length of the Y-axis directional diagonal line, and wherein:
the lengths of the X-axis directional diagonal lines of the plurality of diamond-shaped quadrilateral frames are constant; and
the lengths of the Y-axis directional diagonal lines of the plurality of diamond-shaped quadrilateral frames are constant.

9. The robot component module as recited in claim 7, wherein the first plate-shaped parts and the second plate-shaped parts are arranged to form a plurality of diamond-shaped quadrilateral frames each of whose diagonal lines are located along the X-axis direction and the Y-axis direction, respectively, wherein the X-axis directional diagonal line has a length different from a length of the Y-axis directional diagonal line, and wherein the first plate-shaped parts and the second plate-shaped parts are configured such that the length of the Y-axis directional diagonal line of the diamond shape located on one side of the Y-axis is greater than the length of the Y-axis directional diagonal line of the diamond shape located on the other side of the Y-axis.

10. The robot component module as recited in claim 7, wherein
all the first plate-shaped parts extend in the X-axis direction, and
all the second plate-shaped parts extend at an angle to the X-axis.

11. The robot component module as recited in claim 7, wherein the first plate-shaped parts and the second plate-shaped parts are arranged to form a square-shape quadrilateral frames each of whose diagonal lines are located along the X-axis direction and the Y-axis direction, respectively, wherein the X-axis directional diagonal line has a length equal to a length of the Y-axis directional diagonal line.

12. A robot comprising:
a plurality of the robot component modules as recited in claim 1, wherein the plurality of robot component modules are coupled together; and
a suction pump;

wherein:
the plurality of robot component modules are coupled together in a state in which the internal spaces of the casings thereof are in fluid communication with each other; and
the suction pump is capable of sucking the working fluid in the internal spaces being in the fluid communication, thereoutside.

13. The robot as recited in claim 12, further comprising a fluid-communicating connector for coupling the robot component modules together, the fluid-communicating connector having a through-hole, wherein the casing is formed with an opening in each face thereof, and the fluid-communicating connector is attached to the openings of opposed faces of adjacent ones of the modules, whereby the adjacent modules are coupled together in a state in which the internal spaces of the adjacent modules are fluidically communicated with each other through the through-hole.

14. The robot as recited in claim 12, wherein the plurality of robot component modules constitute at least a portion of an end effector.

15. The robot as recited in claim 12, wherein the plurality of robot component modules are coupled and provided along each finger of a patient.

* * * * *